US011922555B2

(12) United States Patent
Jesus et al.

(10) Patent No.: US 11,922,555 B2
(45) Date of Patent: **\*Mar. 5, 2024**

(54) DATA STRUCTURES, METHODS AND TILING ENGINES FOR HIERARCHICALLY STORING TILING INFORMATION IN A GRAPHICS PROCESSING SYSTEM

(71) Applicant: Imagination Technologies Limited, Kings Langley (GB)

(72) Inventors: Diego Jesus, Watford (GB); John W. Howson, St. Albans (GB); Panagiotis Velentzas, Hertfordshire (GB); Robert Brigg, Watford (GB); Xile Yang, Rickmansworth (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/122,042

(22) Filed: Mar. 15, 2023

(65) Prior Publication Data

US 2023/0215095 A1    Jul. 6, 2023

Related U.S. Application Data

(63) Continuation of application No. 17/169,417, filed on Feb. 6, 2021, now Pat. No. 11,610,358.

(30) Foreign Application Priority Data

Feb. 7, 2020 (GB) ..................................... 2001716
Jun. 17, 2020 (EP) ..................................... 20386032
Jun. 17, 2020 (EP) ..................................... 20386033

(51) Int. Cl.
*G06T 15/00* (2011.01)
*G06T 1/20* (2006.01)
(Continued)

(52) U.S. Cl.
CPC ............. *G06T 15/005* (2013.01); *G06T 1/20* (2013.01); *G06T 1/60* (2013.01); *G06T 9/00* (2013.01);
(Continued)

(58) Field of Classification Search
None
See application file for complete search history.

(56) References Cited

U.S. PATENT DOCUMENTS 5,864,342 A    1/1999  Kajiya et al.
6,646,639 B1  11/2003  Greene
(Continued)

FOREIGN PATENT DOCUMENTS

EP    3796263 A1    3/2021
GB    2466576 B     7/2011
(Continued)

OTHER PUBLICATIONS

Hsiao et al., "A Hierarchical Primitive Lists Structure for Tile-Based Rendering," Computational Science and Engineering 2009; Aug. 29, 2009; pp. 408-413.

*Primary Examiner* — Frank S Chen
(74) *Attorney, Agent, or Firm* — Potomac Law Group, PLLC; Vincent M DeLuca

(57) ABSTRACT

Methods and tiling engines for tiling primitives in a tile based graphics processing system in which a rendering space is divided into a plurality of tiles. The method includes generating a multi-level hierarchy of tile groups, each level of the multi-level hierarchy comprising one or more tile groups comprising one or more of the plurality of tiles; receiving a plurality of primitive blocks, each primitive block comprising geometry data for one or more primitives; associating each of the plurality of primitive blocks with one or more of the tile groups up to a maximum number of tile
(Continued)

groups such that if at least one primitive of a primitive block falls, at least partially, within the bounds of a tile, the primitive block is associated with at least one tile group that includes that tile; and generating a control stream for each tile group based on the associations, wherein each control stream comprises a primitive block entry for each primitive block associated with the corresponding tile group.

20 Claims, 29 Drawing Sheets

(51) Int. Cl.
G06T 1/60 (2006.01)
G06T 9/00 (2006.01)
G06T 11/20 (2006.01)
G06T 11/40 (2006.01)
G06T 15/04 (2011.01)
G06T 17/10 (2006.01)
G06T 17/20 (2006.01)

(52) U.S. Cl.
CPC .............. *G06T 11/20* (2013.01); *G06T 11/40* (2013.01); *G06T 15/00* (2013.01); *G06T 15/04* (2013.01); *G06T 17/10* (2013.01); *G06T 17/20* (2013.01); *G06T 2210/12* (2013.01)

(56) References Cited

U.S. PATENT DOCUMENTS

| | | |
|---|---|---|
| 7,692,659 B1 | 4/2010 | Molnar |
| 8,704,836 B1 | 4/2014 | Rhoades et al. |
| 9,058,685 B2 | 6/2015 | Keall et al. |
| 9,349,215 B1 | 5/2016 | Baldwin |
| 9,607,426 B1 | 3/2017 | Peterson |
| 10,019,802 B2 | 7/2018 | Kim et al. |
| 10,217,272 B2 | 2/2019 | Akenine-Moller et al. |
| 10,614,549 B2 | 4/2020 | Berghoff |
| 10,912,877 B2 | 2/2021 | Fabig et al. |
| 11,030,783 B1 | 6/2021 | Engh-Halstvedt et al. |
| 2008/0211810 A1 | 9/2008 | Falchetto |
| 2009/0066694 A1 | 3/2009 | Redshaw et al. |
| 2010/0110102 A1 | 5/2010 | Nystad et al. |
| 2010/0177105 A1 | 7/2010 | Nystad et al. |
| 2011/0292032 A1 | 12/2011 | Yang |
| 2011/0304608 A1 | 12/2011 | Yang |
| 2013/0342547 A1 | 12/2013 | Lum et al. |
| 2014/0139534 A1 | 5/2014 | Tapply et al. |
| 2014/0347357 A1 | 11/2014 | Kim et al. |
| 2015/0049107 A1 | 2/2015 | Park |
| 2015/0109293 A1 | 4/2015 | Wang et al. |
| 2016/0260249 A1 | 9/2016 | Persson et al. |
| 2017/0024927 A1 | 1/2017 | Isomaki et al. |
| 2017/0084078 A1 | 3/2017 | Boudier |
| 2017/0263039 A1* | 9/2017 | Goel .................. G06T 15/20 |
| 2017/0309027 A1 | 10/2017 | Kleen et al. |
| 2017/0316604 A1 | 11/2017 | Yang et al. |
| 2017/0330372 A1 | 11/2017 | Kakarlapudi et al. |
| 2017/0352182 A1 | 12/2017 | Wang et al. |
| 2019/0172247 A1 | 6/2019 | Grossman et al. |
| 2019/0188896 A1 | 6/2019 | Heggelund et al. |
| 2020/0074721 A1 | 3/2020 | Heggelund et al. |
| 2020/0082505 A1 | 3/2020 | Croxford et al. |
| 2020/0151926 A1 | 5/2020 | Uhrenholt |
| 2021/0097639 A1 | 4/2021 | Venkatesh et al. |
| 2021/0279936 A1 | 9/2021 | Yang et al. |

FOREIGN PATENT DOCUMENTS

| | | |
|---|---|---|
| GB | 2545589 A | 6/2017 |
| GB | 2549789 A | 11/2017 |
| GB | 2564503 A | 1/2019 |
| WO | 2010/070302 A2 | 6/2010 |
| WO | 2010070302 A3 | 7/2011 |

* cited by examiner

DATA STRUCTURES, METHODS AND TILING ENGINES FOR HIERARCHICALLY STORING TILING INFORMATION IN A GRAPHICS PROCESSING SYSTEM

CROSS-REFERENCE TO RELATED APPLICATIONS AND CLAIM OF PRIORITY

This application is a continuation under 35 U.S.C. 120 of copending application Ser. No. 17/169,417 filed Feb. 6, 2021, now U.S. Pat. No. 11,610,358, which claims foreign priority under 35 U.S.C. 119 from United Kingdom Application No. 2001716.6 filed Feb. 7, 2020, and European Patent Application Nos. 20386032.5 and 20386033.3 both filed Jun. 17, 2020, the disclosures of which are hereby incorporated by reference in their entireties.

BACKGROUND

Graphics processing systems are configured to receive graphics data, e.g. from an application (e.g. a game application) running on a computer system, and to render an image from the graphics data to provide a rendering output. For example, an application may generate a 3D model of a scene and output geometry data representing the objects in the scene. In particular, the application may represent each object using one or more primitives (i.e. simple geometric shapes, such as, but not limited to rectangles, triangles, lines, and points to which a texture can be applied) which are defined by the position of one or more vertices. In these cases, the geometry data output by the application may include information identifying each vertex (e.g. the co-ordinates of the vertex in world space) and information indicating the primitives formed by the vertices. The graphics processing system then converts the received geometry data into an image that may be displayed on a screen.

A graphics processing system may, for example, implement immediate mode rendering (IMR) or tile-based rendering (TBR). In IMR the entire scene is rendered as a whole. In contrast, in TBR a scene is rendered using a rendering space which is divided into subsections, which are referred to as tiles, wherein at least a portion of the rendering process may be performed independently for each tile. The tiles may have any suitable shape, but are typically rectangular (wherein the term "rectangular" includes square). For example, FIG. 1 illustrates an example rendering space 100 divided into a set of 8×8 tiles T0 to T63. Each tile corresponds to a block of pixels in the rendering space. For example, each tile may correspond to a 32×32 block of pixels. In the example of FIG. 1 the tiles are numbered following a Z-order curve (also known as Morton order), but it will be evident to a person of skill in the art that this is an example only. An advantage of TBR is that fast, on-chip memory can be used during the rendering for colour, depth, and stencil buffer operations, which allows a significant reduction in system memory bandwidth over IMR, without requiring on-chip memory that is large enough to store data for the entire scene at the same time.

TBR involves two key phases: a geometry processing phase; and a rasterization phase. During the geometry processing phase the geometry data (e.g. vertices defining primitives) received from an application (e.g. a game application) is transformed from world space co-ordinates into screen space co-ordinates. A per-tile list is then created of the transformed primitives (e.g. triangles) that, at least partially, fall within the bounds of the tile. During the rasterization phase each tile is rendered separately (i.e. the transformed primitives are mapped to pixels and the colour is identified for each pixel in the tile). This may comprise identifying which primitive(s) are visible at each pixel. The colour of each pixel may then be determined by the appearance of the visible primitive(s) at that pixel which may be defined by a texture applied at that pixel and/or the pixel shader program run on that pixel. A pixel shader program describes operations that are to be performed for given pixels. Rendering each tile separately enables the graphics processing system to only retrieve the transformed primitive data related to a particular tile when rendering that tile in the rasterization phase, which keeps bandwidth requirements for the memory (e.g. intermediate buffer) low. Once a colour value has been identified for each pixel in a tile the colour values for the tile are written out to memory (e.g. a frame buffer). Once the entire scene has been rendered (i.e. once colour values have been determined for the pixels of all of the tiles) the scene may be, for example, displayed on a screen.

FIG. 2 illustrates an example TBR graphics processing system 200. The system 200 comprises memory $202_1$, $202_2$, $202_3$, $202_4$, geometry processing logic 204 and rasterization logic 106. Two or more of the memories $202_1$, $202_2$, $202_3$, and $202_4$ may be implemented in the same physical unit of memory.

The geometry processing logic 204 implements the geometry processing phase of TBR. The geometry processing logic 204 comprises transformation logic 208, a primitive block generator 210, and a tiling engine 212. The transformation logic 208 receives geometry data (e.g. vertices, primitives and/or patches) from an application (e.g. a game application) and transforms the geometry data into the rendering space (e.g. screen space). The transformation logic 208 may also perform functions such as clipping and culling to remove geometry data (e.g. primitives or patches) that falls outside of a viewing frustum, and/or apply lighting/attribute processing as is known to those of skill in the art.

The primitive block generator 210 stores the transformed primitives (i.e. the transformed geometry data related thereto) in memory $202_2$ in primitive blocks. A primitive block is a data structure in which one or more primitives (e.g. the transformed geometry data related thereto) are stored together. Storing the primitives in primitive blocks may allow the transformed geometry data for the primitives to be stored more efficiently in memory $202_2$. Specifically, the transformed geometry data for a primitive often comprises transformed vertex information for a plurality of vertices and the vertices are often shared between (or are common to) multiple primitives. Accordingly, where multiple primitives in the same primitive block share a vertex the data related to that vertex only needs to be stored once in the primitive block.

The transformed primitives may be grouped into primitive blocks using any suitable method or technique. For example, in some cases the transformed primitives may be grouped into primitive blocks based on the order in which the transformed primitives arrive at the primitive block generator 210. In these cases, each primitive block may have a maximum size (e.g. in terms of bits or bytes), a maximum number of primitives which can belong to a primitive block, and/or a maximum number of vertices that can belong to a primitive block and the primitive block generator 210 may be configured to add primitives to a current primitive block until one or more of the maximums is reached.

In other cases, the primitives may be grouped into primitive blocks based on their location in the render space so that spatially similar primitives are in the same primitive block. For example, the rendering space may be divided into macro regions which may encompass multiple tiles (e.g. a 1024×1024 rendering space that is divided into one thousand twenty-four 32×32 tiles may have sixteen 256×256 macro regions) and the primitive block generator 210 may be configured to maintain a primitive block for each macro region. Then when the primitive block generator 210 receives a primitive it determines which macro region(s) the primitive, at least partially, falls within. If the primitive block generator 210 determines that the primitive falls, at least partially, within only one macro region, then the primitive block generator 210 may place the primitive (i.e. the transformed geometry data related to that primitive) in the primitive block for that macro region. If the primitive block generator 210 determines that the primitive falls within more than one macro region then the primitive block generator 210 may be configured to (i) select one of the macro regions the primitive falls within (e.g. the first one) and place the primitive (i.e. the transformed geometry data related thereto) in the primitive block for the selected macro region; or (ii) place the primitive (i.e. the transformed geometry data related thereto) in the primitive block for each of the macro regions the primitive falls, at least partially, within.

The primitive blocks (or at least the primitives thereof) along with information identifying the location of the primitive blocks in memory are provided to the tiling engine 212. The tiling engine 212 generates, from the transformed geometry data, a list, for each tile (e.g. each of tiles T0 to T63 of FIG. 1), of the transformed primitives that fall, at least partially, within that tile. The list may be referred to as a display list, a transformed display list, a control list, or control data. In some cases, the transformed display lists may comprise pointers or links to the transformed geometry data (e.g. vertex data) related to the primitives that, at least partially, fall within the tile. For example, FIG. 3 shows an example display list 302 for a tile (e.g. T0) which comprises a primitive block entry $304_0$, $304_1$ for each primitive block $306_0$, $306_1$ that comprises at least one primitive that falls, at least partially, within the bounds of that tile. Each primitive block entry $304_0$, $304_1$, comprises information 308 identifying the location of the primitive block in memory (e.g. an address of the primitive block in memory) and information 310 identifying which primitives of that primitive block fall, at least partially, within the bounds of the tile. As shown in FIG. 3, the information 310 identifying which primitives of the primitive block fall, at least partially, within a tile may be in the form of a mask that comprises a bit for each primitive in the primitive block that indicates whether or not that primitive falls, at least partially, within the bounds of the tile.

Returning to FIG. 2, the rasterization logic 206 implements the rasterization phase of TBR. Specifically, the rasterization logic 206 renders the primitives in a tile-by-tile manner by fetching the display list for a tile from memory $202_3$ and then fetching the transformed geometry data from memory $202_2$ for the primitives that fall within the tile as indicated by the display list for that tile; and rendering the primitives for that tile based on the transformed geometry data.

In some cases, the rasterization logic 206 may comprise a rasterizer 214, hidden surface removal (HSR) logic 216 and texturing/shading logic 218. In these cases, the rasterizer 214 fetches each of the display lists from memory $202_3$ and for each display list fetches the transformed geometry data from memory $202_2$ for the primitives that fall within a tile as specified by the corresponding display list, and converts each primitive into a set of primitive fragments. The term "fragment" is used herein to mean a sample of a primitive at a sampling point, which is to be processed to render pixels of an image. In some examples, there may be a one-to-one mapping of pixels to fragments. However, in other examples there may be more fragments than pixels, and this oversampling can allow for higher quality rendering of pixel values, e.g. by facilitating anti-aliasing and other filters that may be applied to multiple fragments for rendering each of the pixel values.

The primitive fragments for a particular tile are then provided to the HSR logic 216 which removes primitive fragments which are hidden (e.g. hidden by other primitive fragments) by performing depth testing on the primitive fragments. The remaining fragments (after hidden surface removal) are then passed to the texturing/shading logic 218 which performs texturing and/or shading on the primitive fragments to determine pixel values of a rendered image. The rendered pixel values for a tile are then stored in memory $202_4$ (e.g. frame buffer).

The rasterization logic 206 processes each of the tiles and when the whole image has been rendered and stored in the memory $202_4$ (e.g. frame buffer) the image can be output from the graphics processing system 200 and used in any suitable manner, for example, displayed on a display, stored in memory, or transmitted to another device, etc. The TBR graphics processing system 200 shown in FIG. 2 is a "deferred" rendering system in the sense that fragments are processed by the HSR logic 216 before being processed by the texturing/shading logic 218. In other examples, the graphics processing system might not be a deferred rendering system in which case texturing/shading would be applied to fragments before HSR is applied to those fragments.

Although the geometry processing logic is shown in the figures as being separate to the rasterization logic, in some implementations the geometry processing logic and the rasterization logic may share some resources. For example, the graphics processing system could use a unified shading approach wherein the same physical execution units can be used to execute instructions for use in the geometry processing phase (e.g. to perform vertex processing) and to execute instructions for use in the rasterization phase (e.g. to perform fragment processing).

The embodiments described below are provided by way of example only and are not limiting of implementations which solve any or all of the disadvantages of known methods and systems for tiling primitives in a graphics processing system.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are methods and tiling engines for tiling primitives in a tile-based graphics processing system in which a rendering space is divided into a plurality of tiles. The method includes: generating a multi-level hierarchy of tile groups, each level of the multi-level hierarchy comprising one or more tile groups comprising one or more of the plurality of tiles; receiving information identifying each of a plurality of primitive blocks, each primitive block comprising geometry data for one or more primitives; associating each of the plurality of primitive blocks with one or more of the tile groups up to a maximum number of tile groups such that if at least one primitive of a primitive block falls, at least partially, within the bounds of a tile, the primitive block is associated with at least one tile group that includes that tile; and generating a control stream for each tile group based on the associations, wherein each control stream comprises a primitive block entry for each primitive block associated with the corresponding tile group.

A first aspect provides a method of tiling primitives in a tile-based graphics processing system in which a rendering space is divided into a plurality of tiles, the method comprising: generating a multi-level hierarchy of tile groups, each level of the multi-level hierarchy comprising one or more tile groups comprising one or more of the plurality of tiles; receiving information identifying each of a plurality of primitive blocks, each primitive block comprising geometry data for one or more primitives; associating each of the plurality of primitive blocks with one or more of the tile groups up to a maximum number of tile groups such that if at least one primitive of a primitive block falls, at least partially, within the bounds of a tile, the primitive block is associated with at least one tile group that includes that tile (606); and generating a control stream for each tile group based on the associations, wherein each control stream comprises a primitive block entry for each primitive block associated with the corresponding tile group.

The maximum number of tile groups may be one.

Associating a primitive block with one or more of the tile groups may comprise: identifying an axis-aligned bounding box in the rendering space that encompasses the one or more primitives of the primitive block; and associating the primitive block with a smallest tile group whose one or more tiles encompass the bounding box.

The maximum number of tile groups may be greater than one.

Associating a primitive block with one or more of the tile groups may comprise: identifying an axis-aligned bounding box in the rendering space that encompasses the one or more primitives of the primitive block; and associating the primitive block with a smallest set of one or more tile groups whose one or more tiles encompass the bounding box.

Each tile group in the set of one or more tile groups may be at a same level of the hierarchy.

The set of one or more tile groups may comprise a plurality of tile groups and at least two of the tile groups in the set are at different levels of the hierarchy.

Each primitive block entry may comprise information identifying the corresponding primitive block.

The information identifying the corresponding primitive block may comprise information identifying a location of the primitive block in memory.

The information identifying the location of the primitive block in memory may be an address in memory or an offset from a base address.

Each primitive block may be associated with an axis-aligned bounding box in the rendering space that encompasses the one or more primitives of the primitive block, and if the bounding box for a primitive block does not encompass an area of the rendering space covered by the tiles in the tile group the primitive block entry for that primitive block may comprise information identifying one or more co-ordinates of the bounding box.

Each primitive block may be associated with an axis-aligned bounding box in the rendering space that encompasses the one or more primitives in the set of the primitives, and if a primitive block does not comprise at least one primitive that falls in each tile of the tile group, the primitive block entry for that primitive block may comprise a coverage mask which indicates which tiles of the tile group that intersect the bounding box for the primitive block are valid for the primitive block, a tile being valid for a primitive block if at least one primitive in the primitive block falls, at least partially, within the bounds of the tile.

Each coverage mask may comprise information for successively smaller and smaller areas of a block of relevant tiles that indicates whether that area is valid for the primitive block, the block of relevant tiles comprising the tiles of the tile group that intersect the bounding box for the primitive block.

The method may further comprise generating the coverage mask for a primitive block entry by: (a) dividing a block of relevant tiles into quadrants of tiles, the block of relevant tiles comprising the tiles of the tile group that intersect the bounding box for the primitive block; (b) adding information to the coverage mask indicating whether each of the quadrants is valid for the primitive block; and (c) if a quadrant is valid for the primitive block and the quadrant comprises more than one tile, dividing that quadrant into sub-quadrants and repeating (b) and (c) for each sub-quadrant.

Generating the coverage mask for a primitive block entry may further comprise, prior to dividing the block of relevant tiles into quadrants of tiles, expanding the block of relevant tiles to a square block with power of two sides.

Each tile group of level k may comprise a $h^k \times h^k$ block of tiles wherein h is an integer greater than one and k is an integer between 0 to N−1, and N is a number of levels in the hierarchy; and h may be two.

Each tile group of level j may comprise n tile groups of level j−1 wherein n is an integer greater than one and j is an integer between 1 and N−1 and N is a number of levels in the hierarchy; and n may be four.

Each tile group at a lowest level of the hierarchy may comprise only a single tile of the plurality of tiles.

A second aspect provides a tiling engine for use in a graphics processing system in which a render space is divided into a plurality of tiles, the tiling engine comprising: tile group selector logic configured to: obtain information defining a multi-level hierarchy of tile groups wherein each level of the multi-level hierarchy comprises one or more tile groups comprising one or more of the plurality of tiles; receive information identifying each of a plurality of primitive blocks, each primitive block comprising geometry data for one or more primitives; and associate each of the plurality of primitive blocks with one or more of the tile groups up to a maximum number of tile groups such that if at least one primitive of a primitive block falls, at least partially, within the bounds of a tile, the primitive block is associated with at least one tile group that includes that tile; and a control stream generator configured to generate a control stream for each tile group in the multi-level hierarchy based on the associations, wherein each control stream comprises a primitive block entry for each primitive block associated with the corresponding tile group.

A third aspect provides a control stream decoder for use in a graphics processing system in which a rendering space is subdivided into a plurality of tiles, each tile forming part of at least two different tile groups of different sizes, the control stream decoder comprising: control stream fetch logic configured to fetch a control stream for each tile group that a current tile forms part of, each control stream comprising none, one or more than one primitive block entries, each primitive block entry comprising (i) information identifying a primitive block comprising geometry data for one or more primitives, and (ii) bounding box information identifying a bounding box that encompasses the one or more primitives; and a control stream analyser configured to, for each fetched control stream: if the control stream comprises at least one primitive block entry, for each primitive block entry: determine from the bounding box information whether the current tile falls within the bounding box; and in response to determining that the current tile does not fall within the bounding box, determine that the primitive block is not relevant to rendering the current tile.

Each primitive block entry may further comprise full coverage information indicating whether the primitive block is relevant to each tile in the tile group, and the control stream analyser is further configured to determine from the full coverage information whether the primitive block is relevant to each tile in the tile group, and only perform the bounding box determination if it is determined that the primitive block is not relevant to each tile in the tile group.

The control stream analyser may be further configured to, in response to determining that the primitive block is relevant to each tile in the tile group, identify the primitive block as being relevant for rendering the current tile.

The control stream analyser may be further configured to: in response to determining that the current tile falls within the bounding box, determining whether the control stream comprises a coverage mask, the coverage mask indicating which tiles in the tile group that intersect with the bounding box are relevant for the corresponding primitive block; and in response to determining that the control stream comprises a coverage mask, determining from the coverage mask whether the primitive block is relevant to rendering the current tile.

A fourth aspect provides a method of identifying, in a graphics processing system in which the rendering space has been divided into a plurality of tiles, primitives relevant to rendering a current tile of the plurality of tiles, each tile forming part of at least two different tile groups of different sizes, the method comprising: fetching a control stream for each tile group that a current tile forms part of, each control stream comprising none, one or more than one primitive block entries, each primitive block entry comprising (i) information identifying a primitive block comprising geometry data for one or more primitives, and (ii) bounding box information identifying a bounding box that encompasses the one or more primitives; and for each fetched control stream that comprises at least one primitive block entry, for each primitive block entry: determining from the bounding box information whether the current tile falls within the bounding box; and in response to determining that the current tile does not fall within the bounding box, determining that the primitive block is not relevant to rendering the current tile.

A fifth aspect provides a tiling engine configured to perform the method of the first aspect.

A sixth aspect provides a graphics processing system comprising the tiling engine of the second aspect and/or the control stream decoder of the third aspect.

The tiling engines, control stream decoders and graphics processing systems described herein may be embodied in hardware on an integrated circuit. There may be provided a method of manufacturing, at an integrated circuit manufacturing system, an integrated circuit embodying a tiling engine, a control stream decoder and/or a graphics processing system described herein. There may be provided an integrated circuit definition dataset that, when processed in an integrated circuit manufacturing system, configures the system to manufacture an integrated circuit embodying a tiling engine, a control stream decoder or a graphics processing system described herein. There may be provided a non-transitory computer readable storage medium having stored thereon a computer readable description of a tiling engine, a control stream decoder or a graphics processing system described herein that, when processed in an integrated circuit manufacturing system, causes the integrated circuit manufacturing system to manufacture an integrated circuit embodying the tiling engine, the control stream decoder or the graphics processing system.

There may be provided an integrated circuit manufacturing system comprising: a non-transitory computer readable storage medium having stored thereon a computer readable description of a tiling engine, a control stream decoder or a graphics processing system described herein; a layout processing system configured to process the computer readable description so as to generate a circuit layout description of an integrated circuit embodying the tiling engine, the control stream decoder or the graphics processing system; and an integrated circuit generation system configured to manufacture an integrated circuit embodying the tiling engine, the control stream decoder or the graphics processing system according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 1 is a schematic diagram illustrating an example rendering space divided into a plurality of tiles;

FIG. 4 is a schematic diagram illustrating the tiles of FIG. 1 divided into a plurality of 2×2 tile groups;

FIG. 9 is a flow diagram of a first example method of selecting the tile group(s) to associate a primitive block with;

FIG. 12 is a flow diagram of a second example method of selecting the tile group(s) to associate a primitive block with;

Figure 2:
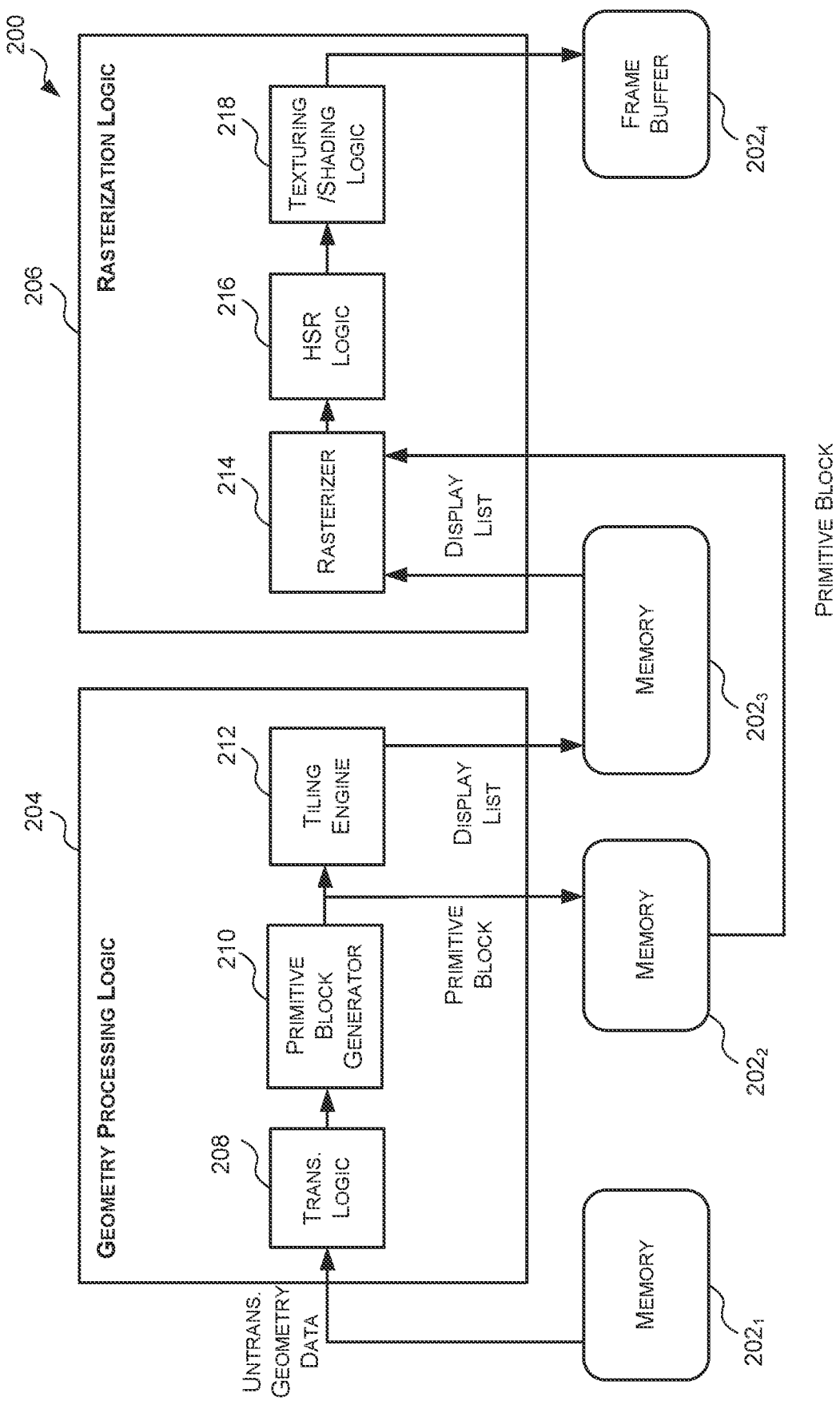
FIG. 2 is a block diagram of an example tile-based rendering graphics processing system.
Figure 3:
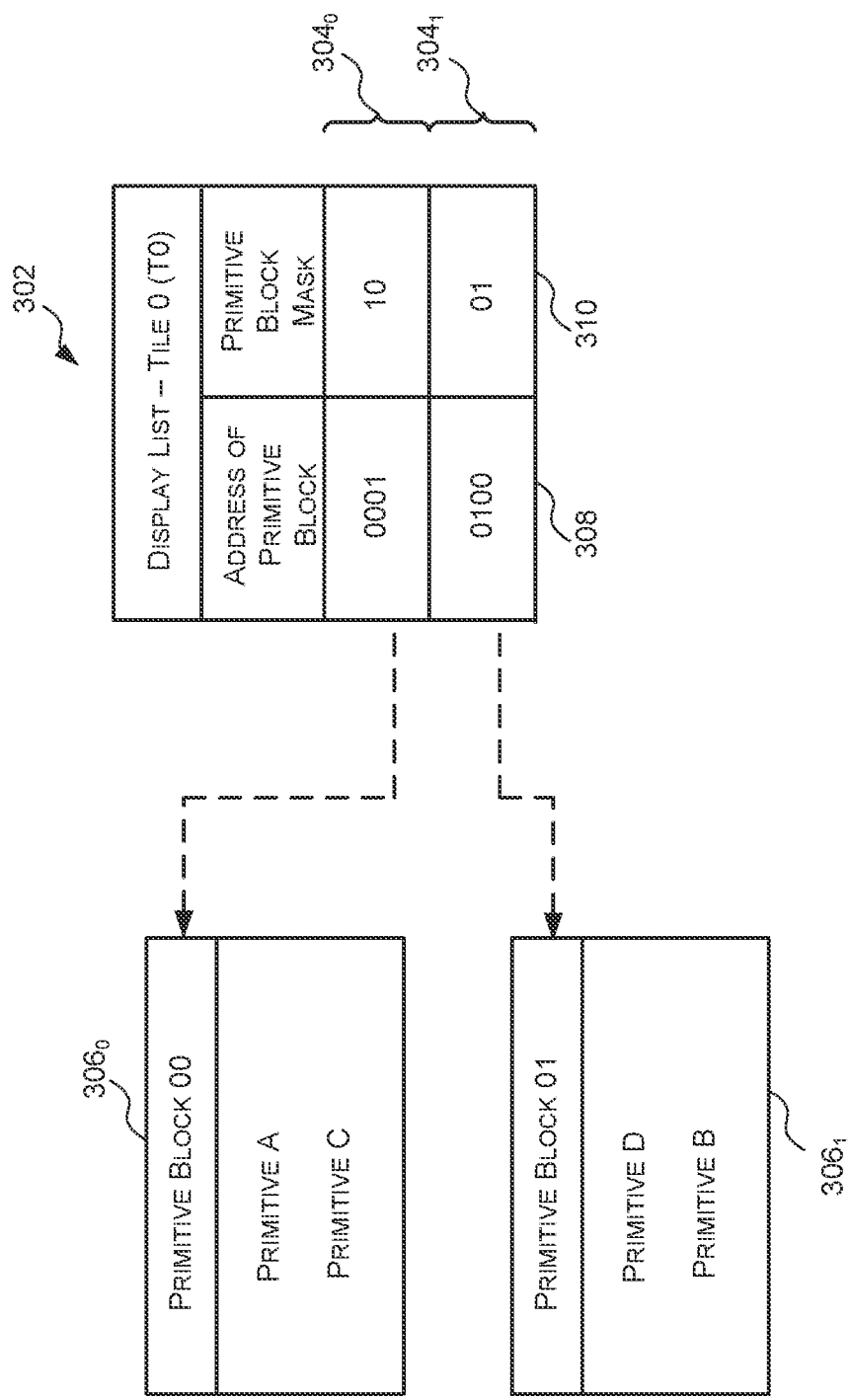
FIG. 3 is a schematic diagram of an example display list.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

As described above, a primitive block is a data structure in which one or more primitives (e.g. the transformed geometry data related thereto) are stored together. Storing the primitives in primitive blocks may allow the transformed geometry data for the primitives to be stored more efficiently in memory. Specifically, the transformed geometry data for a primitive often comprises transformed vertex information for a plurality of vertices and the vertices are often shared between (or are common to) multiple primitives. Accordingly, where multiple primitives in the same primitive block share a vertex the data related to that vertex only needs to be stored once in the primitive block.

When transformed primitives (e.g. the transformed geometry data related thereto) are stored in primitive blocks the display list for a tile may comprise an entry for each primitive block that comprises at least one primitive that falls, at least partially, within the bounds of that tile. Since a primitive block may comprise primitives that fall, at least partially, within the bounds of multiple tiles, there may be a primitive block entry in multiple display lists for the same primitive block. This is especially true for primitive blocks that comprise large primitives, such as primitives that cover all or a significant portion of the rendering space. This leads to increased memory usage and bandwidth (both in writing the display lists to memory in the geometry processing phase and reading the display lists from memory in the rasterization phase).

Figure 1:
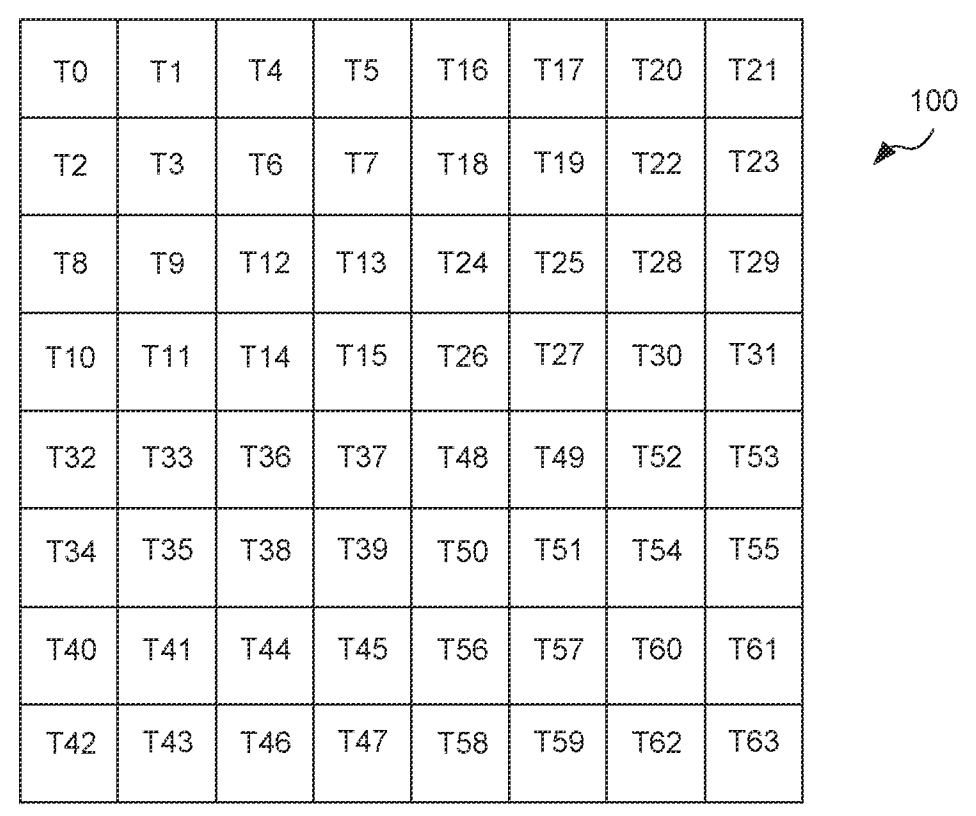
Figure 4:
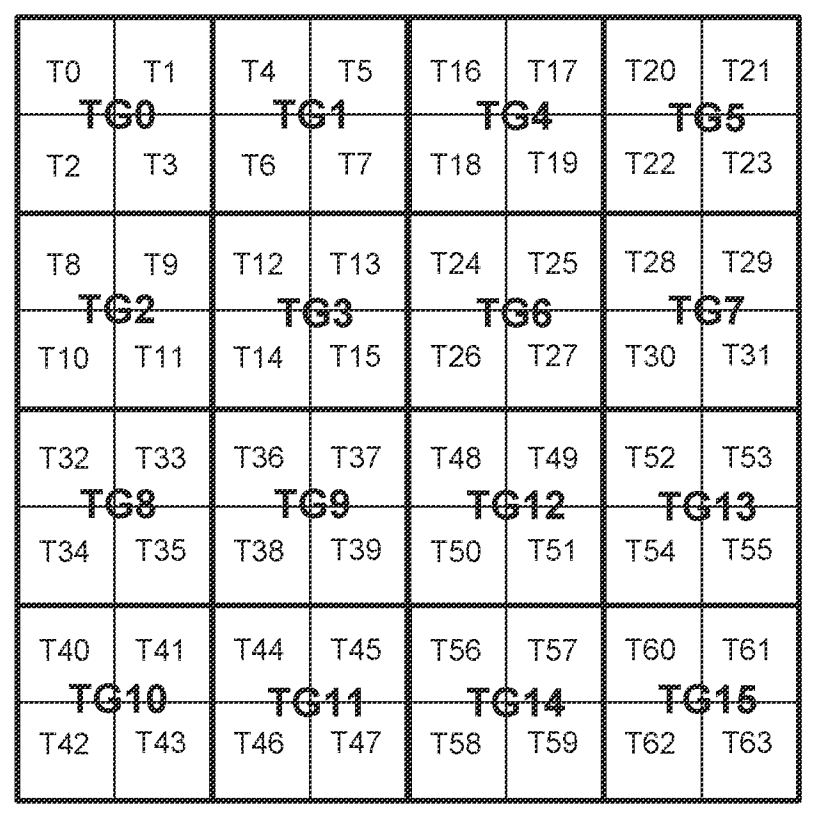

To reduce this repetition of primitive block data the tiles may be divided into groups of N×M tiles, wherein N and M are integers greater than or equal to 1; and a per tile group control stream is generated that identifies the primitive blocks (and the primitives thereof) that are relevant to each tile in the tile group. For example, the tiles may be divided into 2×2 tile groups. FIG. 4 illustrates the example tiles T0 to T63 of FIG. 1 divided into sixteen 2×2 tile groups TG0 to TG15. For example, tile group 0 (TG0) comprises tiles T0, T1, T2 and T3.

The Applicant's UK Patent No. 2466576, which is herein incorporated by reference in its entirety, describes storing for each group of tiles a control stream that comprises a primitive block entry for each primitive block that comprises at least one primitive that falls, at least partially, within the bounds of at least one tile in the tile group. Each primitive block entry comprises: (i) information identifying which tiles are valid for that primitive block, (ii) information identifying the location of the primitive block in memory, and (iii) for each valid tile, information identifying the primitives of that primitive block that fall, at least partially, within the bounds of that tile. A tile is said to be valid for a primitive block if there is at least one primitive in the primitive block that falls, at least partially, within the bounds of that tile. A primitive that falls, at least partially, within the bounds of a tile may alternatively be described as a primitive that intersects that tile.

Figure 5:
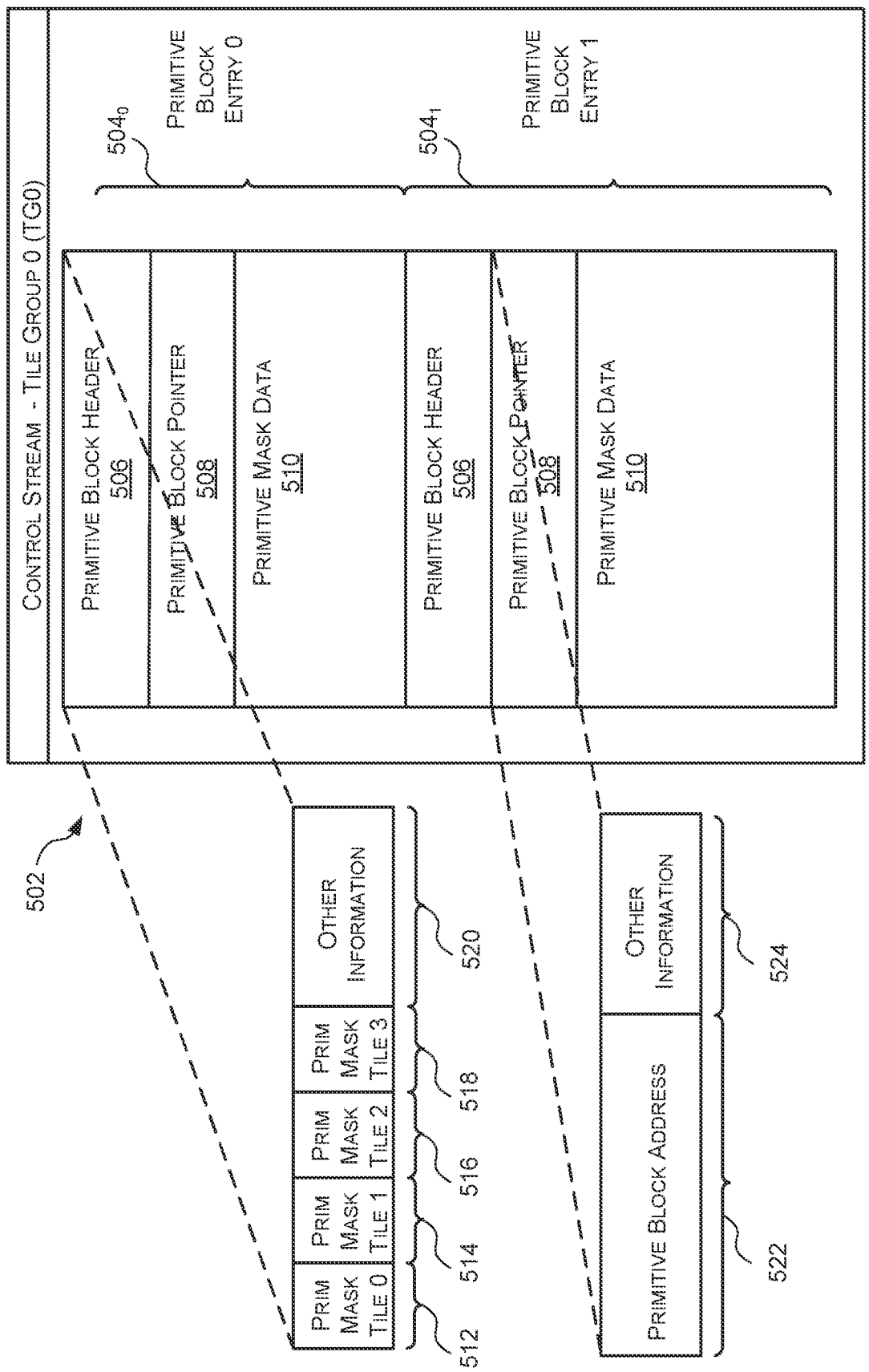
FIG. 5 is a schematic diagram illustrating an example control stream for a tile group.

FIG. 5 shows an example of the control stream 502 of UK Patent No. 2466576 for a tile group comprising four tiles. The control stream 502 comprises a primitive block entry $504_0$, $504_1$ for each primitive block that is valid for at least one tile in the tile group. Each primitive block entry $504_0$, $504_1$ comprises a primitive block header 506 and a primitive block pointer 508. A primitive block entry $504_0$, $504_1$ may optionally comprise primitive mask data 510. The primitive block header 506 comprises information identifying which tiles in the tile group are valid for the primitive block. For example, as shown in FIG. 5, the primitive block header 506 may comprise a primitive mask format field 512, 514, 516 and 518 for each tile in the tile group that indicates whether or not the tile is valid for the primitive block. For example each primitive mask format field 512, 514, 516, 518 may comprise two bits and '00' may indicate that the tile is invalid for the primitive block; '01' may indicate that the tile has a full primitive mask (i.e. all primitives in the primitive block are valid for the tile); '10' may indicate that the primitive mask is compressed; and '11' may indicate that the primitive mask is uncompressed. The primitive block header 506 may also comprise other information 520 such as, but not limited to, the number of vertices in the primitive block, whether or not all the tiles in the tile group are valid and have the full primitive mask (i.e. all the primitives in the primitive block are valid for the tile), and whether or not all of the tiles have the same primitive mask.

The primitive block pointer 508 comprises the address of the primitive block in memory 522. In some cases, the primitive block pointer 508 may also comprise other information 524, such as, but not limited to, the number of primitives in the primitive block.

The primitive mask data 510 comprises one or more primitive masks that identify the primitives of the primitive block that fall, at least partially, within the bounds of each of the valid tiles. Each primitive mask may comprise a bit for each primitive in the primitive block that indicates whether that primitive falls, at least partially, within the bounds of the corresponding tile(s). In some cases (e.g. when each valid tile has a different primitive mask), the primitive mask data 510 may comprise a primitive mask for each valid tile. In other cases (e.g. when all the valid tiles have the same primitive mask), the primitive mask data 510 may comprise only one mask which applies to all of the valid tiles. Each primitive mask may be in a compressed or uncompressed form.

However, while generating a control stream per tile group can reduce the amount of duplication in the tiling information, it does not eliminate the duplication. Furthermore, in both of the tiling methods described above, the amount of memory required to store the tiling information (e.g. display lists or tile group control streams) generated by the tiling engine cannot be determined in advance. Specifically, it cannot be determined, in advance, how many primitive blocks will be relevant to each tile or each tile group and thus how many primitive block entries each display list, or each tile group control stream, will have. For example, if a render comprises a lot of large primitives that cover all, or almost all, of the rendering space, then many display lists or tile group control streams will have an entry for each primitive block that comprises a large primitive.

If the tiling information (e.g. display lists or tile group control streams) generated by the tiling engine grows larger than the memory allocated for storing the tiling information (e.g. memory 202₃) this can cause the graphics processing system to operate in a less efficient manner. Specifically, a TBR graphics processing system can operate most efficiently if all of the primitives in a render are tiled prior to the rasterization phase beginning for any of the tiles. This is because, in this scenario, each display list/tile group control stream will identify all of the primitives for rendering the corresponding tile/tile group, thus each tile can be processed in the rasterization phase once using that information. If, however, the size of the tiling information exceeds the memory allocated for storing the tiling information then a display list/tile group control stream may be passed to the rasterization phase before the tiling is complete to free up memory. If a primitive subsequently arrives at the tiling engine that is relevant to rendering that tile, then that tile may have to be processed again in the rasterization phase.

Accordingly, it is desirable to generate tiling information for a render that has a maximum size so that adequate memory can be allocated for storing the tiling information. It is also desirable to minimize the memory required to store the tiling information, and reduce the bandwidth to write the tiling information to memory (in the geometry processing phase) and read the tiling information from memory (in the rasterization phase).

The inventors have identified that while the number of primitives/primitive blocks per tile cannot be accurately determined in advance, the number of primitives/primitive blocks can be accurately estimated in advance, and thus if the maximum number of different control streams/display lists that a primitive block forms part of is predetermined or fixed the maximum size of the tiling information can be determined in advance. The inventors have identified that this can be achieved using a multi-level hierarchical tiling structure. Specifically, a multi-level hierarchy of the tiles is generated wherein each level of the hierarchy comprises tile groups comprising one or more tiles, and a higher level comprises tile groups with more tiles than a lower level. A control stream is generated for each tile group which lists primitive blocks relevant to rendering at least one tile in the tile group. Any primitive block can only form part of a fixed or predetermined number of control streams. The specific control streams that a primitive block forms part of can be selected in any manner such that all of the primitives relevant for rendering a tile are identified in at least one control stream for a tile group that the tile forms part of. In the rasterization phase the control streams for all the tile groups that a tile forms part of are used to identify the relevant primitives for rendering that tile.

The multi-level hierarchy of tiles may be generated by grouping the tiles into successively larger groups of tiles starting with groups that comprise a single tile (level 0), and increasing the number of tiles per group by a factor of n each level until there is a group that comprises all of the tiles. In one example, n is equal to 4, such that the level 0 groups comprise one tile each, the level 1 groups comprise 4 tiles (e.g. a 2×2 block of tiles), the level 2 groups comprise 16 tiles (e.g. a 4×4 block of tiles), etc. until there is a group comprising all the tiles. Alternatively, the $k^{th}$ level group (other than a level 0 group—i.e. k>0) can be described as comprising n of the (k−1) level groups. Accordingly, each tile will be part of a group at each level—e.g. a level 0 group, a level 1 group, a level 2 group etc. A control stream is then generated for each group of tiles (e.g. each level 0 group of tiles, each level 1 group of tiles, each level 2 group of tiles etc.) that identifies primitive blocks that are relevant to rendering at least one tile in the tile group. In one example, each primitive block may be added to the control stream of only one group—e.g. the smallest group (or lowest level group) wherein the bounding box of the primitives in the primitive block falls within the bounds of the tiles in that group. However, this is just an example and primitive blocks may be associated with the tile groups in other manners.

Accordingly, described herein are multi-level hierarchical tiling methods, and tiling engines configured to implement such a method, for use in a tile-based rendering graphics processing system. The methods comprise generating a multi-level hierarchy of tile groups. Each level of the hierarchy comprises non-overlapping groups of tiles and higher level tile groups comprise more tiles than lower level tile groups. Primitive blocks are then associated with one or more tile groups up to a maximum number of tile groups based on the location of the primitives in the primitive block such that each primitive block relevant for rendering a tile is associated with at least one group to which the tile is part of. A control stream is then generated for each tile group in the hierarchy. Each control stream may comprise an entry for each primitive block associated with the corresponding tile group that identifies that primitive block as being relevant for rendering at least one tile in the tile group.

Figure 6:
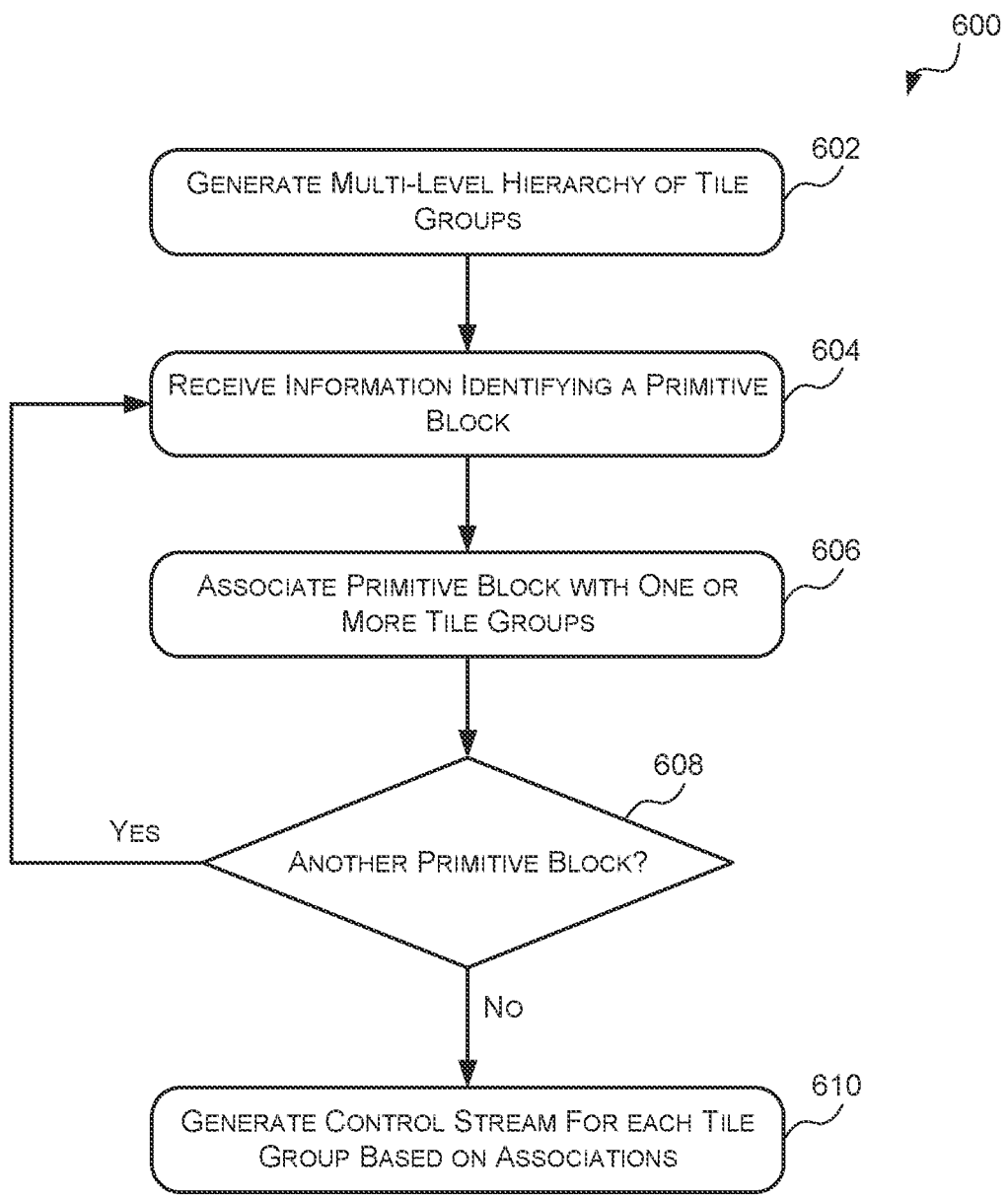
FIG. 6 is a flow diagram of an example multi-level hierarchical method of tiling primitives.

Reference is now made to FIG. 6 which illustrates an example multi-level hierarchical tiling method 600 for use in a tile-based rendering (TBR) graphics processing system in which the rendering space is divided into a plurality of tiles (e.g. as shown in FIG. 1). The method 600 begins at step 602 where a multi-level hierarchy of tile groups is generated. Each level in the hierarchy comprises non-overlapping groups of tiles of a particular size, and higher level tile groups comprise more tiles than lower level tile groups.

The multi-level hierarchy of tile groups may be generated by grouping the tiles into successively larger groups of tiles starting with level 0 groups that comprise a single tile, and increasing the number of tiles per group by a multiple of n each level until there is a single group that comprises all of the tiles. Accordingly, the number of levels in the hierarchy may be based on the number of tiles in the rendering space. In general, the more tiles in the rendering space the greater the number of levels in the hierarchy. In one example, n is equal to 4, such that each level 0 group comprises one tile, each level 1 group comprises 4 tiles, each level 2 group comprises 16 tiles, etc. In some examples, each level k group (other than a level 0 group—i.e. k>0) may comprise n of the level (k−1) groups. Accordingly, each tile will be part of a group at each level—e.g. a level 0 group, a level 1 group, a level 2 group etc.

In some cases, each group of tiles may comprise a block of tiles. For example, each group of tiles may comprise a $h^k \times h^k$ block of tiles wherein k is the level number and 0 is the lowest level number. In one example, h is 2, such that each level the block expands by a factor of 2 in both the horizontal and vertical direction. In this example, each level 0 group comprises a 1×1 block of tiles (i.e. a single tile), each level 1 group comprises a 2×2 block of tiles, each level 2 group comprises a 4×4 block of tiles, and each level 3 group comprises an 8×8 block of tiles etc. In some examples, each level k group (other than a level 0 group—i.e. k>0) may comprise a h×h block of level k−1 groups. For example, where h is 2, each level 1 tile group may comprise a 2×2 block of level 0 tile groups, each level 2 tile group may comprise a 2×2 block of level 1 tile groups etc.

Figure 7:
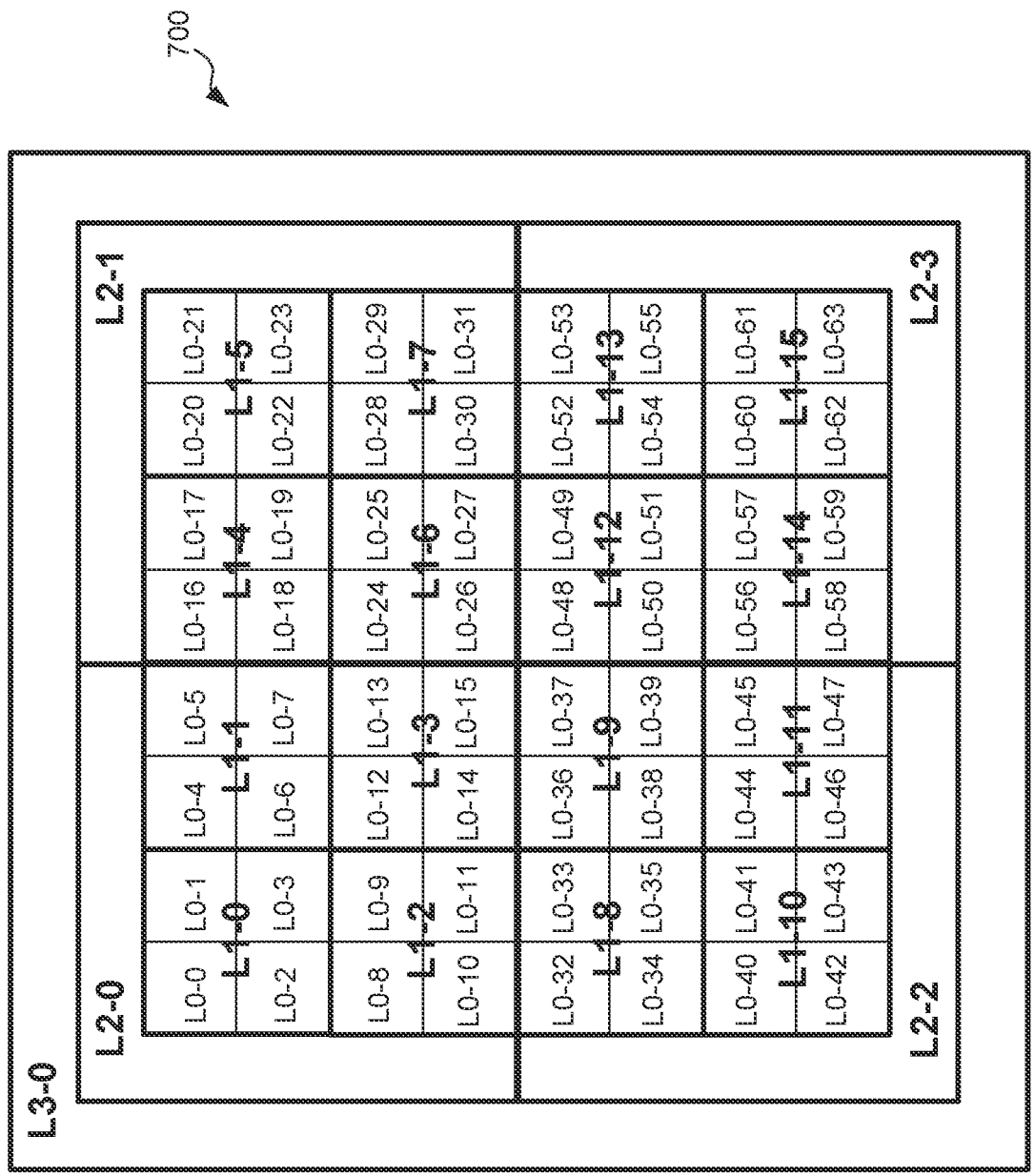
FIG. 7 is a schematic diagram illustrating an example multi-level hierarchy of tile groups for the tiles of FIG. 1.

Reference is now made to FIG. 7 which illustrates an example multi-level hierarchy of tile groups 700 for the 8×8 set of tiles (T0-T63) of FIG. 1 wherein each group of tiles comprises a block of tiles and at each level the block expands by a factor of 2 in both the horizontal and vertical direction. It can be seen in this example there are: sixty-four level 0 groups of 1×1 tiles (L0-0 to L0-63), one for each tile (i.e. L0-0 to L0-63 correspond to T0 to T63 of FIG. 1 respectively); sixteen level 1 groups of 2×2 tiles (L1-0 to L1-15); four level 2 groups of 4×4 tiles (L2-0 to L2-3); and a single level 3 group of 8×8 tiles (L3-0) that comprises all of the tiles.

Figure 8:
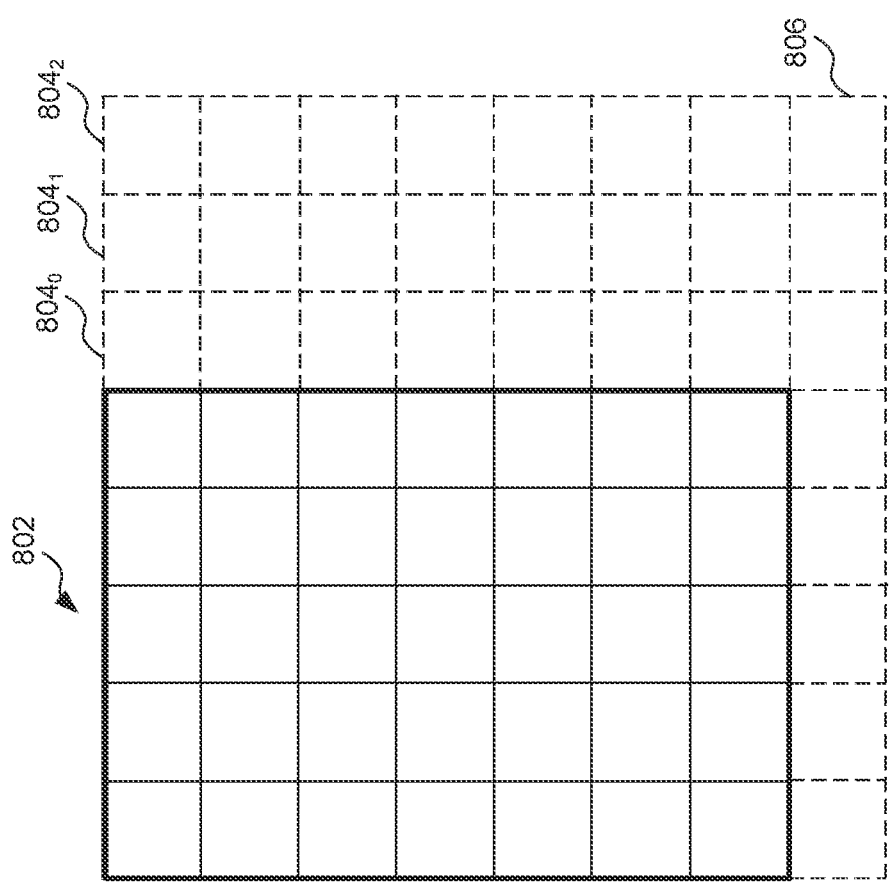
FIG. 8 is a schematic diagram illustrating expanding the tiles in a render space to a square set of tiles with power of two sides.

In some cases, where each level k tile group comprises a $h^k \times h^k$ block of tiles, and the tiles forming the render space do not form a w×q block of tiles wherein both w and q are a power of h then rows and/or columns of phantom tiles may be added to the tiles in the rendering space to generate a w×q block of tiles wherein w and q are a power of h before a multi-level hierarchy of tile groups is generated. The term phantom tile or empty tile is used herein to mean a tile that does not form part of the rendering space. For example, as shown in FIG. 8, if h=2, and the tiles forming the rendering space 802 form a 5×7 block of tiles, three columns $804_0$, $804_1$, $804_2$ and one row 806 of phantom tiles may be added to the tiles forming the rendering space to form an 8×8 block of tiles.

Returning to FIG. 6, once the multi-level hierarchy of tile groups has been generated the method 600 proceeds to step 604.

At step 604, information identifying a primitive block to be tiled is received. A primitive block comprises one or more primitives. In some cases, the information identifying a primitive block may be the location of the primitive block in memory and/or the position data for the primitives in the primitive block. The position data of a primitive may define the position of the primitive in the rendering space. For example, the position data for a primitive may comprise X, Y, and Z co-ordinates in the rendering space for the primitive (although the Z co-ordinates may not be needed for tiling). Once a primitive block has been identified the method proceeds to step 606.

At step 606, the primitive block is associated with one or more tile groups in the hierarchy up to a maximum number of tile groups. The maximum number of tile groups is less than the total number of tiles, and preferably only a small fraction of the number of tiles. The maximum number of tile groups may be one or more than one. The one or more tile groups that a primitive block is associated with is selected so that the primitive block is not associated with more than the maximum number of tile groups, but that if at least one primitive in the primitive block falls, at least partially, within the bounds of a tile, the primitive block is associated with at least one tile group to which that tile belongs. For example, if a primitive block comprises two primitives P0 and P1, and P0 falls completely within tile 10 (T10) of FIGS. 1 and P1 falls completely within tile 39 (T39) of FIG. 1, then the primitive block is associated with at least one of L0-10, L1-2, L2-0 and L3-0 (the tile groups shown in FIG. 7 that include T10) and at least one of L0-39, L1-9, L2-2 and L3-0 (the tile groups shown in FIG. 7 that include T39). Accordingly, the one or more tile groups that a primitive block is associated with may be selected based on the positions of the primitives in that primitive block in the rendering space.

Where a primitive block may only be associated with a single tile group, then the tile group associated with the primitive block may be selected, for example, in accordance with the method 900 described with reference to FIG. 9. This method 900 begins at step 902 where the smallest axis-aligned bounding box encompassing or enclosing all of the primitives in the primitive block is defined. A bounding box may be considered to encompass or enclose all the primitives in a primitive block if the bounding box encompasses or encloses all of the vertices of each primitive in the primitive block. The bounding box may be generated at any granularity. For example, in some cases, the bounding box may be at the X and Y co-ordinate resolution (i.e. the bounding box may be defined by the maximum and minimum X and Y co-ordinates of the vertices). In other cases, the bounding box may be at the tile resolution (i.e. the closest tile edges that encompass or enclose the primitives).

Figure 10:
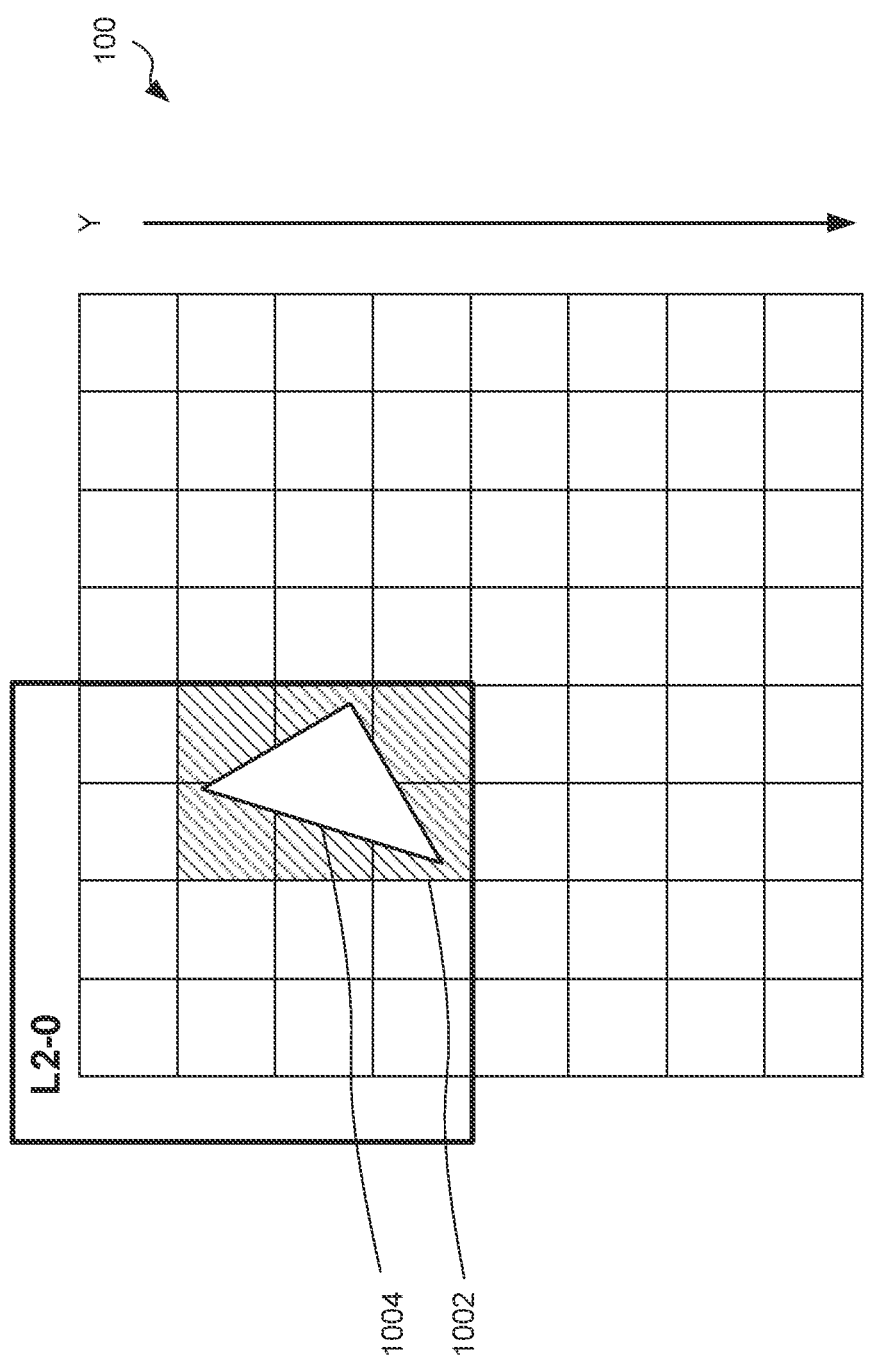
FIG. 10 is a schematic diagram illustrating the tile group that is associated with a first example primitive block in accordance with the method of FIG. 9.
Figure 11:
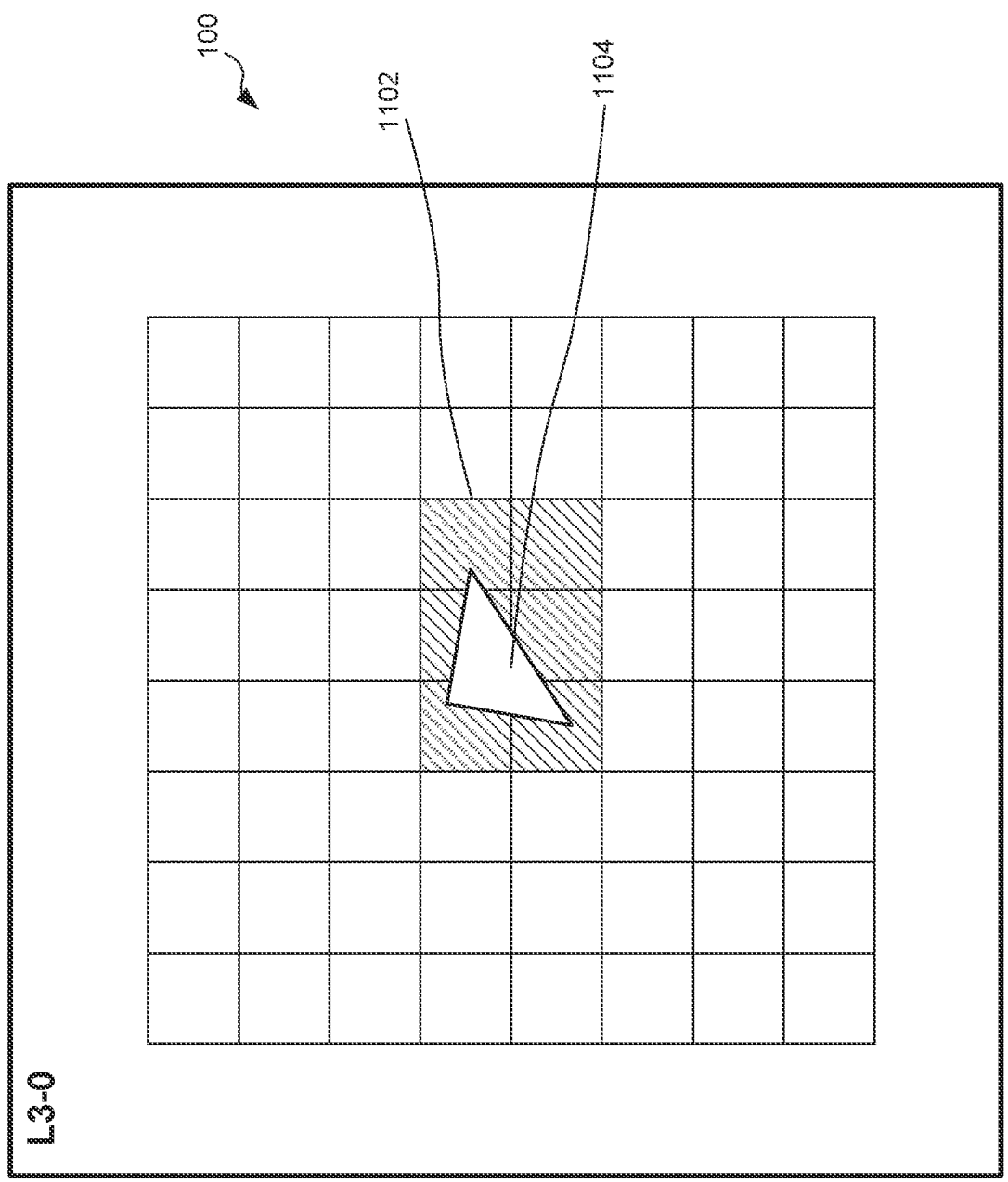
FIG. 11 is a schematic diagram illustrating the tile group that is associated with a second example primitive block in accordance with the method of FIG. 9.

FIGS. 10 and 11 illustrate example tile-resolution bounding boxes for the rendering space 100 of FIG. 1 for two example primitive blocks. Specifically, FIG. 10 illustrates an example tile-resolution bounding box 1002 for a first primitive block comprising a single primitive 1004. It can be seen that the smallest tile-resolution bounding box 1002 that encompasses the primitive 1004 is a 2×3 tile box formed by tiles T6, T7, T12, T13, T14 and T15 (as labelled in FIG. 1). FIG. 11 illustrates an example tile-resolution bounding box 1102 for a second primitive block comprising a single primitive 1104. It can be seen that the smallest tile-resolution bounding box 1102 that encompasses the primitive 1104 is a 3×2 tile box formed by tiles T15, T26, T27, T37, T48 and T49 (as labelled in FIG. 1). Once the bounding box for the primitive block has been defined the method 900 proceeds to step 904.

At step 904, the primitive block is associated with the lowest level tile group in the hierarchy that encompasses the bounding box identified in step 902. For example, the lowest level tile group in the hierarchy of FIG. 7 that encompasses the bounding box 1002 of FIG. 10 is the first level 2 tile group (L2-0) thus the primitive block comprising the primitive 1004 shown in FIG. 10 is associated with the first level 2 tile group (L2-0). Similarly, the lowest level tile group in the hierarchy of FIG. 7 that encompasses the bounding box 1102 of FIG. 11 is the level 3 tile group (L3-0) as it is the only tile group that completely encompasses the bounding box 1102. Therefore the primitive block comprising the primitive 1104 shown in FIG. 11 is associated with the level 3 tile group (L3-0).

Figure 9:
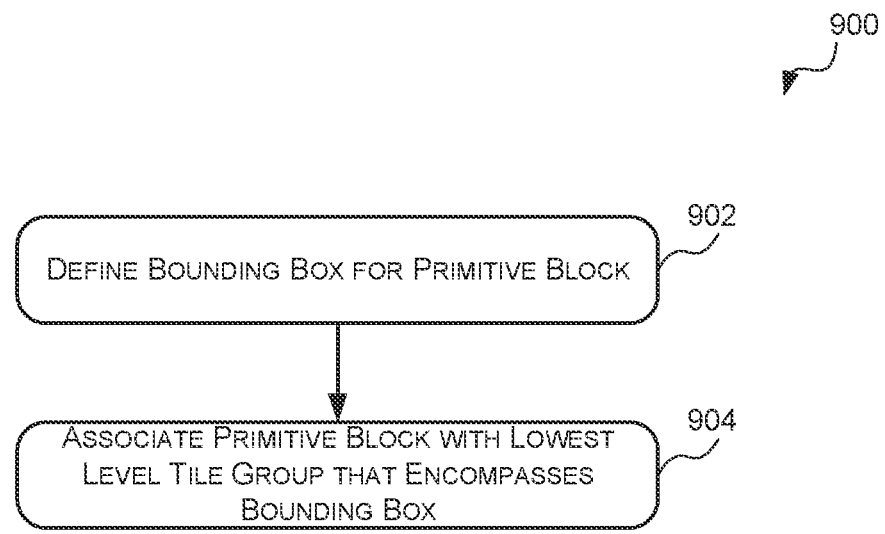

While the method 900 of FIG. 9 is very simple to implement and allows the tiling information to be as small as possible, as each primitive block is associated with only one tile group, it can result in many primitive blocks being associated with a high level group (e.g. the top level tile group comprising all of the tiles) even though the primitive block is only relevant to rendering a few tiles. This can reduce the efficiency of the rasterization logic as it results in the rasterization logic having to process the primitive block entry for that primitive block for each tile in the high level tile group even though the primitives in the primitive block are only relevant to rendering a few tiles. For example, even though the primitive 1104 of FIG. 11 is only relevant to rendering five tiles as it only falls, at least partially, within the bounds of five tiles; it is associated with the level 3 tile group (i.e. the tile group comprising all tiles) which means the primitive block entry for that primitive block will be processed by the rasterization logic for each tile in the rendering space. This issue is most prominent for primitive blocks that comprise a small number of primitives clustered around the centre of the rendering space, which, while only covering a small area of the rendering space, would be associated with the highest level or top level tile group.

In an effort to address this issue, in other cases the maximum number of tile groups that a primitive block may be associated with may be greater than one. For example, in some cases the maximum number of tile groups that a primitive block may be associated with may be g wherein g>1. In some cases, g may be equal to four.

Figure 12:
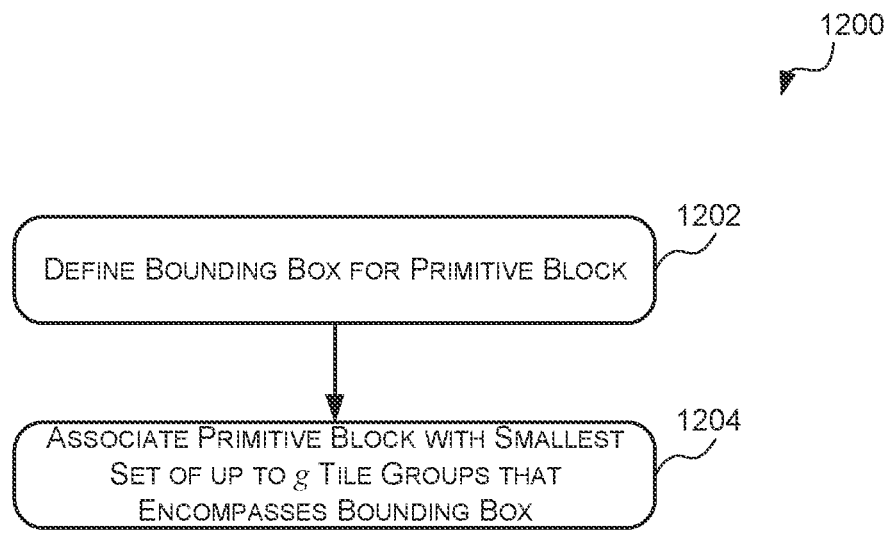

Reference is now made to FIG. 12 which illustrates an example method 1200 for selecting the tile groups to be associated with a primitive block where a primitive block may be associated with up to g tile groups where g>1. The method 1200 begins at step 1202 where the smallest axis-aligned bounding box encompassing or enclosing all of the primitives in the primitive block is defined. Step 1202 generally corresponds to step 902 of the method 900 of FIG. 9 and thus the description of how to generate a bounding box for a primitive block described above with respect to step 902 equally applies to step 1202. Once the bounding box for the primitive block has been defined the method 1200 proceeds to step 1204 where the primitive block is associated with the smallest (e.g. in terms of number of tiles) set of up to g tile groups that encompasses the bounding box.

Figure 13:
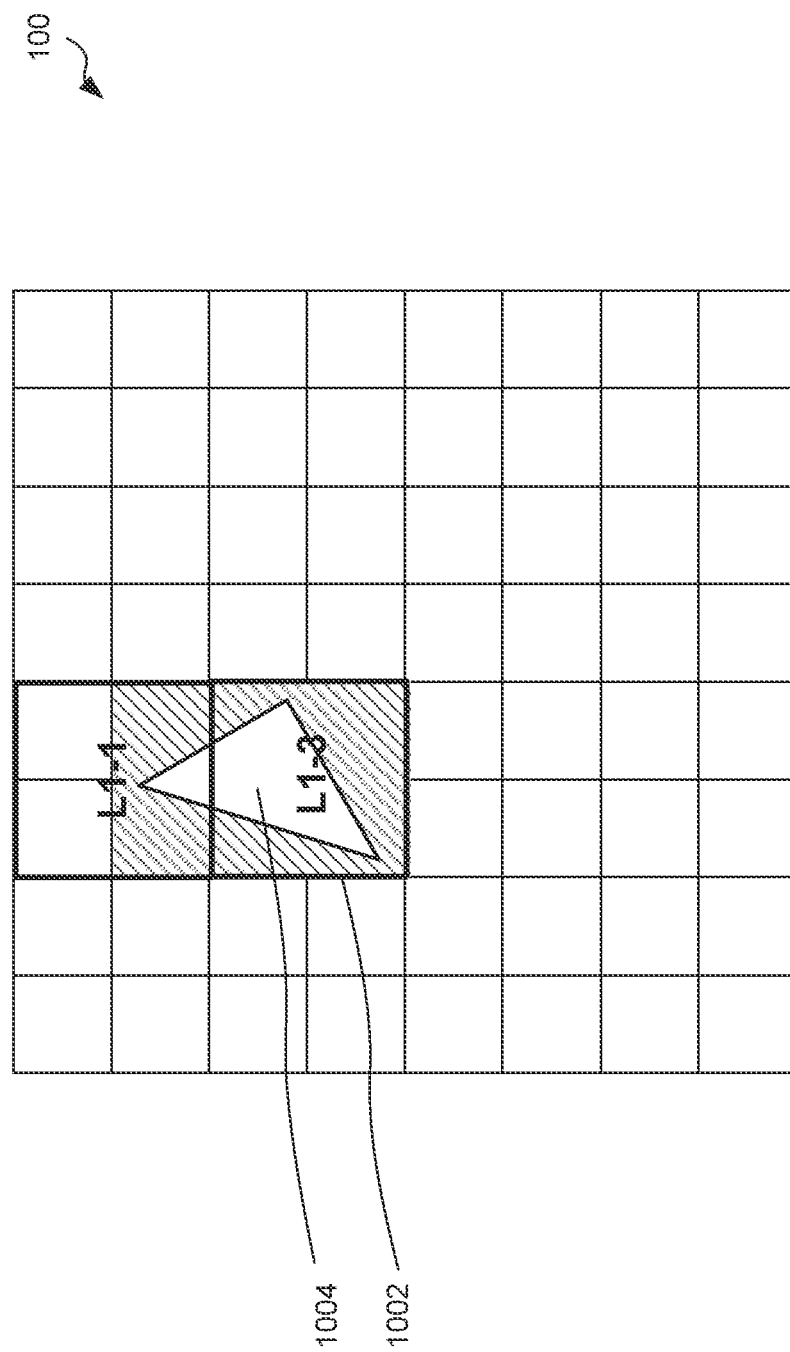
FIG. 13 is a schematic diagram illustrating the tile groups that are associated with the first example primitive block of FIG. 10 in accordance with the method of FIG. 12.
Figure 14:
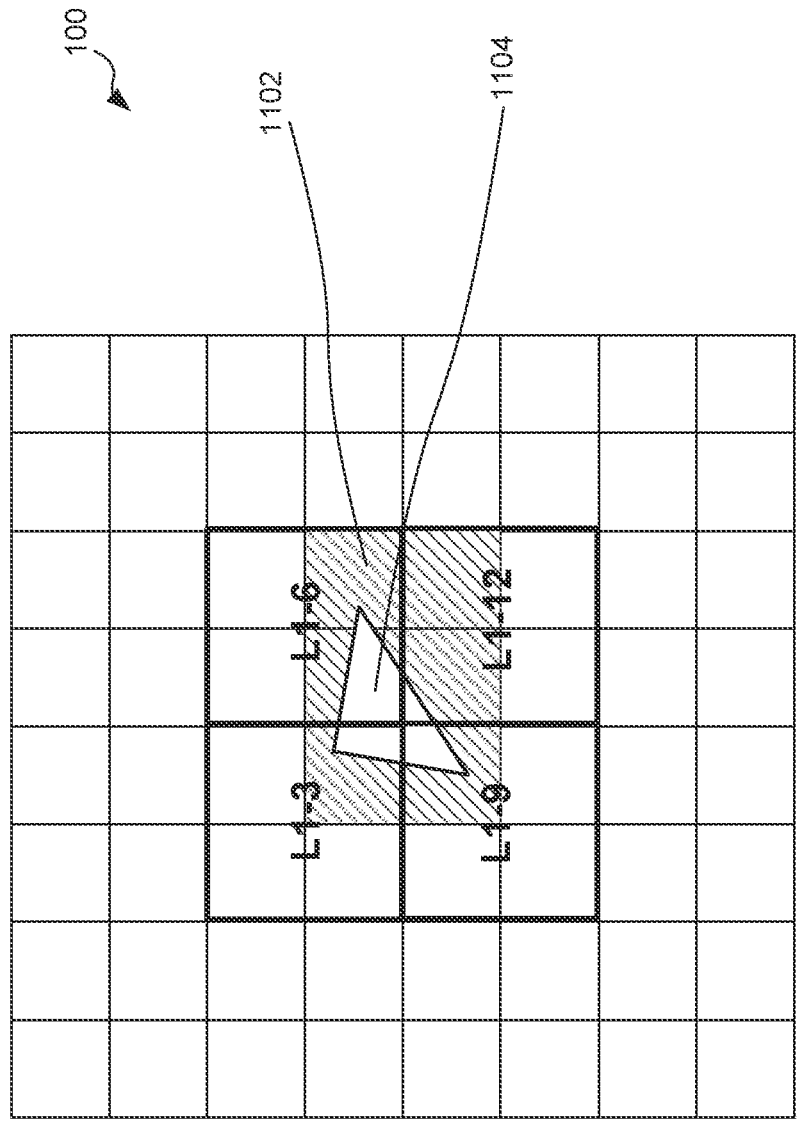
FIG. 14 is a schematic diagram illustrating the tile groups that are associated with the second example primitive block of FIG. 11 in accordance with the method of FIG. 12 when the tile groups are all at the same level in the hierarchy.

In some cases, the set of tile groups that encompasses the bounding box may only comprise tile groups at the same level. In these cases, a primitive block may be associated with the lowest level set of up to g tile groups that encompasses the bounding box of the primitive block. FIGS. 13 and 14 illustrate the lowest level set of up to g tile groups that encompasses the bounding box of example primitive blocks wherein g is equal to 4. Specifically, FIG. 13 shows the primitive block comprising the primitive 1004 of FIG. 10 that has a 2×3 tile-resolution bounding box 1002. In this example, the lowest level set of up to four tile groups that encompasses the bounding box 1002 comprises two level 1 tile groups (L1-1 and L1-3). FIG. 14 shows the primitive block comprising the primitive 1104 of FIG. 11 that has a 3×2 tile-resolution bounding box 1102. In this example, the lowest level set of up to four tile groups that encompasses the bounding box 1102 comprises four level 1 tile groups (L1-3, L1-6, L1-9, and L1-12). Although the primitive block of FIGS. 10 and 13 is associated with fewer tiles in method 1200 (i.e. 16 using method 900 and 8 using method 1200) this comes at the expense of an additional primitive block entry. However, the primitive block of FIGS. 11 and 14 is associated with significantly less tiles when the method 1200 of FIG. 12 is used (i.e. 64 using method 900 and 16 using method 1200).

The lowest level set of up to g tile groups that encompasses the bounding box of a primitive block may be identified by identifying up to g candidate tile groups at the lowest level (e.g. level 0) and determining whether the candidate tile groups at that level encompass the bounding box. If the candidate tile groups do encompass the bounding box, then the primitive block is associated with the candidate tile groups. If the candidate tile groups do not encompass the bounding box, then up to g candidate tile groups at the next level are identified and so on. When g=4 the candidate tile groups at a particular level may be easily identified as the tile groups at the particular level in which the four corners of the bounding box of the primitive block fall. Where each corner of the bounding box falls in a different tile group at the particular level there will be four candidate tile groups at the particular level. When more then one corner lies in the same tile group at the particular level there will be less then four candidate tile groups for the particular level. Although in the example of FIGS. 13 and 14 g=4, it will be evident to a person of skill in the art that this is an example only and in other examples g may be less than or greater than 4.

Figure 15:
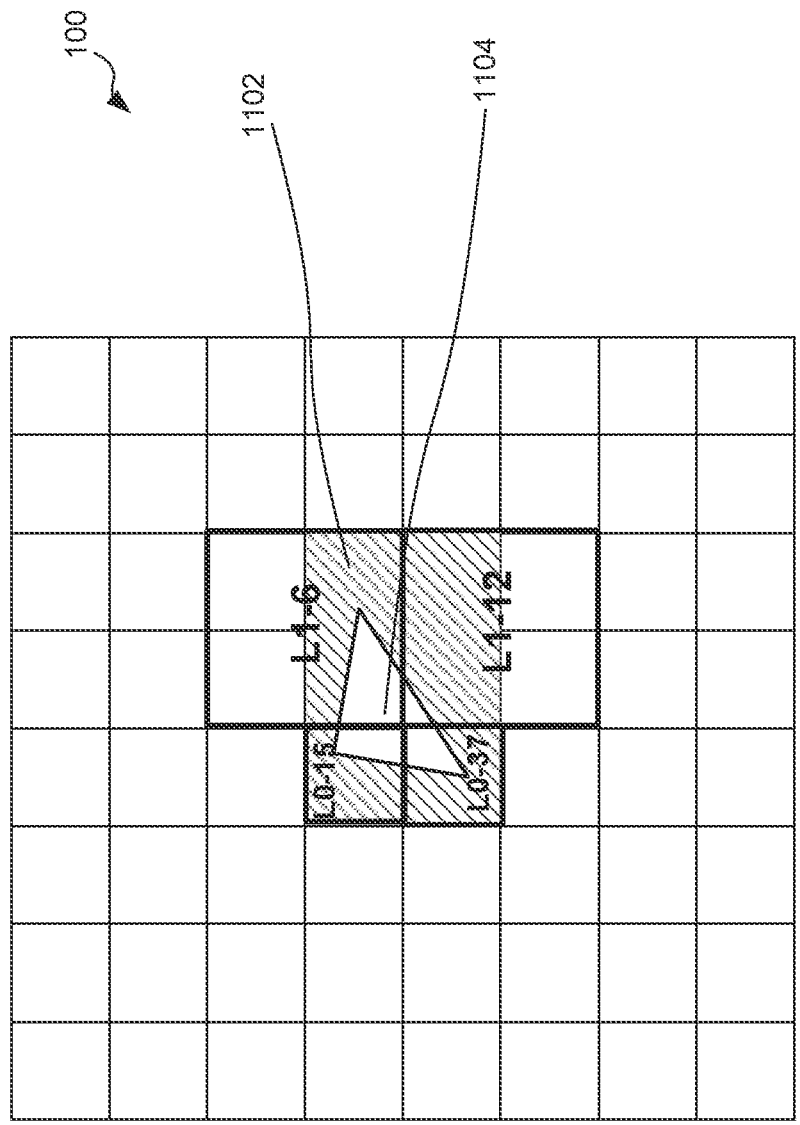
FIG. 15 is a schematic diagram illustrating the tile groups that are associated with the second example primitive block of FIG. 11 in accordance with the method of FIG. 12 when the tile groups are not all at the same level in the hierarchy.

In other cases, the set of up to g tile groups that encompasses the bounding box of a primitive block may comprise tile groups of different levels. For example, FIG. 15 shows the primitive block comprising the primitive 1104 of FIG. 11 that has a 3×2 tile resolution bounding box 1102. In this example, the smallest (in terms of number of tiles) set of up to four tile groups of FIG. 7 that encompasses the bounding box 1102 comprises two level 0 groups (L0-15, L0-37) and two level 1 groups (L1-6 and L1-12). Allowing a primitive block to be associated with tile groups of different levels of the hierarchy may be more complicated to implement but may significantly reduce the number of tiles primitive blocks are associated with. This may increase the efficiency of the rasterization logic as it reduces the number of control stream entries that have to be processed for one or more of the tiles.

This may be implemented by identifying a bounding box for the primitive block (e.g. an axis aligned bounding box that encompasses all of the primitives in the primitive block). Then the lowest level tile group that encompasses the bounding box is selected (i.e. step 904 of method 900). It is then determined whether the percentage of the tiles in that tile group that at least one primitive in the primitive block, at least partially, falls within is above a predetermined threshold. A tile that at least one primitive of a primitive block, at least partially, falls within is referred to herein as a covered tile. If the percentage of the covered tiles is over the predetermined threshold then the primitive block is associated with that tile group. If, however, the percentage of covered tiles in the tile group is less than the predetermined threshold, each of the next lower level tile groups that fall within that tile group are tested. For example, if the initially selected tile group is a Level 2 tile group comprising a 4×4 block of tiles and the number of those tiles that is covered is less than a predetermined threshold, then each Level 1 tile group that falls within that Level 2 tile group will be tested to see if there is sufficient coverage thereof. Any tile group that is not covered at all (i.e. there are no primitives of the primitive block that fall, at least partially, within at least one tile of the tile group) is discarded. The process stops when there is a set of tile groups that are covered above the predetermined threshold and collectively contain all the primitives in the primitive block. The number of tile groups to which a primitive block is associated may be capped at g, for example, by backtracking and merging tile groups until the number of tile groups is less than or equal to g.

In other cases, instead of using the percentage of covered tiles (tiles in which at least one primitive of the primitive block falls, at least partially, within) to determine whether to use a tile group, other criteria may be used to determine whether to associate a tile group with a primitive block or to examine the sub tile-groups therein. For example, in other cases the determination of whether to associate a tile group with a primitive block or to examine the sub-tile groups thereof may be based on the percentage of the tiles in the tile group covered by the bounding box for the primitive block; or the primitive block may be divided into a plurality of primitive sub-blocks wherein each primitive sub-block comprises a subset of primitives, and the determination of whether to associate a tile group with a primitive block or to examine the sub-tile groups thereof may be based on a percentage of the tiles in the tile group covered by the plurality of sub-blocks.

In yet other cases, instead of determining a bounding box for the whole primitive block and identifying a set of one or more tiles groups that cover that bounding box, the primitive block may be divided into a plurality of primitive sub-blocks each comprising a different subset of primitives and the method 900 of FIG. 9 or the method 1200 of FIG. 12 may be used to select one or more tile groups for that primitive sub-block. In such cases a separate bounding box may be identified for each primitive sub-block. This may allow primitive blocks that have a plurality of clusters of primitives in different parts of the rendering space to be associated with lower level tile groups instead of using method 900 or method 1200 for the entire primitive block. This may be more efficient in cases where there is an uneven primitive distribution within the bounding box for the primitive block (e.g. foliage).

It will be evident to a person of skill in the art that these are only examples of methods which may be used to select the tile groups of the hierarchy that a primitive block is associated with, and any suitable method may be used to select the tile groups of the hierarchy that each primitive block is associated with.

Returning to FIG. 6, once the primitive block has been associated with one or more tile groups the method 600 proceeds to step 608.

At step 608, a determination is made as to whether there is at least one more primitive block to be tiled. If it is determined that there is at least one more primitive block to be tiled, then the method 600 proceeds back to step 604 where information identifying the next primitive block is received and step 606 is repeated for that primitive block. If, however, it is determined that there are no more primitive blocks to be tiled then the method 600 proceeds to step 610.

At step 610, a control stream is generated for each tile group of the hierarchy that is associated with at least one primitive block. Each control stream comprises a primitive block entry for each primitive block associated with the corresponding tile group. For example, if a tile group is associated with three primitive blocks then the control stream for that tile group may comprise three primitive block entries. Each primitive block entry comprises information identifying the corresponding primitive block. In some cases, the information identifying a primitive block comprises information indicating the location of the primitive block in memory (e.g. information indicating an address of the primitive block in memory).

As described in more detail below, in some cases a primitive block entry may also comprise information which indicates which tiles in the tile group are valid for the corresponding primitive block. A tile is said to be valid for a primitive block if at least one primitive in the primitive block is relevant for rendering the tile. A primitive may be relevant for rendering a tile if the primitive falls, at least partially, within the bounds of the tile. As described in more detail below, information identifying which tiles in the tile group are valid for the corresponding primitive block may include one or more of a header; bounding box information; and a coverage mask. Without such information each primitive block identified in a control stream may be fetched and processed by the rasterization logic for each tile in the corresponding tile group. In some cases, a primitive block entry may also comprise information which indicates which primitives in the corresponding primitive block are relevant for one or more of the tiles in the tile group. For example, in some cases a primitive block entry may comprise one or more primitive masks for one or more sets of one or more tiles which has a bit for each primitive in the primitive block that indicates whether or not the primitive is relevant to rendering the set of tiles. An example format for a primitive block entry is described with reference to FIG. 18.

In some cases, the control stream may also comprise other types of entries. For example, the control stream may comprise a termination entry that indicates the end of the control stream and/or a link entry which points to the next section or block of the control stream. An example format for the control stream is described with reference to FIG. 16.

Although in the method 600 of FIG. 6 each primitive block to be tiled is associated with one or more tile groups before the control streams are generated for the tile groups, in other cases at least a portion of the control streams may be generated before all of the primitive blocks have been associated with one or more tile groups. For example, in other cases, once a primitive block has been associated with a tile group, a primitive block entry may be added to the control stream for that tile group.

Control Stream

Figure 16:
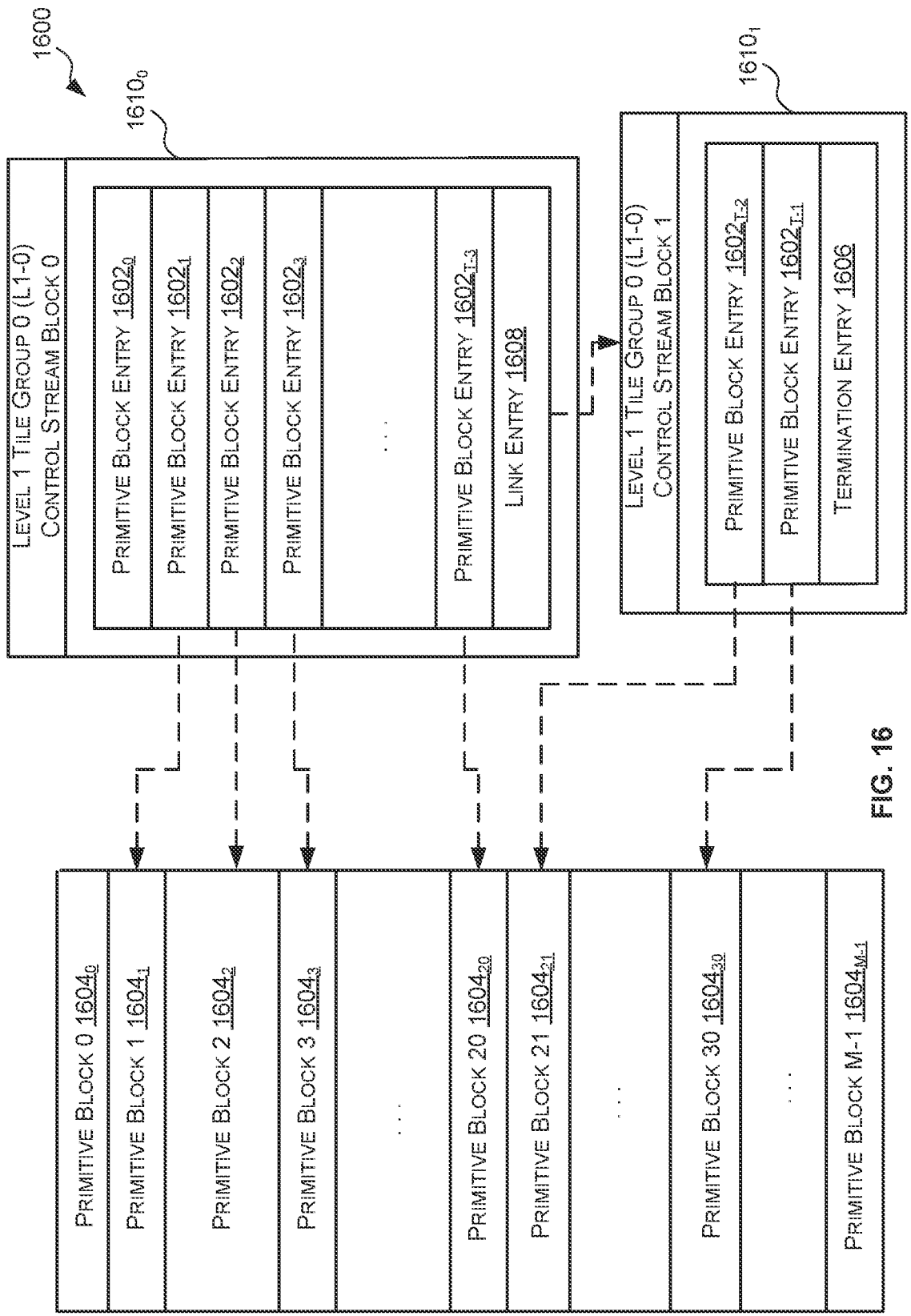
FIG. 16 is a schematic diagram of an example control stream for a tile group.

Reference is now made to FIG. 16 which illustrates an example control stream 1600 for a tile group. In this example, the control stream 1600 comprises a primitive block entry $1602_0$-$1602_{T-1}$ for each primitive block associated with the tile group. For example, if the tile group is associated with T primitive blocks then the control stream 1600 will comprise T primitive block entries. Each primitive block entry $1602_0$-$1602_{T-1}$ comprises information identifying the corresponding primitive block $1604_0$ to $1604_{M-1}$. The information identifying a primitive block $1604_0$ to $1604_{M-1}$ may comprise information identifying the location of the primitive block $1604_0$ to $1604_{M-1}$ in memory. Each primitive block entry $1602_0$-$1602_{T-1}$ may optionally comprise additional information such as, but not limited to, the co-ordinates of the bounding box of the primitive block; a coverage mask indicating which tiles of the tile group that intersect the bounding box of the primitive block are relevant to the primitive block; and/or one or more primitive masks indicating which primitives of the primitive block are relevant for one or more tiles in the tile group. An example format for a primitive block entry is described with reference to FIG. 18.

In some cases, as shown in FIG. 16, in addition to the primitive block entries $1602_0$-$1602_{T-1}$ the control stream 1600 may optionally comprise one or more other types of entries. Each of the other control stream entry types may be used to convey different information. For example, as shown in FIG. 16 the control stream may comprise a termination entry 1606 and/or one or more link entries 1608. It will be evident to a person of skill in the art that these are examples of other control stream entry types and that in other examples the control stream may comprise: only a subset of these control stream entry types; additional control stream entry types; and/or different types of control stream entries.

Where, as in FIG. 16, the control stream 1600 may comprise multiple types of entries, each entry may have a dedicated field (e.g. a dedicated number of bits) which is used to identify the type of entry. For example, in some cases, K bits of each entry (which may be referred to herein as the entry type bits) may be used to identify the type of entry wherein K is based on the number of different types. For example, in some cases K may be equal to $\lceil \log_2 H \rceil$ wherein H is the number of different control stream entry types. In some cases, the entry type bits may be the first K bits of each entry.

Table 1 illustrates an example of how a primitive block entry, a link entry and a termination entry may be identified using two entry type bits. Specifically, if the two entry type bits are set to '00' this may identify the entry as a primitive block entry, if the two entry type bits are set to '01' this may identify the entry as a link entry, and if the two entry type bits are set to '10' this may identify the entry as a termination entry.

TABLE 1

| Control Stream Entry Type | Entry Type Bits |
| --- | --- |
| Primitive Block Entry | 0 0 |
| Link Entry | 0 1 |
| Termination Entry | 1 0 |

In some cases, as shown in FIG. 16, the control stream 1600 may be divided into a sequence of control stream blocks $1610_0$, $1610_1$ which are stored separately in memory. Each control stream block may have a maximum size (e.g. 32 dwords). Where the control stream 1600 is divided into a sequence of control stream blocks, the control stream may comprise one or more link entries 1608 which link the control stream blocks together. Specifically, each link entry 1608 may specify an address of, or a pointer to, the next control stream block in the sequence. For example, in FIG. 16 the link entry 1608 in the first control stream block $1610_0$ (Control Stream Block 0) would include the address of, or a pointer to, the second control stream block $1610_1$ (Control Stream Block 1). When the rasterization logic encounters a link entry 1608 in a control stream block it may trigger the rasterization logic to read, using the specified address or pointer, the next control stream block from memory.

In some cases, as shown in FIG. 16, the link entry 1608 may be the last entry in each control stream block, other than for the last control stream block. In some cases, the rasterization logic may be able to read a whole control stream block at a time. For example, in some cases where a control stream block is 32 dwords the memory may support 4-beat burst reads wherein each burst is 256 bits or 32 bytes. In other cases, the rasterization logic may only be able to read a portion of a control stream block at a time.

In some cases, the last entry of a control stream may be a termination entry 1606 which signals to the rasterization logic the end of the control stream. Specifically, when the rasterization logic encounters a termination entry 1606 it may complete the processing of the current control stream.

Tile Group Headers and Tail Pointers

Figure 17:
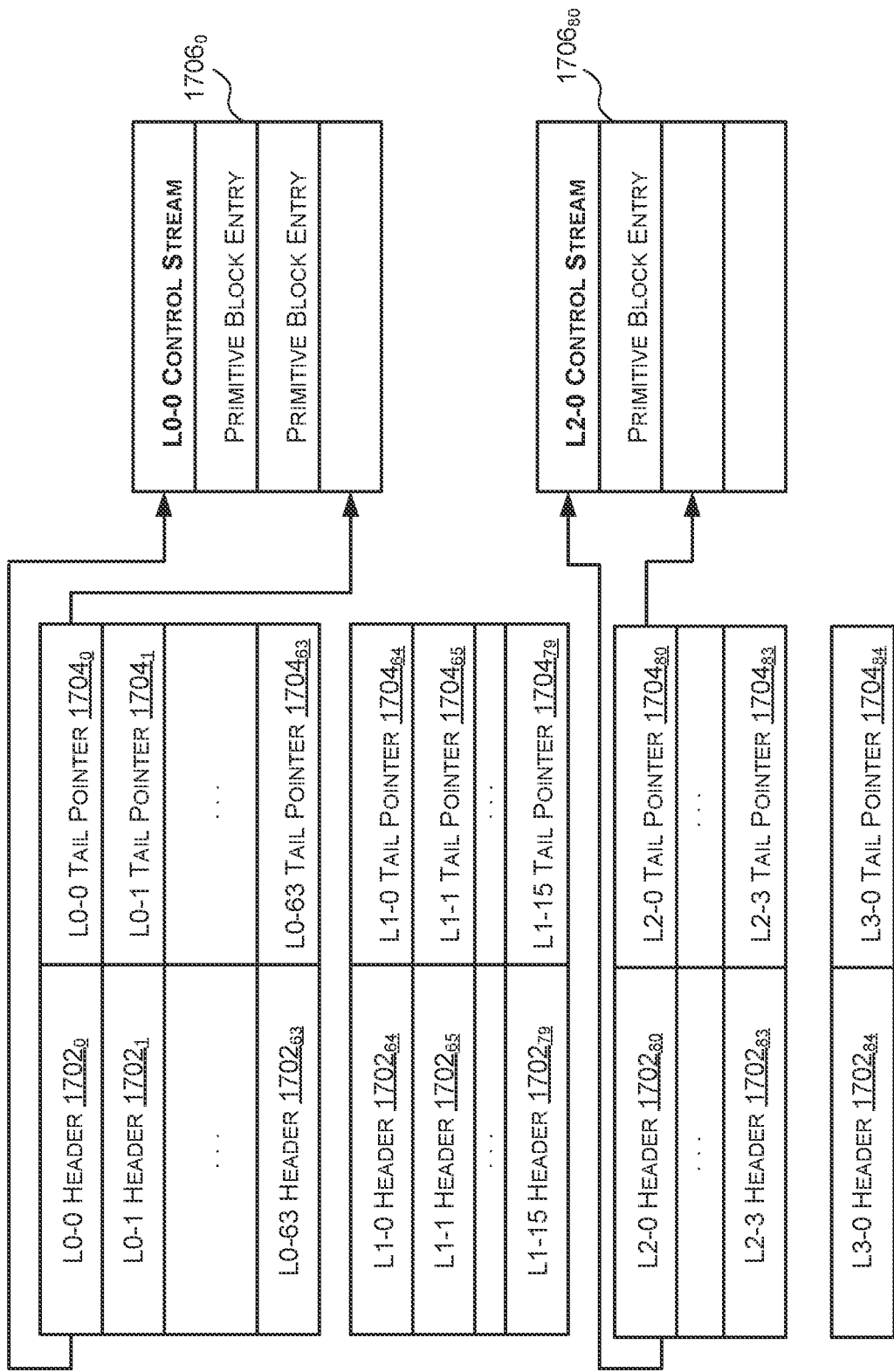
FIG. 17 is a schematic diagram of example header and tail pointers for the tile groups in the hierarchy of FIG. 7.

In some cases, a header and a tail pointer may be stored in memory for each tile group of the hierarchy. For example, FIG. 17 illustrates an example set of headers $1702_0$ to $1702_{84}$ and tail pointers $1704_0$ to $1704_{84}$ for the tile group hierarchy of FIG. 7. It can be seen that there is a header $1702_0$ to $1702_{84}$ and a tail pointer $1704_0$ to $1704_{84}$ for: each of the sixty-four level 0 groups, each of the sixteen level 1 groups, each of the four level 2 groups and the level 3 group. In some cases, each level may be allocated a section of memory where the headers and tail pointers for the tile groups of that level are stored. Accordingly, the amount of memory allocated to each level for storing the header and tail pointers may be based on the number of groups in that level. In general, lower levels have more groups than higher levels and will thus require more memory to store its headers and tail pointers.

Each header $1702_0$ to $1702_{84}$ comprises information indicating the location in memory of the control stream for the corresponding tile group. For example, as shown in FIG. 17, the header $1702_0$ for the first level 0 group (L0-0) points to the location in memory of the L0-0 control stream $1706_0$, and the header $1702_{80}$ for the first level 2 group (L2-0) points to the location in memory of the L2-0 control stream $1706_{80}$. In some cases, each header $1702_0$ to $1702_{84}$ may comprise an address (e.g. a 32-bit address) in memory of the control stream for the corresponding tile group. In some cases, each header $1702_0$ to $1702_{84}$ may comprise additional information, such as, but not limited to, valid information (e.g. a 1 bit valid flag) which indicates that the information identifying the location in memory of the control stream is valid. In some cases, the information identifying the location of the control stream is deemed valid if there is a control stream in memory for the corresponding tile group (e.g. if there is at least one primitive block entry stored for the tile group).

Each tail pointer $1704_0$ to $1704_{84}$ comprises information indicating (or pointing to) the location in memory of the current end of the control stream for the corresponding tile group. In other words, each tail pointer $1704_0$ to $1704_{84}$ comprises information indicating the location in memory where the next entry in the control stream is to be stored. For example, as shown in FIG. 17, the tail pointer $1704_0$ for the first level 0 group (L0-0) points to the location in memory where the next entry of the L0-0 control stream $1706_0$ is to be written. Specifically, the L0-0 control stream $1706_0$ comprises two primitive block entries and the tail pointer points to the next addressable location in memory following those primitive block entries. Similarly, the tail pointer $1704_{80}$ for the first level 2 group (L2-0) points to the location in memory where the next entry of the L2-0 control stream $1706_{80}$ is to be written. Specifically, the L2-0 control stream $1706_{80}$ comprises one primitive block entry and the tail pointer $1704_{80}$ points to the next addressable location in memory following that primitive block entry. In some cases, each tail pointer $1704_0$ to $1704_{84}$ may comprise an address (e.g. a 32-bit address) in memory where the next entry for the control stream for the corresponding tile group is to be stored.

In some cases, each tail pointer $1704_0$ to $1704_{84}$ may, optionally, comprise additional information, such as, but not limited to, state information (e.g. a 15-bit state field), valid information (e.g. a 1 bit valid flag) and/or primitive block base address information (e.g. an 18-bit primitive block base address field). Each primitive block may be associated with state data that describes how the primitives in the primitive block are to be rendered. The state data can be described as identifying the recipe for rendering the primitives in the primitive block. For example, state data may include, but is not limited to, information identifying a depth compare mode, a blending state, a texture state, and/or a primitive type. The state information may comprise information that identifies the state data for one or more primitive blocks associated with the group of tiles. In some cases, the state information may comprise the state data for the last primitive block associated with the tile group so that the system will be able to determine when the state data changes. The valid information may indicate whether the information identifying the location in memory of the current end of the control stream for the corresponding tile group is valid. The information identifying the location in memory of the current end of the control stream for the corresponding tile group may be deemed valid if there is at least one entry in the control stream. As described in more detail below, the primitive block base address information may comprise information (e.g. a partial address) which is used in combination with information in the primitive block entries to identify the location of the primitive blocks relevant to rendering the tiles in the tile group. For example, the primitive block base address may comprise the first 18-bits of an address for a primitive block and the remainder of the address of a primitive block may be provided in the corresponding primitive block entry.

Where there is a header $1702_0$ to $1702_{84}$ and a tail pointer $1704_0$ to $1704_{84}$ for each tile group of the hierarchy, the control stream for a tile group may be generated by, once a primitive block has been associated with the tile group: generating a primitive block entry for that primitive block, reading the tail pointer to identify the location in memory where the primitive block entry is to be stored, writing the primitive block entry to the identified location in memory, and updating the tail pointer to point to the next addressable block of memory following the newly added primitive block entry.

In some cases, the memory for storing the control stream for a tile group may be dynamically allocated. In these cases, when a primitive block is associated with a tile group, before reading the tail pointer, it may be first determined whether this is the first primitive block associated with the tile group. For example, it may be determined that this is the first primitive block associated with the tile group if the valid bit of the header for that tile group indicates that the information identifying the location of the control stream in memory is not valid. If it is determined that this is not the first primitive block to be associated with the tile group then the method outlined in the previous paragraph is followed (i.e. the tail pointer is read, the primitive block entry is written to the address identified by the tail pointer, and the tail pointer is updated to point to the next block of memory). If, however, it is determined that this is the first primitive block associated with the tile group then an address in memory for storing the control stream for the tile group may be requested (e.g. from a memory manager or the like). Once an address for storing the control stream for the tile group is received the header may be updated to reflect the allocated address and (if a valid bit) the valid bit may be set to indicate that the information identifying the location of the control stream in memory is valid. The primitive block entry for the primitive block associated with the tile group is then written to that location, and the tail pointer is updated to identify the next addressable location in memory following the primitive block entry. Where the tail pointer comprises a valid bit the valid bit of the tail pointer may then be set to indicate that the information in the tail pointer identifying the current end of the control stream for the corresponding tile group is valid.

In some cases, where the memory used to store a control stream is dynamically allocated in blocks (e.g. the control stream is stored in linked blocks), updating the tail pointer may comprise incrementing the tail pointer to the next location in memory and if it is determined that the incremented tail pointer points to the last position in the current block of memory, obtaining the address of another block of memory (e.g. from the memory manager or the like), writing a link entry (that comprises the address of the new block) to the address pointed to by the tail pointer, and then updating the tail pointer to point to the first location in the new block of memory.

Primitive Block Entry

Figure 18:
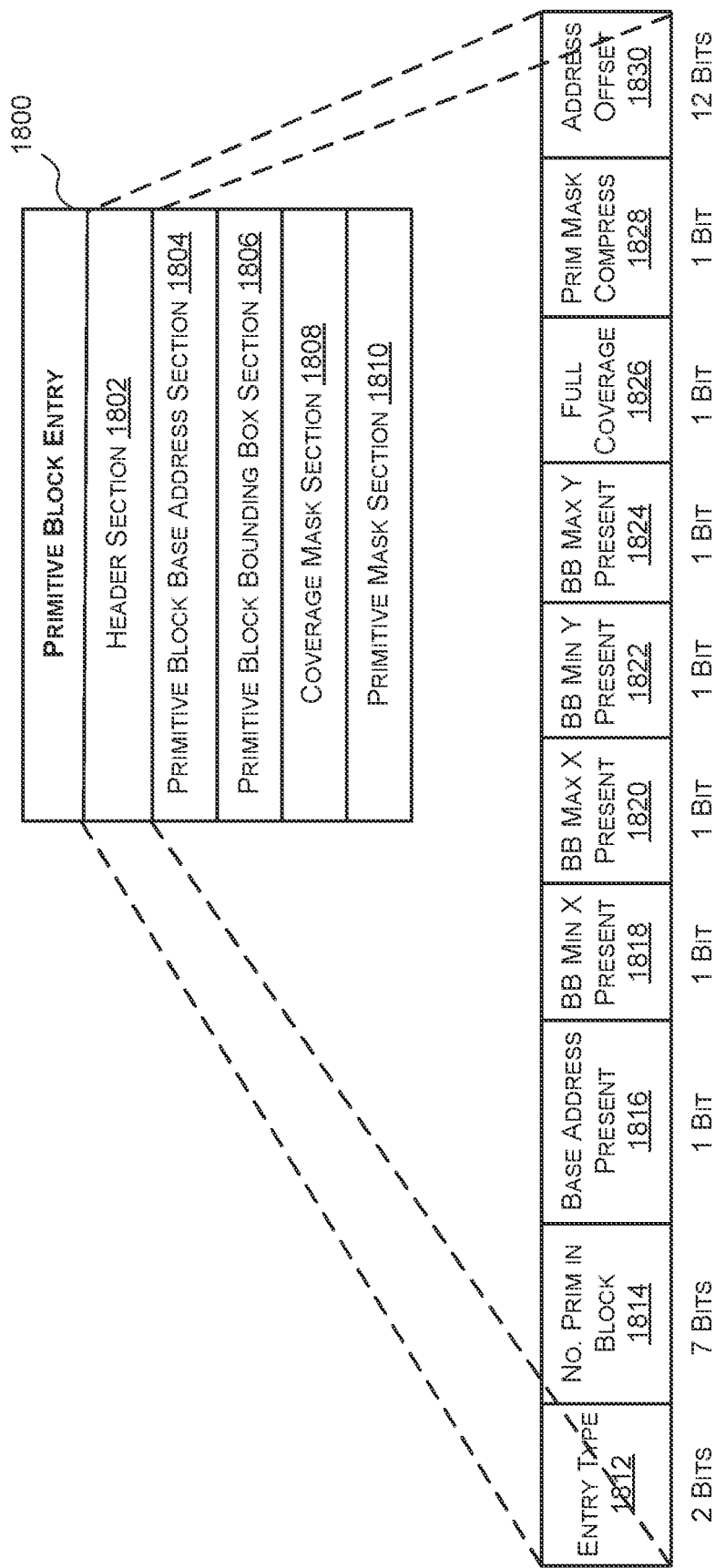
FIG. 18 is a schematic diagram of an example primitive block entry.

Reference is now made to FIG. 18 which illustrates an example format for a primitive block entry 1800 which may be used to implement any of the primitive block entries described herein. As described above, the control stream for a tile group comprises a primitive block entry for each primitive block that is associated with that tile group. Each primitive block entry comprises information identifying the corresponding primitive block which indicates that that primitive block is relevant for rendering at least one of the tiles in the tile group. In some cases, the information identifying a primitive block is information identifying an address of the primitive block in memory.

In the example of FIG. 18, the primitive block entry 1800 comprises a header section 1802, and optionally comprises a primitive block base address section 1804, a primitive block bounding box section 1806, a coverage mask section 1808, and/or a primitive mask section 1810. It will be evident to a person of skill in the art that this is an example only and that other primitive block entries may comprise another combination of these sections and/or additional or different sections.

The header section 1802 comprises information about the primitive block entry 1800 and/or the corresponding primitive block, such as, but not limited to the optional sections that are present in the primitive block entry 1800 and/or the number of primitives in the primitive block. For example, as shown in FIG. 18 the header section 1802 may comprise: an entry type field 1812; a number of primitives in the block field 1814; a base address present field 1816; a bounding box (BB) minimum X present field 1818; a bounding box (BB) maximum X present field 1820; a bounding box (BB) minimum Y present field 1822; a bounding box (BB) maximum Y present field 1824; a full coverage field 1826; a primitive mask compression field 1828; and an address offset field 1830. It will be evident to a person of skill in the art that this is an example list of information that may be in the header and that in other examples the header may comprise different and/or additional information. In this example, the header section 1802 is 28 bits and thus fits within a 4 bytes dword (i.e. 32 bits), however, it will be evident to a person of skill in the art that this is an example only and that the header section may have any number of bits.

The entry type field 1812 identifies the entry as a primitive block entry (e.g. versus a termination entry or a link entry). For example, as described above with respect to FIG. 16, the entry type field may be a 2-bit field, which, when set to '00' (binary) indicates that the entry is a primitive block entry.

The number of primitives in the block field 1814 indicates the number of primitives in the corresponding primitive block. The number of primitives in the block field 1814 may be configured to hold a binary number that indicates the number of primitives in the primitive block. The number of bits allocated to the number of primitives in the block field 1814 may be based on the maximum number of primitives that can be in a primitive block. In the example shown in FIG. 18 the number of primitives in the block field 1814 is seven bits which indicates the maximum number of primitives in the primitive block is 128. It will be evident, though, to a person of skill in the art that this is an example only and that the number of primitives in the block field may comprise a different number of bits.

In the example of FIG. 18, the primitive block entry 1800 comprises information identifying an address of the corresponding primitive block in memory. The address may be identified in the primitive block entry by including a w-bit address in the primitive block base address section 1804 and/or specifying an h-bit offset (e.g. in the header section 1802) relative to a primitive block base address, wherein h is less than w. In some cases, w may be equal to the length W of the complete address of a primitive block in memory, and in other cases, w may be less than W, with, for example, a number (W−w) of implied zero bits in the least significant positions. In some cases, the rasterization logic is configured to, each time a primitive block entry comprises a primitive block base address section 1804, make the address specified therein the current primitive block base address, and calculate the complete address from the current primitive block base address and the offset (e.g. by summing or otherwise combining them). Where the complete address can be generated as an offset from the current primitive block base address then the primitive block entry may not comprise a primitive block base address section. In some cases, as described above, the header for a tile group may specify an initial primitive block base address. In these cases, the rasterization logic may be configured to initially set the current primitive block base address to the address specified in the corresponding header. This allows even the first primitive block in a control stream to be identified by only an offset. Identifying the address of a primitive block in memory via an offset, rather than the whole address can reduce the size of the primitive block entry for that primitive block.

If the primitive block entry 1800 comprises a primitive block base address section 1804 then the base address present field 1816 may be set or configured to indicate that the primitive block entry comprises a primitive block base address section 1804. In some cases, the base address present field 1816 is a single bit that may be set to one value (e.g. '1') when the primitive block entry comprises a primitive block base address section 1804, and set to a different value (e.g. '0') when the primitive block entry 1800 does not comprise a primitive block base address section 1804.

In the example of FIG. 18, if the bounding box for the primitive block is not greater than or equal to the area of the rendering space covered by the tiles in the tile group then one or more co-ordinates of the bounding box may be included in the primitive block entry 1800 in, for example, the primitive block bounding box section 1806. The bounding box for a primitive block can be defined by four co-ordinates: the minimum X value, the maximum X value, the minimum Y value and the maximum Y value in the rendering space. The bounding box minimum/maximum X/Y present fields 1818, 1820, 1822, 1824 are used to indicate whether the minimum X co-ordinate, maximum X co-ordinate, minimum Y co-ordinate and maximum Y co-ordinate respectively are included in the primitive block entry (e.g. in the primitive block bounding box section 1806). As described in more detail below, in some cases a bounding box co-ordinate (minimum X, maximum X, minimum Y, maximum Y) may not be included if it falls outside the area of the rendering space covered by the tiles in the tile group. For example, if the maximum X value of the tiles in the tile group is 10 and the maximum X value for the bounding box for the primitive block is 20 then the maximum X value for the bounding box may not be included in the primitive block entry.

In some cases, each of the bounding box present fields 1818, 1820, 1822, 1824 fields may be a single bit which is set to one value (e.g. '1') if the corresponding co-ordinate is included in the primitive block entry, and set to another value (e.g. '0') if the corresponding co-ordinate is not included in the primitive block entry 1800. If all of the bounding box present fields 1818, 1820, 1822 and 1824 indicate that the corresponding bounding box co-ordinate is not included in the primitive block entry 1800 then this may indicate that the primitive block entry 1800 does not include a primitive block bounding box section 1806. In contrast, if at least one of the bounding box present fields 1818, 1820, 1822, 1824 indicates that the corresponding bounding box co-ordinate is included in the primitive block entry 1800 then this may indicate that the primitive block entry 1800 comprises a primitive block bounding box section 1806.

The full coverage field 1826 indicates whether all of the tiles of the tile group are valid for the corresponding primitive block. A tile is considered to be valid for a primitive block if there is at least one primitive in the primitive block that falls, at least partially, within the bounds of the tile. A tile that is valid for a primitive block may also be referred to as a covered tile with respect to the primitive block. A level 0 tile group only comprises a single tile and so the full coverage field 1826 for a level 0 group may always be set to indicate that all the tiles of the tile group are valid for the corresponding primitive block. If the full coverage field 1826 indicates that there is at least one tile in the tile group that is not valid for the corresponding primitive block then the primitive block entry 1800 may comprise a coverage mask section 1808 which, together with the primitive block bounding box information, indicates which tiles of the tile group are valid for the corresponding primitive block. Accordingly, the full coverage field 1826 may indicate whether the primitive block entry 1800 comprises a coverage mask section 1808. In some cases, the full coverage field 1826 may comprise a single bit that is set to one value (e.g. '1') when all the tiles of the tile group are valid for the corresponding primitive block, and set to another value (e.g. '0') when at least one of the tiles of the tile group is not valid for the corresponding primitive block.

The primitive mask compression field 1828 indicates whether or not the one or more primitive masks in the primitive mask section 1810 have been compressed. In some cases, the primitive mask compression field 1828 may comprise a single bit that is set to one value (e.g. '1') when the primitive masks in the primitive mask section 1810 have been compressed, and set to another value (e.g. '0') when the primitive masks in the primitive mask section 1810 have not been compressed.

As described above, the address of the corresponding primitive block in memory may be identified by: (i) a w-bit address in the primitive block base address section 1804; and/or (ii) an h-bit offset in the address offset field 1830. Specifically the address of the primitive block in memory is generated from a combination of a primitive block base address (e.g. which may be the most recent w-bit address specified in the control stream or a base address specified in the header for the tile group) and an offset from that base address (e.g. which may be the h-bit offset in the address offset field 1830). In the example of FIG. 18 the address offset field 1830 is twelve bits, however, it will be evident to a person of skill in the art that this is an example only and that the address offset field 1830 may be any suitable length.

The primitive block base address section 1804 comprises a w-bit address from which the W-bit address of the corresponding primitive block in memory can be generated, wherein W is the number of bits of a complete address for a primitive block in memory. For example, the primitive block base address section may comprise a 32-bit address where the complete address for a primitive block in memory is greater than, or equal to, 32 bits. As described above, the primitive block base address section 1804 is an optional section in a primitive block entry. Where a primitive block entry comprises a primitive block base address section the w-bit address provided therein: (i) is combined with the h-bit offset provided in the address offset field 1830 of the header section 1802 to generate the W-bit address of the corresponding primitive block in memory, wherein h is less than w; and (ii) becomes the new primitive block base address. When a primitive block entry comprises a primitive block base address section 1804 the address offset field 1830 may be set to zero.

The primitive block bounding box section 1806 comprises information identifying one or more co-ordinates of the bounding box for the corresponding primitive block. As described above, the bounding box for a primitive block may be defined by the following co-ordinates: minimum X co-ordinate, maximum X co-ordinate, minimum Y co-ordinate and maximum Y co-ordinate in the rendering space. In some cases, the primitive block entry may include any bounding box co-ordinate that lies within the area of the rendering space covered by the tiles in the tile group. In other words, any bounding box co-ordinate that lies on or outside the bounds of the area of the rendering space covered by the tiles in the tile group may not be included in the primitive block entry. For example, in FIG. 10 if X increases from left to right and Y increases from top to bottom, then the maximum X co-ordinate and the maximum Y co-ordinate of the bounding box 1002 lie on the edge of, but do not lie within, the area of the rendering space covered by the tiles in group L2-0 so they may not be included in the primitive block entry 1800 (e.g. the primitive block bounding box section 1806 thereof). However, the minimum X co-ordinate and the minimum Y co-ordinate of the bounding box 1002 do lie within the area of the rendering space covered by the tiles in group L2-0 so they may be included in the primitive block entry 1800 (e.g. in the primitive block bounding box section 1806 thereof).

In some cases, each bounding box co-ordinate that is included in the primitive block bounding box section 1806 may be identified as an offset (e.g. in terms of tiles) from the corresponding co-ordinate defining the area of the rendering space covered by the tiles in the tile group. Therefore the number of bits to represent the offset may differ for each tile group level and may be based on the number of tiles in the tile group. For example, if a tile group (such as a Level 1 tile group) comprises a 2×2 block of tiles and the bounding box of a primitive block is specified in tile granularity, a co-ordinate of the bounding box may only be 1 tile offset from the corresponding tile group co-ordinate. Therefore, in this example, a single bit may be used to represent each bounding box co-ordinate.

In some cases, the information identifying each co-ordinate may be placed in the primitive block bounding box section 1806 in the same order as the corresponding bounding box present fields in the header section 1802. For example, in the header section 1802 of FIG. 18 the bounding box minimum X present field 1818 is first, followed by the bounding box maximum X present field 1820, the bounding box minimum Y present field 1822 and the bounding box maximum Y present field 1824. In this example the information identifying the minimum X co-ordinate may then be placed first in the primitive block bounding box section 1806 followed by the information identifying the maximum X co-ordinate, the information identifying the minimum Y co-ordinate, and the information identifying the maximum Y co-ordinate.

The coverage mask section 1808 comprises information indicating which tiles in the tile group that overlap with, or intersect, the bounding box of the primitive block are valid for the corresponding primitive block. As described above, a tile is valid for a primitive block if at least one primitive in the primitive block falls, at least partially, within the bounds of the tile. The information indicating which tiles in the tile group that overlap with the bounding box of the primitive block are valid for the primitive block may be in the form of a coverage mask. In some cases, the size of the coverage mask may vary between tile groups, so the coverage mask may be preceded in the coverage mask section 1808 by information (e.g. a byte) identifying the size of the coverage mask. As described above, in some cases a primitive block entry 1800 may only comprise a coverage mask section 1808 if the tile group is not completely covered (i.e. not every tile of the tile group is valid for the corresponding primitive block). A detailed description of an example format for the coverage mask and the generation thereof is described below.

The primitive mask section 1810 comprises information identifying the primitives of the corresponding primitive block that are relevant for rendering one or more sets of one or more tiles in the tile group. A primitive may be relevant for rendering a set of one or more tiles if that primitive falls, at least partially, within the area of the rendering space covered by the set of tiles. The information identifying the primitives that are relevant for rendering a set of one or more tiles may comprise a primitive mask that comprises a bit for each primitive in the primitive block which indicates whether that primitive is relevant for rendering the set of tiles. A primitive mask may be generated by determining, using a tiling method, whether a primitive falls within the area of the rendering space covered by the tiles in the set.

As described in more detail below, the coverage mask may be implemented as a hierarchical coverage mask that comprises information for successively smaller and smaller areas of a block of relevant tiles. In some cases, the primitive mask section may comprise a primitive mask for the smallest areas identified in the coverage mask as being valid for the primitive block. In some cases, the smallest areas may be tiles. In these cases, the primitive mask section may comprise a primitive mask for each valid tile for the primitive block. However, in other cases the smallest areas may each comprise a plurality of tiles. For example, the coverage mask may only comprise information for each 2×2 block of tiles within the block of relevant tiles. In these cases, the primitive mask section may comprise a primitive mask for each 2×2 block of tiles in the block of relevant tiles that is identified as being valid for the primitive block. In some cases, the primitive masks may be stored in the primitive mask section in the same order as the corresponding information in the coverage mask. For example, if the information is stored in the coverage mask according to a Z-order curve, the primitive masks may be stored in the primitive mask section according to a Z-order curve.

In other cases, the information identifying the primitives of the corresponding primitive block that are relevant for rendering one or more sets of one or more tiles in the tile group may comprise a mask for each primitive in the primitive block that comprises a bit for each set of one or more tiles which indicates whether the primitive is relevant to at least one tile in that set of tiles. In some cases, there may be a bit for each of the smallest areas identified in the coverage mask as being valid for the primitive block. Where the smallest areas are tiles, each mask may comprise a bit for each tile of the tile group that is valid for the primitive block.

In some cases, to reduce the size of the primitive block entry 1800, the masks may be stored in the primitive mask section 1810 in compressed format. For example, in some cases, the masks may be compressed according to a run length compression algorithm. As is known to those of skill in the art, a run length compression algorithm is a lossless compression algorithm in which runs of data (sequences in which the same value occurs consecutively) are stored as a single data value and a counter, rather than as a run. It will be evident to a person of skill in the art that this is only an example compression algorithm that can be used to compress the masks (e.g. primitive masks) in the primitive mask section and that any suitable lossy or lossless compression algorithm may be used to compress the masks.

Coverage Mask

A coverage mask indicates which tiles of a tile group, that intersect the bounding box of a primitive block, are valid for that primitive block. A tile is considered to be valid for a primitive block if at least one primitive in the primitive block is relevant for rendering the tile. A primitive may be relevant for rendering a tile if that primitive falls, at least partially, within the bounds of the tile. A primitive that falls, at least partially, within the bounds of a tile may be said to intersect that tile. In the examples described herein coverage masks are not generated for level 0 tile groups (i.e. tile groups with a single tile), instead primitive masks may be generated for level 0 tile groups.

In some cases, the coverage mask may comprise a bit for each tile in a block of relevant tiles that indicates whether or not the tile is valid for the primitive block, wherein the block of relevant tiles is based on the bounding box for the primitive block. The block of relevant tiles comprises the tiles in the tile group that intersect the bounding box for the primitive block, but may also include other tiles. For example, in some cases the relevant tiles may comprise all the tiles in the rendering space that intersect the bounding box of the primitive block regardless of whether all of those tiles form part of the tile group. However, in some cases the bounding box for a primitive block can be quite large which can make such a coverage mask large. This may make it difficult for the rasterization logic to decode the coverage mask. For example, some rendering spaces can be divided into 1,024×1,024 tiles which would mean that if a primitive block covers the majority of tiles and the tile group is the highest level tile group, the coverage mask may comprise over 1 million bits.

Accordingly, in other cases the coverage mask may be hierarchical. For example, the coverage mask may represent a tree of coverage information. Specifically, the block of relevant tiles may be recursively sub-divided into smaller and smaller areas of the rendering space and each area may be compared against the primitive block to determine if the area is valid for the primitive block and this information may be recorded in the coverage mask. For example, in some cases the block of relevant tiles may be recursively divided into quadrants.

In some cases, the block of relevant tiles may be expanded to the smallest s×s block of tiles wherein s is a power of two (e.g. a 2×2 block of tiles, a 4×4 block of tiles) which may be referred to herein as the expanded block of relevant tiles. Expanding the block of relevant tiles to a square block with power of 2 sides may help achieve a balanced tree. Where the original block of relevant tiles is an s×s block of tiles the expanded block of relevant tiles may be to the same as the original block of relevant tiles.

The coverage mask may then comprise a bit for each quadrant of the expanded block of relevant tiles indicating whether that quadrant is valid for the primitive block. A quadrant of one or more tiles is considered to be valid for a primitive block if at least one primitive of the primitive block falls, at least partially, within the bounds of the area of the rendering space formed by the tiles in that quadrant. Then for any quadrant of tiles that is valid, the coverage mask comprises a bit for each sub-quadrant of tiles thereof that indicates whether that sub-quadrant is valid for the primitive block. This process may be repeated until there is a set of bits that correspond to quadrants with 1 tile each. For example, if the original block of relevant tiles is expanded to an 8×8 block of tiles then the 8×8 block of tiles may be divided into four 4×4 blocks of tiles and a bit is added to the coverage mask for each of those 4×4 blocks that indicates whether or not that 4×4 block is valid for the primitive block (i.e. whether there is at least one primitive in the primitive block that falls, at least partially, within that 4×4 block). Then each 4×4 block of tiles which is valid is divided into four 2×2 blocks of tiles and a bit is added to the coverage mask for each of those 2×2 blocks that indicates whether or not that 2×2 block is valid for the primitive block. Then each 2×2 block of tiles which is valid is divided into four 1×1 blocks of tiles (i.e. four single tiles) and a bit is added to the coverage mask for each 1×1 block of tiles that indicates whether or not that 1×1 block of tiles (i.e. single tile) is valid for the primitive block.

In some cases, the four bits for a set of quadrants may be stored in the coverage mask according to a Z-order curve such that the bit corresponding to the top-left quadrant is stored first, the bit corresponding to the top-right quadrant is stored next, the bit corresponding to the bottom-left quadrant is stored next, and the bit corresponding to the bottom-right quadrant is stored last. It will be evident to a person of skill in the art that this is an example only, and that in other examples the bits for a set of quadrants may be stored in the coverage mask in another order. In some cases, a bit in the coverage mask may be set to one value (e.g. '1') when the corresponding quadrant is valid for the primitive block, and set to another value (e.g. '0') when the corresponding quadrant is not valid for the primitive block.

Figure 19:
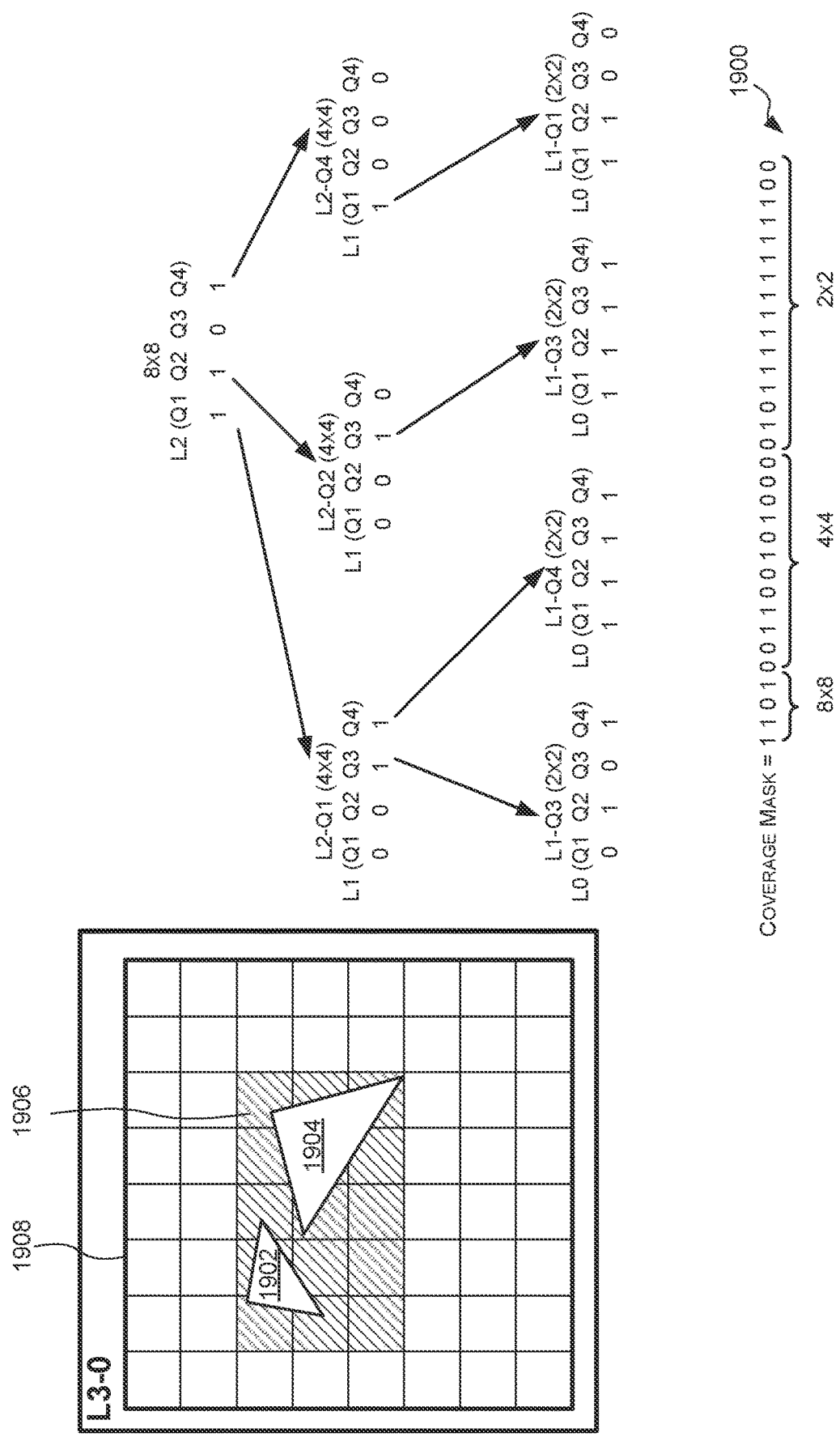
FIG. 19 is a schematic diagram of an example coverage mask for a first example primitive block.

Reference is now made to FIG. 19 which illustrates an example coverage mask 1900 for the L3-0 tile group of FIG. 7 for a primitive block comprising two primitives 1902 and 1904. In this example a '1' indicates that the corresponding quadrant is valid for the primitive block and a '0' indicates that the corresponding quadrant is not valid for the primitive block.

The tile granularity/resolution bounding box 1906 for the primitive block comprising primitives 1902 and 1904 is a 5×3 block of tiles. In this example, the L3-0 tile group completely encompasses the bounding box 1906 and so the block of relevant tiles is the 5×3 block of tiles that fall within the bounding box 1906. The smallest s×s block of tiles (wherein s is a power of 2) that includes the block of relevant tiles is an 8×8 block of tiles. Therefore the expanded block of relevant tiles 1908 for the primitive block is an 8×8 block of tiles. The 8×8 expanded block of relevant tiles 1908 is divided into four quadrants (i.e. four 4×4 blocks of tiles) which are referred to herein as the Level 2 (L2) quadrants. In this example, quadrant 1 (Q1) is the top left quadrant of 4×4 tiles, quadrant 2 (Q2) is the top right quadrant of 4×4 tiles, quadrant three 3 (Q3) is the bottom left quadrant of 4×4 tiles, and quadrant 4 (Q4) is the bottom right quadrant of 4×4 tiles. As shown in FIG. 19, at least one primitive 1902, 1904 falls, at least partially, within the area of the rendering space covered by L2-Q1, L2-Q2 and L2-Q4 so each bit corresponding to these quadrants is set to '1'. Neither of the primitives 1902 and 1904 fall within L2-Q3 so the bit corresponding to Q3 is set to '0'.

Each valid level 2 quadrant (L2-Q1, L2-Q2 and L2-Q4) is then sub-divided into sub-quadrants (i.e. four 2×2 blocks of tiles), which are referred to herein as the level 1 (L1) quadrants, and the coverage mask comprises a bit for each of these level 1 quadrants. The L2-Q1 quadrant is sub-divided into four quadrants (2×2 blocks of tiles). In this example at least one of the primitives 1902 or 1904 falls, at least partially within the L1-Q3 and L1-Q4 quadrants of the L2-Q1 quadrant so the bits corresponding to these level 1 quadrants is set to '1'. Neither of the primitives fall, at least, partially within the L1-Q1 and L1-Q2 quadrants of the L2-Q1 quadrant so the bits corresponding to these level 1 quadrants are set to '0'. The L2-Q2 quadrant is sub-divided into four quadrants (2×2 blocks of tiles). In this example at least one of the primitives 1902 or 1904 falls, at least partially within the L1-Q3 quadrants of the L2-Q2 quadrant so the bit corresponding to this level 1 quadrant is set to '1'. Neither of the primitives 1902 or 1904 fall, at least, partially within the L1-Q1, L1-Q2 and L1-Q4 quadrants of the L2-Q2 quadrant so the bits corresponding to these level 1 quadrants are set to '0'. The L2-Q4 quadrant is sub-divided into four quadrants (2×2 blocks of tiles). In this example at least one of the primitives 1902 or 1904 falls, at least partially within the L1-Q1 quadrant of the L2-Q4 quadrant so the bit corresponding to this level 1 quadrant is set to '1'. Neither of the primitives 1902 or 1904 fall, at least, partially within the L1-Q2, L1-Q3 and L1-Q4 quadrants of the L2-Q4 quadrant so the bits corresponding to these level 1 quadrants are set to '0'.

Each valid level 1 quadrant is then sub-divided into sub-quadrants (i.e. four 1×1 blocks of tiles, or 4 individual tiles), which are referred to herein as the level 0 (L0) quadrants, and the coverage mask comprises a bit for each of these level 0 quadrants. The L1-Q3 quadrant of the L2-Q1 quadrant is sub-divided into four quadrants (1×1 blocks of tiles). In this example at least one of the primitives 1902 or 1904 falls, at least partially within the L0-Q2 and L0-Q4 quadrants of the L1-Q3 quadrant of the L2-Q1 quadrant so the bits corresponding to these level 0 quadrants are set to '1'. Neither of the primitives 1902 or 1904 fall, at least, partially within the L0-Q1 or the L0-Q3 of the L1-Q3 quadrant of the L2-Q1 quadrant so the bits corresponding to these level 0 quadrants are set to '0'. The L1-Q4 quadrant of the L2-Q1 quadrant is sub-divided into four quadrants (1×1 blocks of tiles). In this example at least one of the primitives 1902 or 1904 falls, at least partially within each of these level 0 quadrants so the bits corresponding to these level 0 quadrants are set to '1'. The L1-Q3 quadrant of the L2-Q2 quadrant is sub-divided into four quadrants (1×1 blocks of tiles). In this example at least one of the primitives 1902 or 1904 falls, at least partially within each of these level 0 quadrants so the bits correspond to these level 0 quadrants are set to '1'. The L1-Q1 quadrant of the L2-Q4 quadrant is sub-divided into four quadrants (1×1 blocks of tiles). In this example at least one of the primitives 1902 or 1904 falls, at least partially within L0-Q1 and L0-Q2 quadrants of the L1-Q1 quadrant of the L2-Q4 quadrant so the bits corresponding to these level 0 quadrants are set to '1'. Neither of the primitives 1902 or 1904 fall, at least, partially within the L0-Q3 or the L0-Q4 of the L1-Q1 quadrant of the L2-Q4 quadrant so the bits corresponding to these level 0 quadrants are set to '0'.

Figure 20:
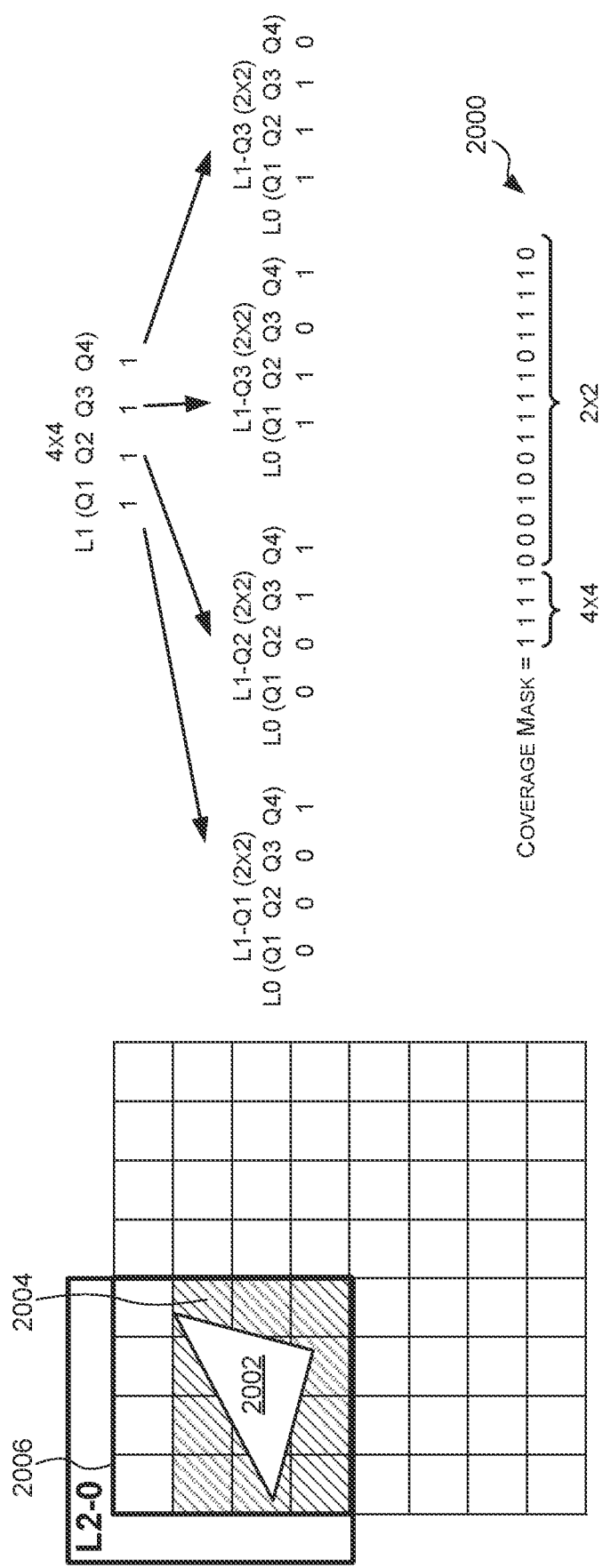
FIG. 20 is a schematic diagram of an example coverage mask for a second example primitive block.

Reference is now made to FIG. 20 which illustrates an example coverage mask 2000 for the L2-0 tile group of FIG. 7 for a primitive block comprising a single primitive 2002. In this example a '1' indicates that the corresponding quadrant is valid for the primitive block and a '0' indicates that the corresponding quadrant is not valid for the primitive block.

The tile granularity/resolution bounding box 2004 for the primitive block comprising primitive 2002 is a 4×3 block of tiles. In this example, the L2-0 tile group completely encompasses the bounding box 2004 and so the block of relevant tiles is the 4×3 block of tiles that fall within the bounding box 2004. The smallest s×s block of tiles (wherein s is a power of 2) that includes the block of relevant tiles is a 4×4 block of tiles. Therefore the expanded block of relevant tiles 2006 is a 4×4 block of tiles. The 4×4 expanded block of relevant tiles 2006 is divided into four quadrants (i.e. four 2×2 blocks of tiles) which are referred to herein as the Level 1 (L1) quadrants. In this example, quadrant 1 (Q1) is the top left quadrant of 2×2 tiles, quadrant 2 (Q2) is the top right quadrant of 2×2 tiles, quadrant three 3 (Q3) is the bottom left quadrant of 2×2 tiles, and quadrant 4 (Q4) is the bottom right quadrant of 2×2 tiles. As shown in FIG. 20, the primitive 2002 falls, at least partially, within the area of the rendering space covered by each level 1 quadrant so the bits corresponding to these level 1 quadrants are set to '1'.

Each valid level 1 quadrant (L1-Q1, L1-Q2, L1-Q3 and L1-Q4) is then sub-divided into sub-quadrants (i.e. four 1×1 blocks of tiles), which are referred to herein as the level 0 (L0) quadrants, and the coverage mask comprises a bit for each of these level 0 quadrants. The L1-Q1 quadrant is sub-divided into four quadrants (1×1 blocks of tiles). In this example the primitive 2002 falls, at least partially within the L0-Q4 quadrant of the L1-Q1 quadrant so the bit corresponding to that level 0 quadrants is set to '1'. The primitive 2002 does not fall, at least, partially within the L0-Q1, L0-Q2 and L0-Q3 quadrants of the L1-Q1 quadrant so the bits corresponding to these level 0 quadrants are set to '0'. The L1-Q2 quadrant is sub-divided into four quadrants (i.e.

four 1×1 blocks of tiles). In this example the primitive 2002 falls, at least partially within the L0-Q3 and L0-Q4 quadrants of the L1-Q2 quadrant so the bits corresponding to these level 0 quadrants is set to '1'. The primitive 2002 does not fall, at least, partially within the L0-Q1 and L0-Q2 quadrants of the L1-Q2 quadrant so the bits corresponding to these level 0 quadrants are set to '0'. The L1-Q3 quadrant is sub-divided into four quadrants (i.e. four 1×1 blocks of tiles). In this example the primitive 2002 falls, at least partially within the L0-Q1, L0-Q2 and L0-Q4 quadrants of the L1-Q3 quadrant so the bits corresponding to these level 0 quadrants are set to '1'. The primitive 2002 does not fall, at least, partially within the L0-Q3 quadrant of the L1-Q3 quadrant so the bit corresponding to this level 0 quadrant is set to '0'. The L1-Q4 quadrant is sub-divided into four quadrants (i.e. four 1×1 blocks of tiles). In this example the primitive 2002 falls, at least partially within the L0-Q1, L0-Q2 and L0-Q3 quadrants of the L1-Q4 quadrant so the bits corresponding to these level 0 quadrants are set to '1'. The primitive 2002 does not fall, at least, partially within the L0-Q4 quadrant of the L1-Q4 quadrant so the bit corresponding to this level 0 quadrant is set to '0'.

Figure 21:
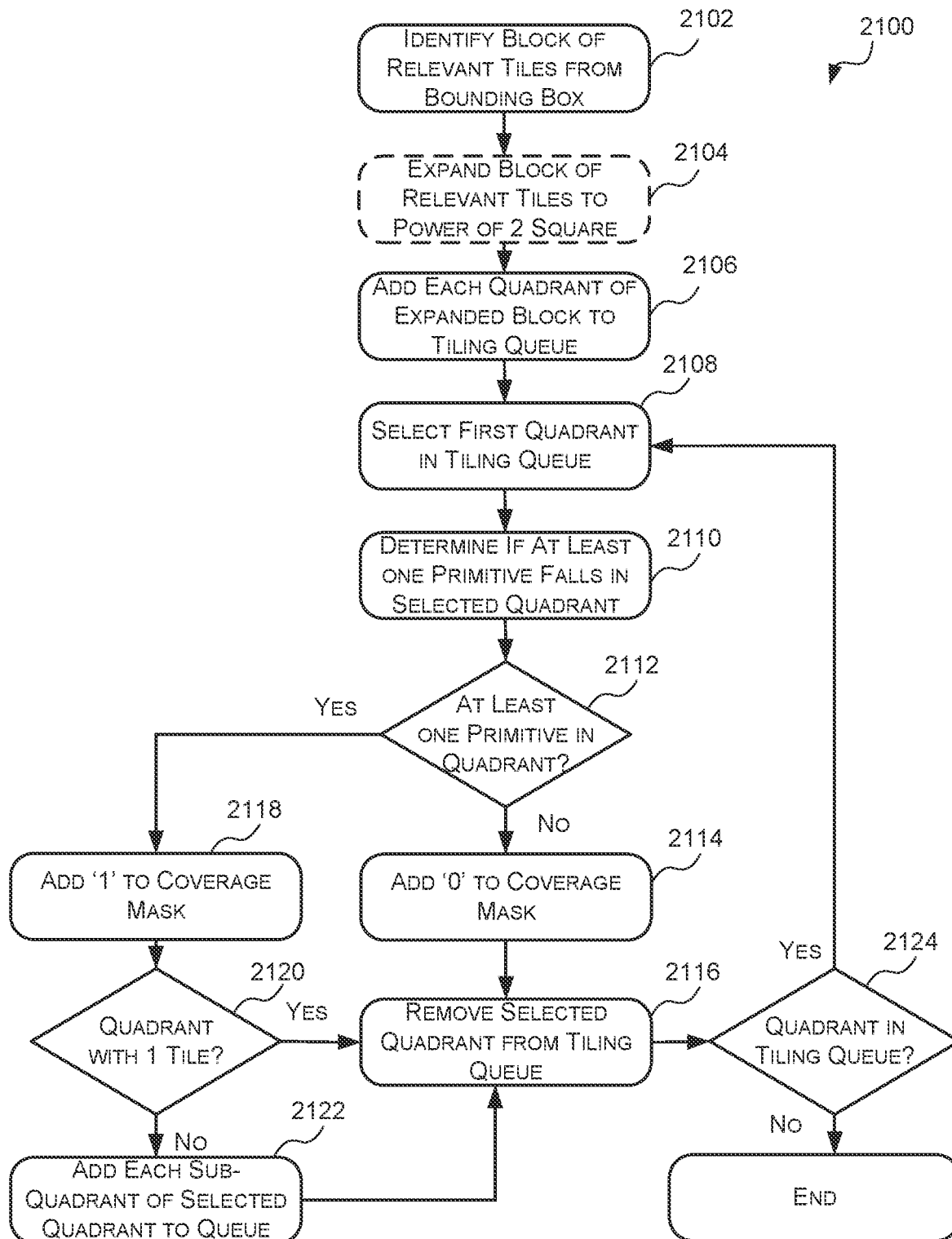
FIG. 21 is a flow diagram of an example method for generating a coverage mask.

Reference is now made to FIG. 21 which illustrates an example method 2100 of generating a hierarchical coverage mask which indicates which tiles in a tile group that overlap the bounding box for a primitive block are valid for the primitive block. The method 2100 begins at step 2102 where the block of relevant tiles is identified from the bounding box of the primitive block. The block of relevant tiles includes those tiles in the tile group that intersect, or overlap, the bounding box for the primitive block, but may include other tiles. For example, in some cases the block of relevant tiles may comprise all of the tiles in the rendering space that overlap with the bounding box of the primitive block regardless of whether all of the tiles that overlap with the bounding box are part of the tile group. Where a primitive block may be associated with more than one tile group this may allow the primitive block entry for each tile group to have the same coverage mask such that only one coverage mask has to be generated for the primitive block. However, limiting the block of relevant tiles to only the tiles in the tile group that overlap the bounding box for the primitive block may allow the coverage mask in each primitive block entry to be smaller. Once the block of relevant tiles has been identified the method may proceed to step 2104 or step 2106.

At step 2104, the block of relevant tiles is expanded to the smallest s×s block of tiles which include the block of relevant tiles, wherein s is a power of 2. This may comprise selecting s to be the smallest power of two that is equal to or greater than the largest side of the block of relevant tiles. For example, as described above with respect to FIGS. 19 and 20, a 5×3 block of relevant tiles may be expanded to an 8×8 block of tiles (as 8 is the smallest power of 2 greater than or equal to 5 (the largest side)), and a 4×3 block of relevant tiles may be expanded to a 4×4 block of tiles (because 4 is the smallest power of 2 equal to or greater than 4 (the largest side)). As described above, where the original block of relevant tiles is a square block with power of 2 sides then the original block of relevant tiles may be the same as the expanded block of relevant tiles.

A block of relevant tiles may be expanded in any suitable manner. In some cases, a block of relevant tiles may be expanded to the s×s tile group that encompasses the block of relevant tiles as shown in FIG. 20. In other cases, a block of relevant tiles may always be expanded in the same direction. For example, if a block of relevant tiles is to be expanded in the X direction the block of relevant tiles may always be expanded to the right, and if a block of relevant tiles is to be expanded in the Y direction the block of relevant tiles may always be expanded downwards. It will be evident to a person of skill in the art that these are examples only and that a block of relevant tiles may be expanded in any suitable manner so long at the rasterization logic is able to determine how a block of relevant tiles was expanded so as to be able to know which bits of the coverage mask correspond to which areas of the rendering space. Once the block of relevant tiles has been expanded the method 2100 proceeds to step 2106.

At step 2106, the block of relevant tiles (or the expanded block of relevant tiles) is sub-divided into quadrants where each quadrant comprises a set of tiles; and then each quadrant (i.e. the block of tiles forming the quadrant) is added to a queue for tiling. For example, if the expanded block of relevant tiles comprises an 8×8 block of tiles then the expanded block of relevant tiles is divided into four quadrants of 4×4 blocks of tiles. Each 4×4 block of tiles is then added to the queue for tiling. Once the quadrants of the expanded block of relevant tiles have been added to the queue the method 2100 proceeds to step 2108.

At step 2108, the first quadrant (e.g. block of tiles) in the queue is selected (i.e. the quadrant at the top or head of the queue). The method 2100 then proceeds to step 2110.

At step 2110, it is determined whether at least one primitive of the primitive block falls, at least partially, within the bounds of the selected quadrant. A primitive is said to fall, at least partially, within the bounds of a quadrant if the primitive intersects the area of the rendering space covered by the tile(s) in the quadrant.

Any suitable tiling method for determining whether a primitive falls, at least partially, within the bounds of a quadrant may be used. The term "tiling method" is used herein to mean a method of determining whether an object, such as a primitive, falls, at least partially, within the bounds of an area of a rendering space. Some tiling methods may be more accurate than others. In some cases, a simple, less accurate, method, such as a simple bounding box method, may be used to determine whether a primitive, at least partially, falls within a quadrant so as to quickly determine whether a primitive falls within a quadrant. As is known to those of skill in the art, in a bounding box method a bounding box that encompasses the primitive is identified (e.g. the smallest axis-aligned bounding box that encompasses the vertices of the primitive). The bounding box may be generated using any suitable method. For example, a primitive bounding box may be generated by finding the minimum and maximum X and Y co-ordinates of the vertices of the primitive and forming an axis-aligned bounding box from those co-ordinates. The bounding box may be generated at any granularity or resolution. For example in some cases, the bounding box may be at the X and Y co-ordinate resolution (i.e. the bounding box may be defined by the maximum and minimum X and Y co-ordinates of the vertices). In other cases, the bounding box may be at the tile resolution (i.e. the closest tile edges that encompass the primitive). Once a bounding box for a primitive has been identified, it may be determined that the primitive, at least partially, falls within a quadrant if the bounding box at least partially overlaps with the area of the rendering space covered by the tiles in the quadrant. In other words, a primitive may be determined to, at least partially, fall within a quadrant if the bounding box for that primitive, at least partially, falls within the bounds of the tiles in that quadrant. While a bounding box method can be used to quickly and efficiently determine whether a primitive, at least partially, falls within a quadrant, it is not 'perfect' tiling as the bounding box is often larger than the primitive which may result in a primitive being determined to be in a quadrant when in fact it is not in the quadrant.

Figure 22:
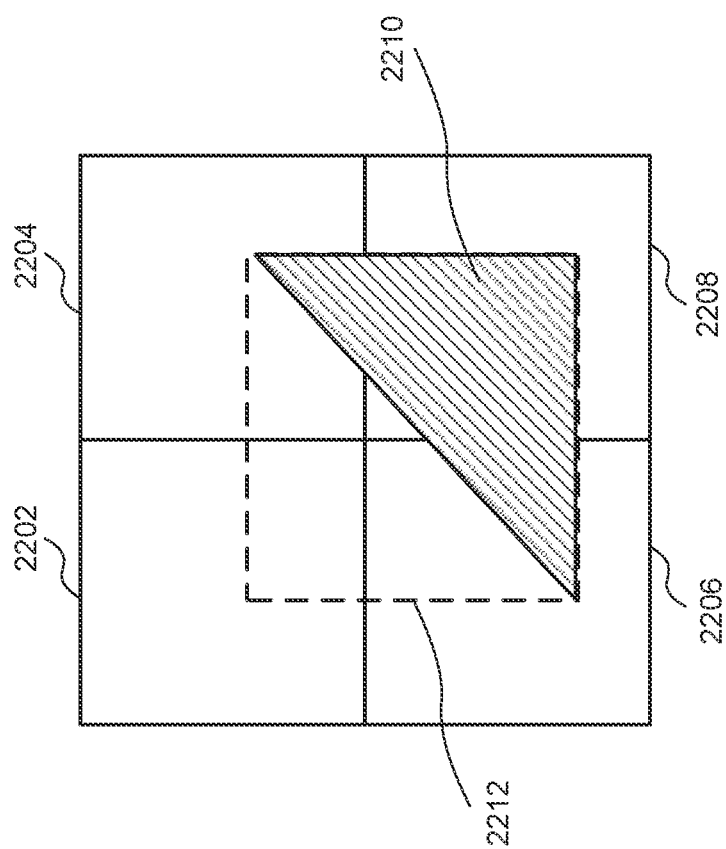
FIG. 22 is a schematic diagram illustrating tiling a primitive in accordance with a bounding box method.

For example, FIG. 22 shows four example quadrants 2202, 2204, 2206, and 2208. If a simple axis-aligned bounding box method is used to determine which of these quadrants 2202, 2204, 2206, 2208 a primitive 2210, at least partially, falls within, then a bounding box 2212 around the primitive 2210 is generated. Since the bounding box 2212 at least partially overlaps with all of the quadrants 2202, 2204, 2206, 2208 it may be determined that the primitive 2210 falls, at least partially, within each of the four quadrants 2202, 2204, 2206, 2208 even though it actually only falls within, or overlaps, with three of the quadrants 2204, 2206, 2208. However, determining that a primitive falls within a quadrant when it does not actually fall within the quadrant will not cause an error and the primitive will simply be discarded in the rasterization phase. However, determining that a primitive does not fall within a quadrant that it does fall within may cause an error in the rasterization phase. Accordingly, it is advantageous for the tiling to be conservative. In other words, it is better to indicate that a primitive falls within a quadrant even though the primitive does not actually fall within the quadrant than to not include a primitive that actually does fall within the quadrant.

In other cases, however, a more complicated and/or more accurate method, such as a perfect tiling or near perfect tiling method, may be used to determine whether a primitive falls within a quadrant. An example perfect tiling method, which may be used, is described in the Applicant's Published GB Patent Application No. 2549789 which is herein incorporated by reference in its entirety.

In some cases, the tiling method used to determine which primitives of the primitive block fall within a quadrant may vary for different level quadrants. For example, a simpler less accurate tiling method, such as a bounding box tiling method, may be used for higher level quadrants, and a more accurate tiling method, such as perfect tiling or near perfect tiling, may be used for lower level quadrants (e.g. level 0 quadrants). In some cases, a perfect or near perfect tiling method, may only be performed for level 0 quadrants (i.e. quadrants comprising only one tile).

Returning to FIG. 21, in some cases, determining whether at least one primitive of the primitive block falls, at least partially, within the bounds of the selected quadrant may comprise generating a primitive mask for the selected quadrant. A primitive mask comprises a bit for each primitive in the primitive block which indicates whether or not that primitive falls, at least partially, within the bounds of the quadrant. For example, a '1' may indicate that the corresponding primitive falls, at least partially, within the bounds of the quadrant and a '0' may indicate that the corresponding primitive does not fall within the bounds of the quadrant. If the selected quadrant is a level 0 quadrant then the primitive mask may be stored in the primitive mask section of the primitive entry. If, however, the selected quadrant is not a level 0 quadrant then the primitive mask may be used to ease the tiling burden in subsequent iterations of step 2108. For example, if the selected quadrant is a non-zero level quadrant and it is determined that at least one primitive in the primitive block falls, at least partially, within the bounds of the quadrant, then it may be subsequently determined which primitives of the primitive block fall within each sub-quadrant of that quadrant (i.e. step 2108 may be performed for each quadrant of the selected quadrant). In these cases, the time and resources required to complete step 2108 for the sub-quadrants may be reduced by only performing the tiling for primitives that, according to the primitive mask, fall, at least partially, within the quadrant. No tiling needs to be performed for primitives that do not fall within the quadrant as they will not fall within the sub-quadrants thereof.

Once it has been determined whether at least one primitive of the primitive block falls, at least partially, within the bounds of the selected quadrant the method 2100 proceeds to step 2112.

At step 2112, if it was determined at step 2110 that none of the primitives in the primitive block fall, at least partially, within the bounds of the selected quadrant then the method 2100 proceeds to step 2114 where a '0' is added to the coverage mask and then the method 2100 proceeds to step 2116. If, however, it was determined at step 2110 that at least one primitive in the primitive block falls, at least partially, within the bounds of the selected quadrant then the method 2100 proceeds to step 2118 where a '1' is added to the coverage mask and the method 2100 proceeds to step 2120.

At step 2120, it is determined whether the selected quadrant is a level 0 quadrant (i.e. a quadrant with only a single tile). If it is determined at step 2120 that the selected quadrant is a level 0 quadrant, then the quadrant cannot be further subdivided, and the method 2100 proceeds to step 2116. If, however, it is determined at step 2120 that the selected quadrant is a non-level 0 quadrant (i.e. the selected quadrant comprises at least two tiles) then the quadrant can be further subdivided and the method 2100 proceeds to step 2122 where the selected quadrant is sub-divided into sub-quadrants and each sub-quadrant is added to the queue for tiling. In some cases, where a primitive mask is generated in step 2110, the primitive mask may be stored alongside or associated with each sub-quadrant in the queue to simplify the tiling of the primitives in the primitive block (i.e. step 2110) for the sub-quadrants. Once the sub-quadrants have been added to the queue the method 2100 proceeds to step 2116.

At step 2116, the selected quadrant is removed from the queue and the method 2100 proceeds to step 2124. At step 2124 it is determined whether there is at least one quadrant still in the queue. If it is determined at step 2124 that there are no more quadrants in the queue, then the method 2100 ends. If, however, it is determined at step 2124 that there is at least one quadrant in the queue then the method 2100 proceeds back to step 2108 where the first or top quadrant in the queue is selected for tiling.

It will be evident to a person of skill in the art that this is only an example set of steps to generate a coverage mask and that in other examples the steps may be executed in a different order and/or may include different and/or additional steps. For example, in some cases, in step 2110 in addition to determining whether a primitive falls, at least, partially within the bounds of the selected quadrant, it may be determined whether the primitive completely covers the selected quadrant (i.e. the primitive completely covers the area of the rendering space covered by the tiles in the selected quadrant). In these cases, if it is determined that a primitive completely covers the selected quadrant, then the tiling of the primitives in the primitive block against the selected quadrant may cease and a '1' may be added to the coverage mask for the selected quadrant and each sub-quadrant thereof. For example, if the selected quadrant is a 4×4 block of tiles, and it is determined that a primitive in the primitive block completely covers the quadrant (i.e. completely covers each tile in the 4×4 block of tiles) then a '1' may be added to the coverage mask: for that quadrant, for each 2×2 block of tiles (i.e. each level 1 quadrant thereof) in that 4×4 block, and for each individual tile (i.e. each level 0 quadrant) in the 4×4 block.

In some cases, instead of the coverage mask comprising a single bit for each relevant quadrant the coverage mask may have a plurality of bits for each relevant quadrant that indicates whether: (i) none of the primitives in the primitive block fall within the bounds of the quadrant (i.e. the quadrant is not valid for the primitive block); (ii) the quadrant is completely covered by at least one primitive in the primitive block; or (iii) the quadrant is partially covered by the primitives in the primitive block. For example, a '00' may indicate that the quadrant is not valid for the primitive block, a '10' may indicate that the quadrant is completely covered, and a '11' may indicate that the quadrant is partially covered. In these cases, once it has been determined that a quadrant is completely covered then the relevant bits of the coverage mask that correspond to that quadrant may be set to '10' and no information may be included in the coverage mask for the sub-quadrants or lower level quadrants thereof. For example, if the selected quadrant is a 4×4 block of tiles, and it is determined that a primitive in the primitive block completely covers the quadrant (i.e. completely covers each tile in the 4×4 block of tiles) then a '10' may be added to the coverage mask for that quadrant; and no information may be added to the coverage mask for each 2×2 block of tiles (i.e. each level 1 quadrant thereof) in that 4×4 block, and for each individual tile (i.e. each level 0 quadrant) in the 4×4 block. Although this doubles the number of bits per quadrant this may reduce the size of the coverage mask in cases where a lot of the high level quadrants are completely covered.

In the example coverage masks described above the coverage mask does not comprise any information for sub-quadrants if it is determined that none of the primitives in the primitive block fall, at least partially within a quadrant. For example, if it is determined that none of the primitives in a primitive block falls with a quadrant comprising a 2×2 block of tiles then the coverage mask may not comprise a bit corresponding to each sub-quadrant (i.e. each 1×1 block) thereof. In other examples, the coverage mask may comprise a bit for each quadrant in the hierarchy regardless of whether it was determined that none of the primitives in the primitive block falls within a parent quadrant. This may significantly increase the size of the coverage mask, but it may make decoding the coverage mask simpler and/or more efficient. In these cases, once it has been determined that none of the primitives of the primitive block falls within the selected quadrant a '0' may be added to the coverage mask for that selected quadrant and for each lower level quadrant thereof falling within the selected quadrant. For example, if it is determined that none of the primitives in a primitive block fall within a quadrant comprising a 2×2 block of tiles, then a '0' may be added to the coverage mask for that quadrant and a '0' may be added to the coverage mask for each sub-quadrant (i.e. each 1×1 block of tiles) thereof.

Due to the fact that an expanded block of relevant tiles can cover a large number of tiles, in some cases, to limit the size of the coverage mask each coverage mask may have a maximum size. This may mean dropping a number of bits from the full coverage mask. This may mean that the coverage mask does not comprise information for each relevant quadrant. For example, it may only have information down to level 1 quadrants and may not have any information related to level 0 quadrants. In these cases, the rasterization logic may be configured to apply the level 1 information to all of the sub-quadrants (i.e. level 0 quadrants) thereof. For example, if the coverage mask does not comprise information for any level 0 quadrant but the coverage mask indicates that a level 1 quadrant is valid, then the rasterization logic may assume that each level 0 quadrant thereof is valid.

The size of the coverage mask may be restricted while the coverage mask is being generated or after the complete or full coverage mask has been generated. For example, in some cases, after completing step 2118 or 2114, a determination may be made as to whether the coverage mask has reached the maximum size (e.g. maximum number of bits). If it is determined that the coverage mask has reached the maximum size, then the method 2100 may end. In other cases, the method 2100 may be completed in its entirety to generate a complete or full coverage mask and then, for example, a number of LSBs may be removed from the full coverage mask so that it does not exceed the maximum size. In some cases, the information corresponding to the highest level quadrants may be stored in the most significant bits (MSBs) and the information corresponding to the lowest level quadrants may be stored in the least significant bits (LSB) as shown in FIGS. 19 and 20 so as to achieve a uniform loss of coverage across the bounding box.

In other cases, to reduce the size of the primitive block entry a coverage mask may be compressed using a compression algorithm. A lossy or a lossless compression algorithm may be used to compress the coverage mask. In some examples, where the coverage mask comprises a bit for each relevant quadrant, adjacent pairs of bits in the coverage mask may be OR'd together (if a '1' indicates that a quadrant is valid, or AND'd together if a '0' indicates that a quadrant is valid) and replaced by the outcome of the OR operation (or the AND operation). In this way each bit of the mask represents two quadrants. This may be repeated a number of times to achieve a maximum length for the coverage mask. Then when the rasterization logic sees a '1' in the compressed coverage mask it treats both quadrants that the bit corresponds to as being valid. This can significantly reduce the size of the coverage mask, but results in a less accurate coverage mask. Specifically, because adjacent pairs of bits are OR'd together if either of the bits indicates that a quadrant is valid then both will be treated as being valid even though only one of them is valid. In yet other cases, the size of the coverage mask may be reduced by a combination of: (i) removing a number of LSBs; and (ii) applying a lossy or lossless compression algorithm. The removal of bits may be performed prior to compression, or compression may be performed prior to the removal of bits.

In the example method described with respect to FIG. 21 the coverage mask is generated from top down—i.e. by tiling the primitives in the primitive block against the highest level quadrants of the expanded block of relevant tiles and then tiling the primitives in the primitive block against relevant lower level quadrants. However, in other examples the coverage mask may be generated from bottom up. For example, in other cases, the primitives in the primitive block may be tiled against each tile in the expanded block of relevant tiles and the coverage mask may be generated from the outcome of the tiling. For example, it may be determined for each tile in the expanded block of relevant tiles which primitives of the primitive block fall, at least partially, within the bounds of that tile to generate a primitive mask therefore; and the coverage mask may be generated from the primitive masks.

Tiling Engine

Figure 23:
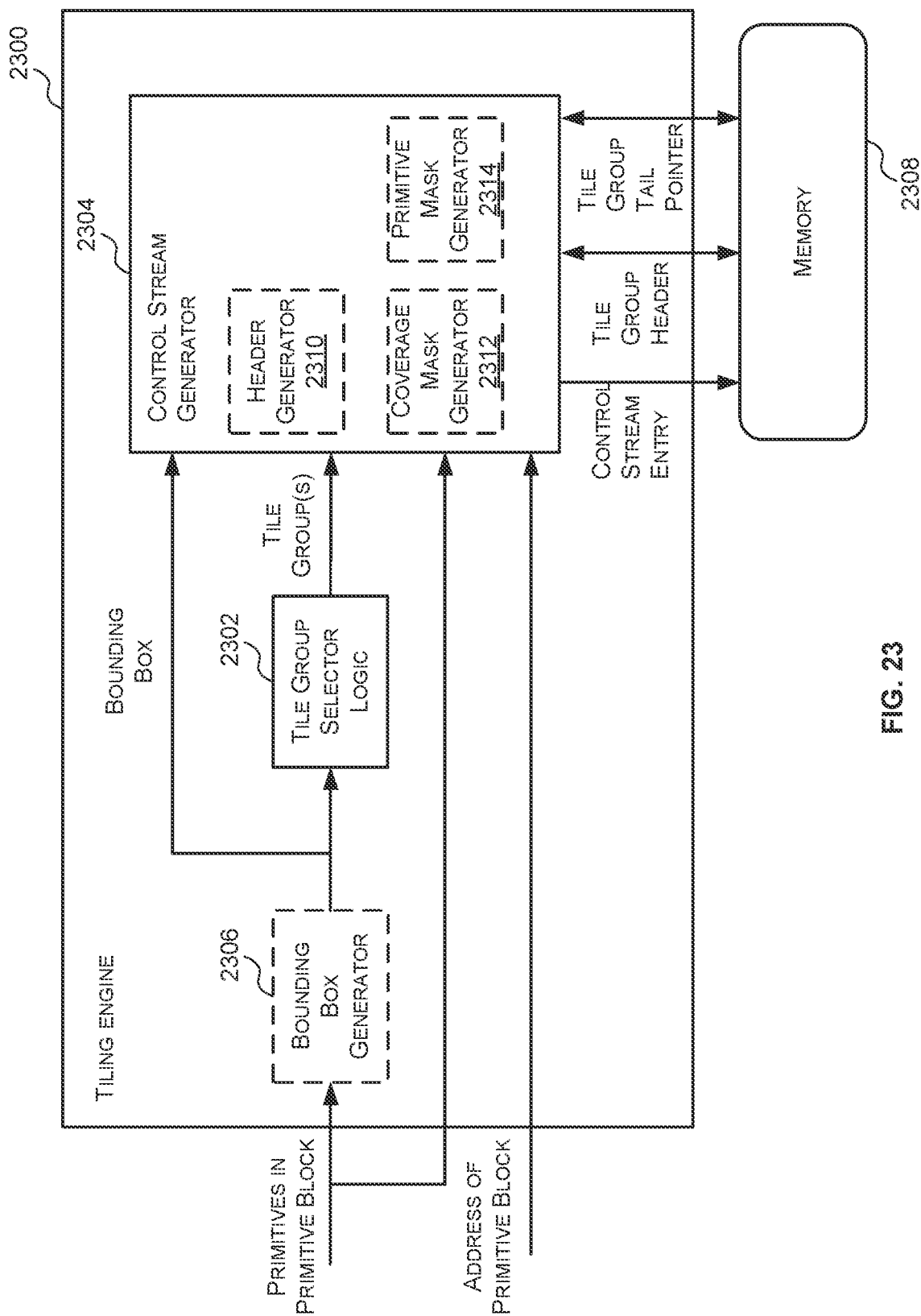
FIG. 23 is a block diagram of an example tiling engine configured to implement the multi-level hierarchical tiling method of FIG. 6.

Reference is now made to FIG. 23 which illustrates an example tiling engine 2300 which is configured to generate information, which is referred to here as tiling information, which indicates which primitives in a render fall within each tile of the rendering space. The tiling engine 2300 may be configured to implement the method 600 of FIG. 6. For example, the rendering space may be divided into a plurality of tiles (e.g. as described with respect to FIGS. 1 and 2) and a multi-level hierarchy of tile groups may be generated wherein each level in the hierarchy comprises non-overlapping groups of tiles of a particular size, and higher level groups comprise more tiles than lower level groups (e.g. as described with respect to FIGS. 6 and 7). The tiling engine is configured to receive primitive blocks (or information identifying primitive blocks); and associate each primitive block with one or more tile groups of the hierarchy so that the primitive block is not associated with more than a maximum number of tile groups, but that if the primitive block is relevant for rendering a tile then the primitive block is associated with at least one tile group comprising that tile. The tiling engine then generates a control stream for one or more tile groups in the hierarchal set of tile groups based on the associations.

The tiling engine 2300 of FIG. 23 comprises tile group selector logic 2302 and a control stream generator 2304.

The tile group selector logic 2302 is configured to associate a primitive block with one or more tile groups of the hierarchy so that the primitive block is not associated with more than a maximum number of tile groups, but that if the primitive block is relevant for rendering a tile the primitive block is associated with at least one tile group comprising that tile. The tile group selector logic 2302 may use any suitable method for selecting the tile groups to be associated with a primitive block. For example, where a primitive block may only be associated with a single tile group then the tile group selector logic 2302 may select the tile group to be associated with a primitive block using the method 900 of FIG. 9 where the primitive block is associated with the smallest tile group in the hierarchy of tile groups that encompasses a bounding box for the primitive block. In other cases, where a primitive block may be associated with up to g tile groups wherein g is greater than one, then the tile group selector logic 2302 may be configured to select the tile groups to be associated with a primitive block using the method 1200 of FIG. 12 where a primitive block is associated with the smallest (e.g. in terms of number of tiles) of up to g tile groups in the hierarchy that encompass a bounding box for the primitive block. The tile groups in the set may all be at the same level of the hierarchy or they may be at different levels of the hierarchy. Once the tile group selector logic 2302 has associated a primitive block with a tile group, the tile group selector logic 2302 may output information identifying the association.

Where the tile group selector logic 2302 uses the bounding box of a primitive block to determine which tile groups to associate with the primitive block, the tiling engine 2300 may further comprise a bounding box generator 2306 which is configured to receive a primitive block and generate a bounding box therefor. Several example methods for generating or identifying the bounding for a primitive block were described above with respect to FIG. 6. The bounding box may be generated at any granularity. For example, the bounding box may be at X or Y co-ordinate granularity or at tile granularity. Once the bounding box for a primitive block has been generated the bounding box generator 2306 may be configured to output information identifying the bounding box (e.g. the co-ordinates of the bounding box) for the primitive block.

The control stream generator 2304 is configured to generate a control stream for each tile group that is associated with at least one primitive block. The control stream for a tile group comprises a primitive block entry for each primitive block associated with that tile group. In some cases, the control stream generator 2304 is configured to receive a primitive block and information identifying the one or more tile groups that the primitive block is associated with (e.g. the information output by the tile group selector logic 2302). The control stream generator is then configured to, for each tile group that the primitive block is associated with: (i) generate a primitive block entry that comprises information that identifies that primitive block; and (ii) add the primitive block entry to the control stream for the corresponding tile group (e.g. store the primitive block entry in memory as part of the control stream for the corresponding tile group). In some cases, the information identifying a primitive block is information identifying the location of the primitive block in memory. In these cases, the control stream generator 2304 may also receive information (e.g. an address) identifying the location of the primitive block in memory 2308.

As described above, in some cases a primitive block entry may comprise additional information. For example, in some cases, a primitive block entry may comprise a header that provides information about the primitive block (e.g. the number of primitives in the primitive block etc.) and/or the primitive block entry (e.g. such as which optional information is in the primitive block entry). For example, as described above with respect to FIG. 18 the header section 1802 may comprise: an entry type field 1812; a number of primitives in the block field 1814; a base address present field 1816; a bounding box (BB) minimum X present field 1818; a bounding box (BB) maximum X present field 1820; a bounding box (BB) minimum Y present field 1822; a bounding box (BB) maximum Y present field 1824; a full coverage field 1826; a primitive mask compression field 1828; and an address offset field 1830. It will be evident to a person of skill in the art that this is only an example header and that other headers may have another format, additional information, and/or different information. Where a primitive block entry may comprise a header or a header section, the control stream generator 2304 may comprise a header generator 2310 which is configured to generate the header or the header section for each primitive block entry.

In some cases, a primitive block entry may additionally or alternatively comprise bounding box information which identifies the co-ordinates and/or location of the bounding box for the primitive block. Including the bounding box information in a primitive block entry may allow the rasterization logic to quickly determine if a tile in the tile group is valid for the corresponding primitive block (and thus the primitive block does not have to be retrieved from memory to render the tile). Specifically, if the tile falls outside the bounding box for the primitive block then it can be quickly determined that the tile is not valid for the primitive block. For example, a bounding box may be defined by the following co-ordinates: minimum X co-ordinate, maximum X co-ordinate, minimum Y co-ordinate and maximum Y co-ordinate in the rendering space. As described above, in some cases if the bounding box for the primitive block is not greater than or equal to the area of the rendering space covered by the tiles in the tile group then one or more co-ordinates of the bounding box may be included in the primitive block entry. For example, in some cases, the primitive block entry may include any bounding box co-ordinate that lies within the area of the rendering space covered by the tiles in the tile group. In other words, any bounding box co-ordinate that lies on or outside the area of the rendering space covered by the tiles in a tile group may not be included in the primitive block entry. Where a primitive block entry may include bounding box information the control stream generator 2304 may be configured to receive information identifying the bounding box (e.g. from the bounding box generator 2306) and to compare the bounding box information to the co-ordinates of the corresponding tile group to determine if bounding box information is to be added to the primitive block entry. If it is determined that bounding box information is to be added to the primitive block entry, then the control stream generator 2304 may be configured to add the bounding box information to the primitive block entry prior to storing the primitive block entry in memory 2308.

In some cases, a primitive block entry may additionally or alternatively comprise a coverage mask that indicates, which tiles that overlap with the bounding box for the primitive block, are valid for the primitive block. As described above, in some cases the coverage mask may be implemented as a hierarchical coverage mask that is generated by dividing a block of relevant tiles into successively smaller areas and storing information in the coverage mask for each area. For example, the block of relevant tiles may be successively divided into quadrants of tiles and the coverage mask may comprise information (e.g. a bit) for each quadrant that indicates whether the primitive block is valid for that quadrant (e.g. whether there is at least one primitive in the primitive block that falls, at least partially, within the area of the rendering space covered by the tiles in the quadrant). In some cases, the block of relevant tiles may be first expanded to a square block of tiles with power of two sides. Where a primitive block entry may comprise a coverage mask, the control stream generator 2304 may comprise a coverage mask generator 2312. The coverage mask generator 2312 may be configured to generate a coverage mask for a primitive block entry by receiving the primitive block; identifying a block of relevant tiles from the bounding box of the primitive block; and dividing the block of relevant tiles (or the expanded block of relevant tiles) for the primitive block into successively smaller areas (e.g. quadrants) and determining whether any primitives in the primitive block fall within each area (quadrant). The coverage mask generator 2312 may, for example, implement the method 2100 of FIG. 21.

In some cases, a primitive block entry may additionally or alternatively comprise one or more primitive masks. Each primitive mask indicates which primitives are relevant for rendering a set of one or more tiles. A primitive may be deemed to be relevant to a set of tiles if the primitive falls, at least partially, within the bounds of the area covered by the set of tiles. Each primitive mask may comprise a bit for each primitive in the primitive block which indicates whether or not that primitive is relevant for rendering the set of tiles. In some cases, a primitive block entry may comprise a primitive mask for each tile in the tile group that is valid for the primitive block that indicates which primitives in the primitive block are relevant for rendering that tile. In other cases, a primitive block entry may comprise a primitive mask for each valid lowest level quadrant in the coverage mask, which may or may not be a single tile quadrant. Specifically, as described above, a coverage mask may have a maximum size (e.g. a maximum number of bits) and so it may not comprise information for all of the areas (e.g. quadrants) in the hierarchy. For example, a coverage mask may only comprise information for level 1 quadrants—i.e. a coverage mask may not comprise information for level 0 quadrants (i.e. single tile quadrants). In these cases, the primitive block entry may comprise a primitive mask for each level 1 quadrant that is valid for the primitive block. Where a primitive block entry may comprise one or more primitive masks, the control stream generator 2304 may comprise a primitive mask generator 2314. The primitive mask generator 2314 is configured to receive a primitive block and information identifying an area of the rendering space (e.g. a tile or a set of tiles) and determine which of the primitives in the primitive block fall, at least partially within the area, and generate a primitive mask for the area based on the determinations. The primitive mask generator 2314 may use any suitable tiling method (e.g. a bounding box method, a perfect tiling method or a near-perfect tiling method) to determine whether a primitive falls, at least partially, within the bounds of an area of the rendering space.

Where a control stream generator 2304 comprises a coverage mask generator 2312 and a primitive mask generator 2314, the coverage mask generator 2312 may use the primitive mask generator 2314 to generate or create the coverage mask. For example, in some cases, the coverage mask generator 2312 may be configured to provide the primitive mask generator with the co-ordinates for each quadrant, and the primitive mask generator 2314 may return a primitive mask for each quadrant that is used to generate the coverage mask. In other cases, the primitive mask generator 2314 may be configured to generate a primitive mask for each tile in the block of relevant tiles and the coverage mask generator 2312 may generate the coverage mask from the primitive masks.

In some cases, the control stream generator 2304 may also be configured to interleave other types of entries amongst the primitive block entries in memory 2308. For example, as described above, in some cases the control stream may be stored in memory in control stream blocks where each block has a maximum number of entries or a maximum size. In these cases, the control stream generator 2304 may be configured to build a control stream block by adding the entries to the control stream block until the maximum number of entries or the maximum size has been reached. Once the maximum number of entries less one, or the maximum size less the size of a link entry, has been reached the control stream generator 2304 may be configured to add a link entry to the control stream block indicating where the next control stream block will be stored in memory, and then write the control stream block to memory. The control stream generator 2304 may be configured to continue to build control stream blocks until the last primitive block entry has been generated.

In some cases, the control stream generator 2304 may be configured to, once it has generated and stored the last primitive block entry for the tile group, store a termination entry (as described above) in memory to indicate the end of the control stream for that tile group.

As described above, in some cases there may be a header and a tail pointer stored in memory 2308 for each tile group in the hierarchy (see. FIG. 17). The header for a tile group may comprise information identifying the location in memory of the control stream for the tile group (e.g. the address of the beginning of the control stream). The tail pointer for a tile group may comprise information identifying the location in memory 2308 where the next entry in the control stream is to be stored. In some cases, the header and/or the tail pointer may comprise additional information, such as a valid bit indicating whether the corresponding location/address information is valid. Where there is a header and a tail pointer for each tile group of the hierarchy, the control stream generator 2304 may be configured to, for each tile group that a primitive block is associated with: once it has generated a primitive block entry for the tile group, read the tail pointer to identify the location in memory where the primitive block entry is to be stored, write the primitive block entry to the identified location in memory, and update the tail pointer to point to the next addressable block of memory following the newly added primitive block entry.

Rasterization Phase

In the examples described herein, the rendering space is divided into a plurality of tiles (e.g. as described with respect to FIG. 1) and a multi-level hierarchy of tile groups is formed from the plurality of tiles wherein each level comprises groups of tiles, and higher level groups have more tiles than lower level groups (e.g. as described with respect to FIG. 7). In some cases, a tile may be a member of one group at each level of the hierarchy. A control stream is generated for each tile group of the hierarchy that comprises a primitive block entry for each primitive block that is associated with the tile group. A primitive block entry indicates that the corresponding primitive block is relevant for rendering at least one tile in the tile group. Primitive blocks may be associated with the tile groups in accordance with any of the methods described herein so long as if a primitive block is relevant for rendering a tile then that primitive block is associated with at least one tile group comprising that tile.

Figure 24:
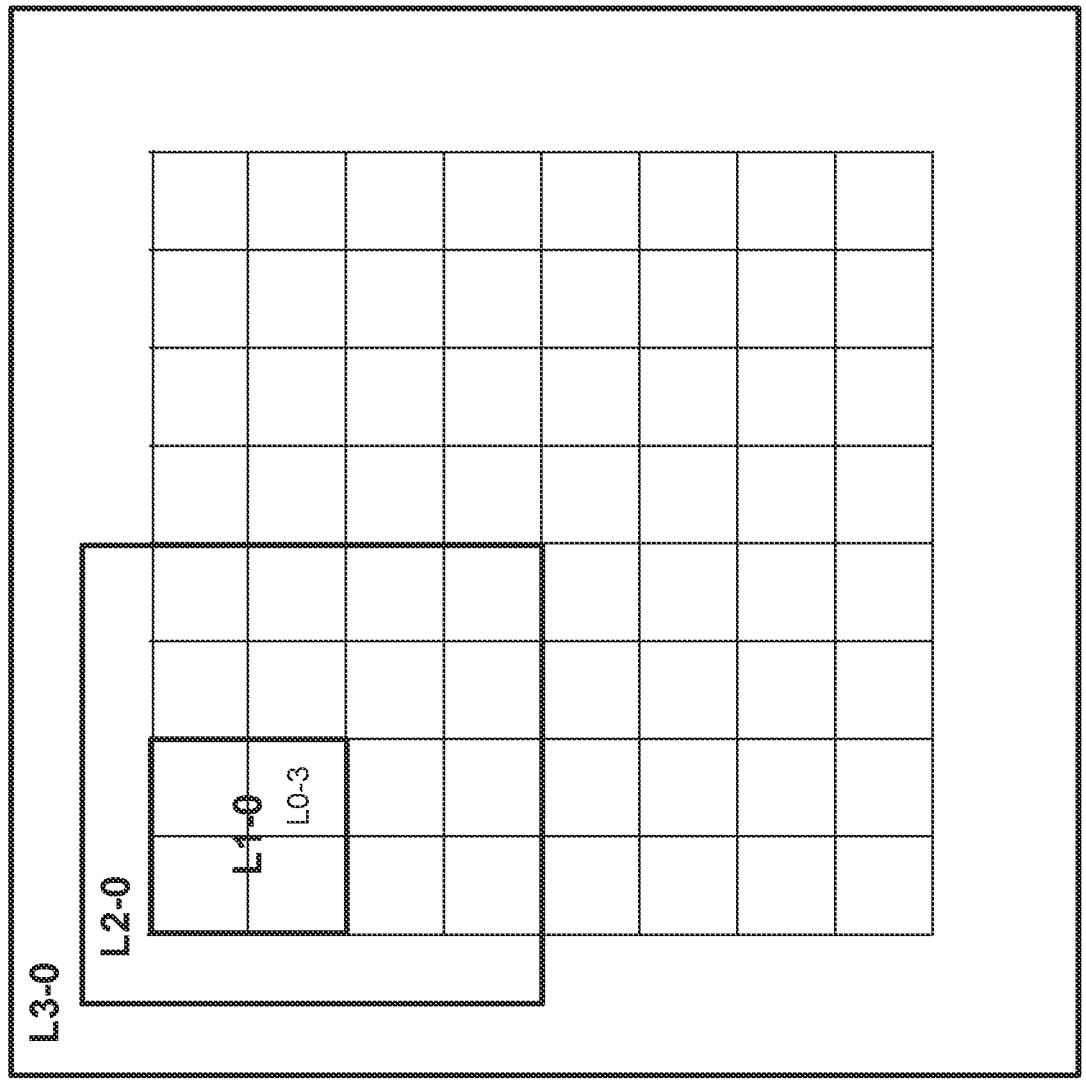
FIG. 24 is a schematic diagram illustrating the relevant tile groups for an example tile of FIG. 1.

In the rasterization phase each tile is rendered based on the primitives that are relevant for rendering that tile (e.g. the primitives that fall, at least partially, within the bounds of the tile). So, in the rasterization phase when the rasterization logic is ready to render a tile it analyses the control streams stored in memory to identify the primitives that are relevant to rendering that tile. The relevant primitives are then fetched from memory and used to render the tile. In the examples described herein, the control streams that identify the primitives which are relevant to rendering a tile are the control streams for the tile groups that the tile forms part of. These tile groups may be referred to as the relevant tile groups for the tile. As the tile groups are hierarchical each tile will belong to a group at each level in the hierarchy. Accordingly if there are N levels there will be N relevant tile groups. For example, as shown in FIG. 24, if the 8×8 block of tiles of FIG. 1 is divided into four levels of tile groups (numbered 0 to 3) as shown in FIG. 7 then Tile 3 (T3) forms part of each of the L0-3, L1-0, L2-0 and L3-0 tile groups and thus the relevant tile groups for T3 are the L0-3, L1-0, L2-0 and L3-0 tile groups. Accordingly, identifying the primitives relevant for rendering a current tile may comprise: (i) identifying the relevant tile groups for the current tile; (ii) fetching the control stream for each relevant tile group from memory; and (iii) analysing the fetched control streams to identify the primitives that are relevant for rendering the tile.

Figure 25:
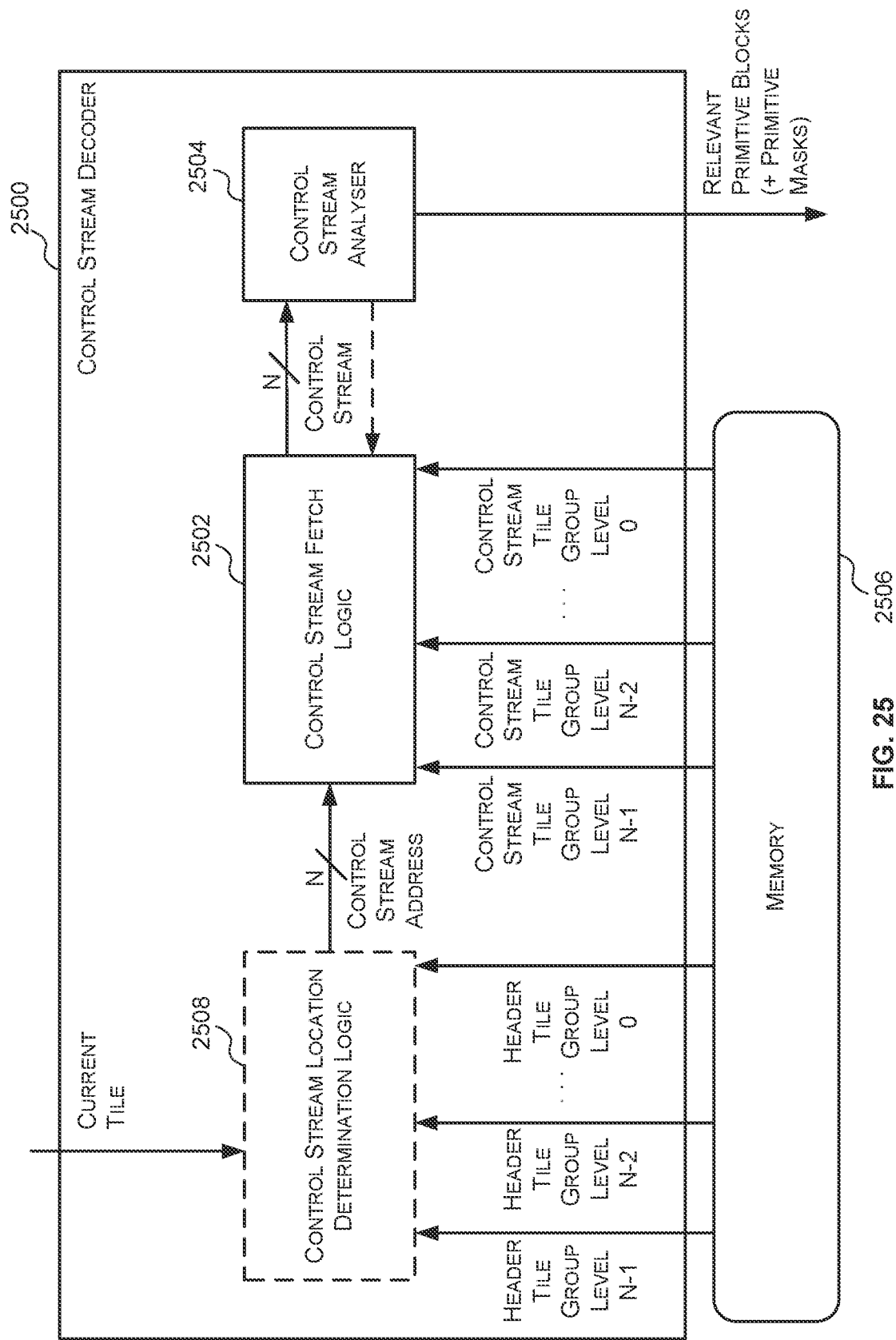
FIG. 25 is a block diagram of an example control stream decoder.

Reference is now made to FIG. 25 which illustrates an example control stream decoder 2500 which is configured to identify, from the control streams stored in memory, the primitives that are relevant for rendering a current tile. The example control stream decoder 2500 of FIG. 25 comprises control stream fetch logic 2502 and a control stream analyser 2504.

The control stream fetch logic 2502 is configured to fetch, from memory, the control stream for each relevant tile group for the current tile. The control stream fetch logic 2502 may receive information (e.g. address) identifying the location in memory 2506 of the control streams for the relevant tile groups; fetch the control streams for the relevant tile groups from the identified locations in memory 2506; and output the fetched control streams to the control stream analyser 2504. As described above, the relevant tile groups for a current tile are the tile groups in the hierarchy that the current tile belong to or forms part of. As the tile groups are hierarchical each tile will belong to a group at each level in the hierarchy. Accordingly if there are N levels in the hierarchy there will be N relevant tile groups.

In some cases, the control stream decoder 2500 may comprise a control stream location determination logic 2508 which is configured to receive information identifying the current tile; determine the location in memory of the control streams for the relevant tile groups for the current tile; and output information (e.g. an address) identifying the determined locations in memory to the control stream fetch logic 2502. Where a header is stored in memory for each tile group that identifies the location of the corresponding control stream in memory, the control stream location determination logic 2508 may be configured to identify the relevant tile groups for the current tile and read the header for each of the relevant tile groups to identify the location in memory of the control stream for that tile group.

In some cases, each tile group header may also comprise valid information (e.g. a valid bit) that indicates whether or not the information identifying the location in memory of the control stream for the tile group is valid. The information identifying the location in memory of the control stream may be invalid because the control stream for that tile group is empty (e.g. there are no primitive blocks associated with the tile group and so there are no primitive block entries in the control stream). In these cases, the control stream location determination logic 2508 may be configured to, once it has fetched the header for a tile, determine whether the header indicates that the control stream is empty (e.g. whether the valid bit is not set). If the control stream location determination logic 2508 determines that the control stream for that tile group is empty the control stream location determination logic 2508 may output information indicating the control stream for that tile group is empty. If, however, the control stream location determination logic 2508 determines that the control stream for that tile group is not empty, the control stream location determination logic 2508 may output the information identifying the location in memory (e.g. an address) of the control stream.

The control stream analyser 2504 is configured to analyse the control streams for the relevant tile groups fetched by the control stream fetch logic 2502 to identify the primitives that are relevant to rendering the current tile. For example, the control stream analyser 2504 may be configured to receive the control streams for the relevant tile groups from the control stream fetch logic 2502; analyse the control streams to identify the primitives relevant to rendering the current tile; and output information indicating or identifying the primitives relevant to rendering the current tile. In some cases, the information indicating or identifying the primitives relevant to rendering the current tile may comprise information identifying one or more primitive blocks relevant for rendering the current tile and, optionally information identifying the primitives of those primitive blocks that are relevant for rendering the current tile (e.g. a primitive mask).

Analysing the control streams to identify the primitives relevant to rendering the current tile may comprise analysing the primitive block entries of the control streams for the relevant tile groups. In some cases, each primitive block entry may simply identify the corresponding primitive block, but may not comprise any further information about which tiles in the tile group are valid for the primitive block.

In these cases, the control stream analyser 2504 may be configured to presume that the current tile is valid for every primitive block identified in a control stream and thus may output information for each of these primitive blocks identifying that primitive block as being relevant for rendering the current tile.

In other cases, each primitive block entry may comprise information indicating which tiles in the tile group are valid for the corresponding primitive block. For example, as described above, each primitive block entry may comprise a header, bounding box information and/or a coverage mask. In these cases the control stream analyser 2504 may be configured to analyse each primitive block entry to determine whether the current tile is valid for the corresponding primitive block. For example, the control stream analyser 2504 may first analyse the header to determine whether the header indicates that the current tile is valid for the corresponding primitive block (e.g. the header may indicate that the current tile is valid for the corresponding primitive block if the full coverage field 1826 is set). If the header indicates that the current tile is valid for the primitive block the control stream analyser may output information identifying the primitive block as being valid for the current tile. If, however, the header does not indicate that the current tile is valid for the primitive block the control stream analyser may analyse the bounding box information, if present, to determine if the current tile falls within or intersects the bounding box for the primitive block. If it is determined that the current tile does not fall within the bounding box for the primitive block, then the current tile is not valid for the primitive block and the primitive block is not identified as being relevant to rendering the current tile. If, however, it is determined that the current tile does fall within the bounding box for the primitive block then the control stream analyser 2504 may analyse the coverage mask, if present, to determine whether the current tile is valid for the primitive block. If the coverage mask indicates that the current tile is valid for the primitive block, then the primitive block may be identified as being relevant to rendering the tile. If, however, the coverage mask indicates that the current tile is not valid for the primitive block then the primitive block is not identified as being relevant to rendering the current tile.

As described above, in some cases the information in a primitive block entry that identifies the corresponding primitive block is information identifying a location in memory of the primitive block. In these cases, the control stream analyser 2504 may be configured to, for each primitive block that the current tile is valid for, analyse the corresponding primitive block entry to identify the location in memory of the primitive block. In some cases, the information identifying the location in memory of the primitive block may be an address of the primitive block in memory. In some cases, the primitive block entry may comprise the complete address of the primitive block in memory. In other cases, the primitive block entry may comprise an offset which, when combined with a base address, produces the complete address of the primitive block in memory. In the latter case the control stream analyser may be configured to keep track of the current base address for a control stream and if it receives an address via offset it may combine the offset with the base address to generate the complete address.

In some cases, the order in which the primitive blocks relevant to rendering the current tile are processed in the rasterization phase is important. For example, the primitives may be processed in the geometry processing phase (e.g. by the geometry processing logic) in a specific order and it may be important that the primitives relevant to a tile are processed in the same order. The order in which primitives are to be processed and rasterized is known as the draw order. For example, if primitives 0-20 are processed in the geometry processing phase in numerical order and primitives 0, 5, 7, 8 and 20 are relevant to rendering a particular tile then it is important that when processing that tile in the rasterization phase that primitive 0 is processed first, then primitive 5, then primitive 7 and so on. In some cases, primitive blocks will be partially or wholly filled in turn with primitives, in the order that the primitives are processed in the geometry processing phase, and the primitive blocks will be stored in the order at which they were filled such that the earlier a primitive block was filled in the geometry processing phase the lower the memory address. The rasterization phase may then ensure that primitives are processed in order by processing the primitive blocks in the order that they are stored in memory. For example, the first primitive block filled in the geometry processing phase may be stored in memory at the lowest memory address, and the last primitive block filled in the geometry processing phase may be stored in memory at the highest address. In these cases, the control stream analyser 2504 may be configured to determine the order in which the relevant primitive blocks are to be output based on their locations in memory. For example, the relevant primitive block for a current tile with the lowest address in memory may be output first and the relevant primitive block for a current tile with the highest address in memory may be output last.

Where the control stream analyser 2504 is able (e.g. has enough memory) to store information for all the relevant primitive blocks for the current tile, the control stream analyser 2504 may, after it has identified the relevant primitive blocks, order the relevant primitive blocks based on their locations in memory. The control stream analyser 2504 may then output the relevant primitive blocks in that order (or information identifying the relevant primitive blocks). However, there may be a large number of relevant primitive blocks which may require a large memory. Performing the ordering of the relevant primitive blocks after identifying all of the relevant primitive blocks may also delay outputting the information identifying the first relevant primitive block which may cause downstream components to stall.

Accordingly, to reduce the amount of memory the control stream analyser 2504 requires, and to reduce the time for outputting the information identifying the first relevant primitive block, the control stream analyser 2504 may be configured to store information for up to one relevant primitive block per relevant tile group at a time, and each cycle select the stored relevant primitive block with the lowest address in memory. Accordingly, if there are N levels in the hierarchy there will be N relevant tile groups, thus the control stream analyser may be configured to store information related to up to N relevant primitive blocks at a time. In these examples, the control stream fetch logic 2502 may be configured to initially fetch the first primitive block entry from each of the non-empty relevant control streams and provide those to the control stream analyser. The control stream analyser 2504 may be configured to determine if the current tile is valid for the primitive blocks corresponding to those entries. If the tile is not valid for any of those primitive blocks, then the control stream analyser 2504 may request the next primitive block entry from the corresponding control stream until the control stream analyser has a relevant primitive block entry for each of the non-empty control streams. The control stream analyser 2504 may then select the primitive block with the lowest address to output. The control stream analyser 2504 may then request the next primitive block entry from the control stream that the selected primitive block was associated with. This process is repeated until there are no primitive block entries in the relevant control streams which have not been analysed. An example method for implementing this is described with respect to FIG. 26.

Figure 26:
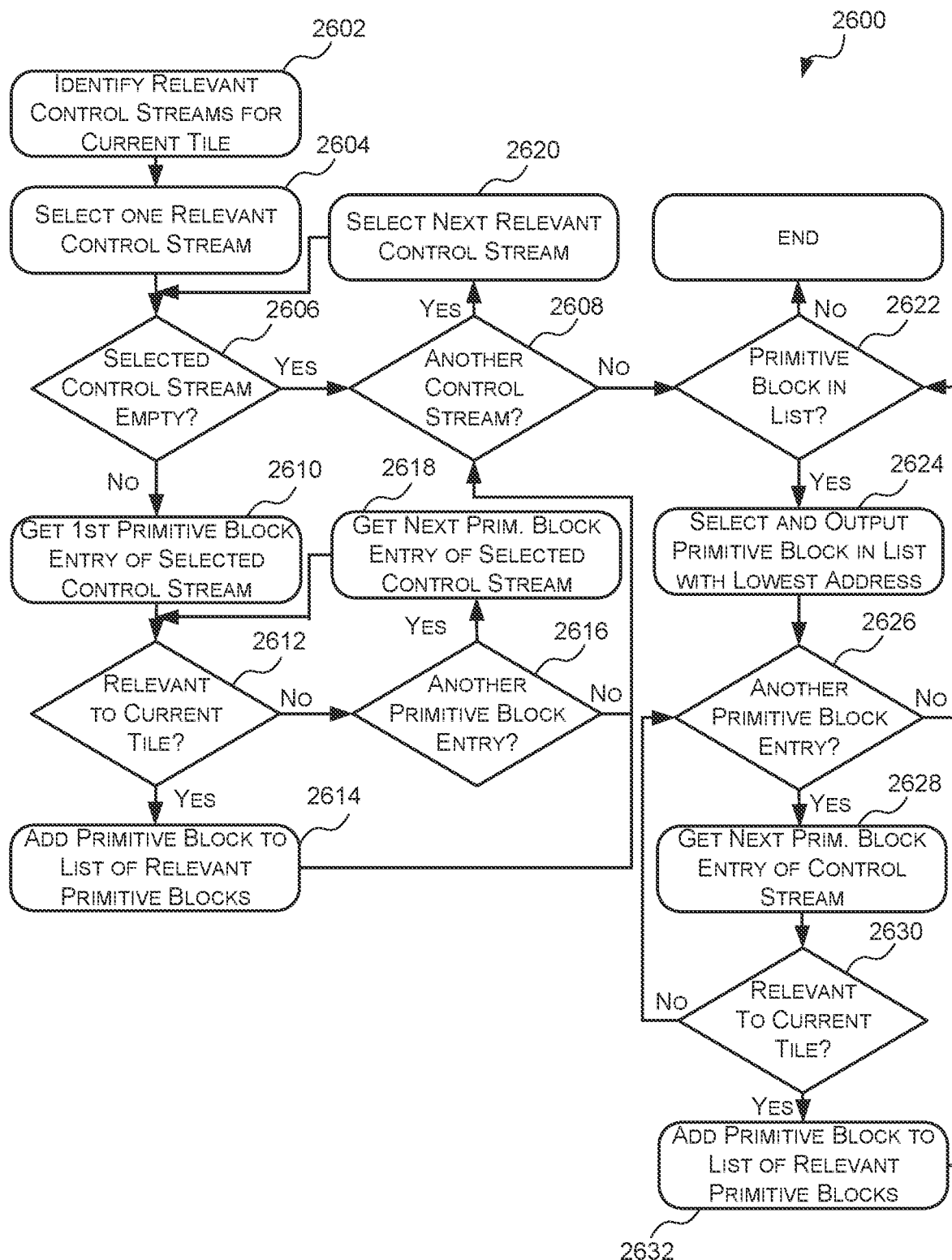
FIG. 26 is a flow diagram of an example method for identifying the primitives relevant for rendering a tile from the control streams described herein.

Reference is now made to FIG. 26 which illustrates an example method 2600 of identifying the primitives relevant for rendering a current tile from the control streams described above which may be implemented by the control stream decoder 2500 of FIG. 25. The method 2600 begins at step 2602 where the control stream location determination logic identifies the relevant tile groups for the current tile and identifies the locations in memory of the control streams for the relevant tile groups (e.g. from the headers for the relevant tile groups). These control streams may be referred to herein as the relevant control streams for the current tile. The control stream location determination logic may optionally determine whether any of the control streams are empty (e.g. from the valid bit of the header). The control stream location determination logic then outputs to the control stream fetch logic 2502, for each relevant control stream, information identifying the location in memory thereof or information indicating that the control stream is empty. The method 2600 then proceeds to step 2604 wherein one of the relevant control streams is selected by the control stream fetch logic. The method 2600 then proceeds to step 2606 where the control stream fetch logic determines whether the selected relevant control stream is empty (e.g. from the information received from the control stream address decoder). If it is determined at step 2606 that the selected control stream is empty the method 2600 proceeds to step 2608. If, however, it is determined at step 2606 that the selected control stream is not empty then the method 2600 proceeds to step 2610.

At step 2610, the control stream fetch logic reads the first primitive block entry for the selected control stream from memory. The fetched primitive block entry may then be provided to the control stream analyser. The method 2600 then proceeds to step 2612 where the control stream analyser determines whether or not the current tile is valid for the primitive block corresponding to the primitive block entry (e.g. from the header, bounding box information and/or coverage mask of the primitive block entry as described above). If it is determined at step 2612 that the current tile is valid for the corresponding primitive block then the method 2600 proceeds to step 2614 where the information identifying the primitive block corresponding to the primitive block entry is added to a list of relevant primitive blocks. The method 2600 then proceeds to step 2608. If, however, it is determined at step 2612 that the current tile is not valid for the corresponding primitive block then the method 2600 proceeds to step 2616 where it is determined (e.g. by the control stream fetch logic) whether there are any more primitive block entries for the selected relevant control stream. If it is determined at step 2616 that there is at least one other primitive entry in the selected relevant control stream, then the method proceeds to step 2618 where the next primitive block entry is read from memory and steps 2612 and 2614 are repeated for that primitive block entry. If, however, it is determined at step 2616 that there are no more primitive block entries in the selected relevant control stream then the method proceeds to step 2608.

At step 2608, after it has been determined that (i) the selected relevant control stream is empty, (ii) the selected relevant control stream does not have any primitive block entries that are relevant to the current tile; or (iii) the selected relevant control stream has a primitive block entry that is relevant to the current tile and information identifying the corresponding primitive block has been added to the list of relevant primitive blocks, it is determined whether there is another relevant control stream which has not been analysed. If it is determined at step 2608 that there is at least one relevant control stream that has not been analysed, then the method 2600 proceeds to step 2620 where the next relevant control stream is selected and steps 2606 and 2010-2018 are repeated for that control stream. If, however, it is determined at step 2608 that there are no relevant control streams that have not yet been analysed then the method 2600 proceeds to step 2622.

At step 2622, after information identifying a primitive block has been added to the list of relevant primitive blocks for each non-empty relevant control stream that comprises at least one primitive block entry that is relevant to the current tile, the control stream analyser determines whether there are any primitive blocks in the list. If it is determined at step 2622 that there are no primitive blocks in the list, then the method 2600 ends. If, however, it is determined at step 2622 that there is at least one primitive block in the list then the method 2600 proceeds to step 2624.

At step 2624, the primitive block in the list which is associated with the earliest primitives in the draw order is selected, information identifying that primitive block as being relevant to rendering the current tile is output, and the selected primitive block is removed from the list. In some cases, information identifying the primitives in the selected primitive block that are relevant to rendering the current tile is also output (e.g. a primitive mask may be output if the primitive block entry comprised a primitive mask that applies to the current tile). In some cases, as described above, the primitive block that is associated with the earliest primitives in the draw order is the primitive block with the lowest address in memory. Once a primitive block has been selected and processed the method 2600 proceeds to step 2626.

At step 2626, it is determined (e.g. by the control stream fetch logic) whether there are any more primitive block entries in the control stream associated with the primitive block selected in step 2624. If it is determined at step 2626 that there are no more primitive block entries in the control stream associated with the primitive block selected in step 2624 then the method proceeds back to step 2622. If, however, it is determined at step 2626 that there is at least one more primitive block entry in the control stream associated with the primitive block selected in step 2624 then the method 2600 proceeds to step 2628 where the next primitive block entry of that control stream is read from memory. The method 2600 then proceeds to step 2630 where it is determined whether that primitive block entry is relevant to the current tile (e.g. from the header, bounding box information and/or coverage mask as described above). If it is determined at step 2630 that the primitive block entry retrieved in step 2628 is relevant for the current tile, then the method proceeds to step 2632 where information identifying the corresponding primitive block is added to the list and then the method 2600 proceeds back to step 2622. If, however, it is determined at step 2630 that the primitive block entry retrieved in step 2628 is not relevant for the current tile then the method 2600 proceeds back to step 2626 to determine if there is another primitive block entry.

Accordingly, in the method 2600 of FIG. 26 a list is compiled of the first primitive block in each relevant control stream (steps 2602 to 2620) that is relevant to the current tile. The primitive block in the list that relates to the earliest primitives in the draw order is then selected and information identifying that primitive block is output. The next primitive block, in the same control stream as the selected primitive block, that is relevant to the current tile is added to the list. Once all of the primitive blocks in a control stream relevant to the current tile have been added to the list that control stream has been processed and no further entries are added to the list for that control stream. This is repeated until all of the primitive blocks identified in the relevant control streams that are relevant to the current tile have been added to the list, and information identifying those primitive blocks have been output.

Graphics Processing System

Figure 27:
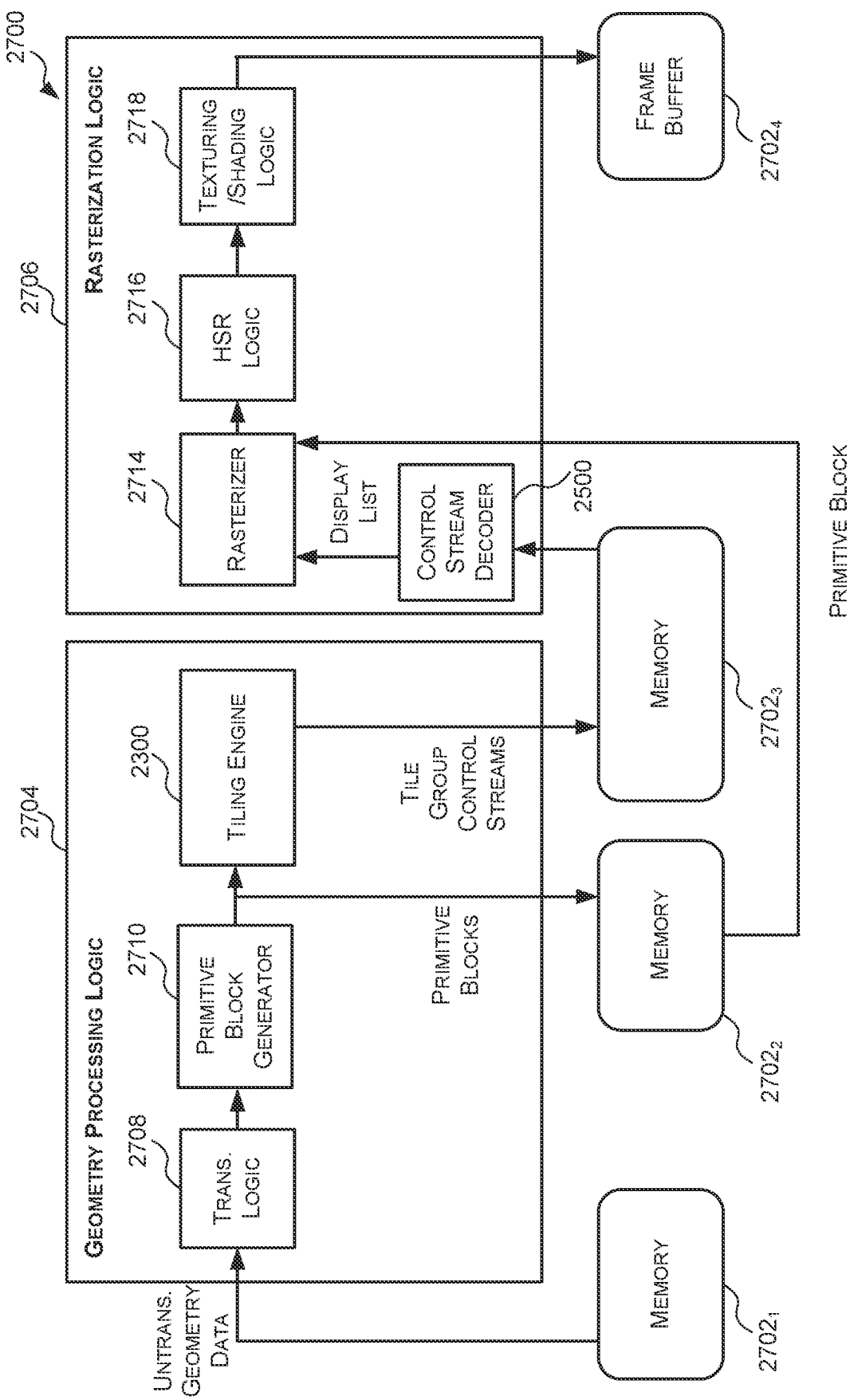
FIG. 27 is a block diagram of an example tile-based rendering graphics processing system comprising the tiling engine of FIG. 23 and the control stream decoder of FIG. 25.

Reference is now made to FIG. 27 which illustrates an example tile-based graphics processing system 2700 which comprises the tiling engine 2300 of FIG. 23 and the control stream decoder 2500 of FIG. 25. The graphics processing system 2700 of FIG. 27 is similar to the graphics processing system 200 of FIG. 2 in that it comprises geometry processing logic 2704 and rasterization logic 2706; the geometry processing logic 2704 comprises transformation logic 2708 and a primitive block generator 2710 (each of which function as the corresponding components of FIG. 2); and the rasterization logic 2706 comprises a rasterizer 2714, HSR logic 2716 and texturing/shading logic 2718 (each of which function as the corresponding components of FIG. 2 described above). However, instead of the geometry processing logic comprising a tiling engine that is configured to store a display list per tile, the geometry processing logic 2704 of FIG. 27 comprises a tiling engine 2300 that is configured to generate a multi-level hierarchy of tile groups, and store a control stream for each tile group in the hierarchy. The rasterization logic 2706 of FIG. 27 also comprises a control stream decoder 2500 which is configured to generate a display list (e.g. output the relevant primitive blocks) for each tile by decoding the relevant control streams stored in memory $2702_3$.

Figure 28:
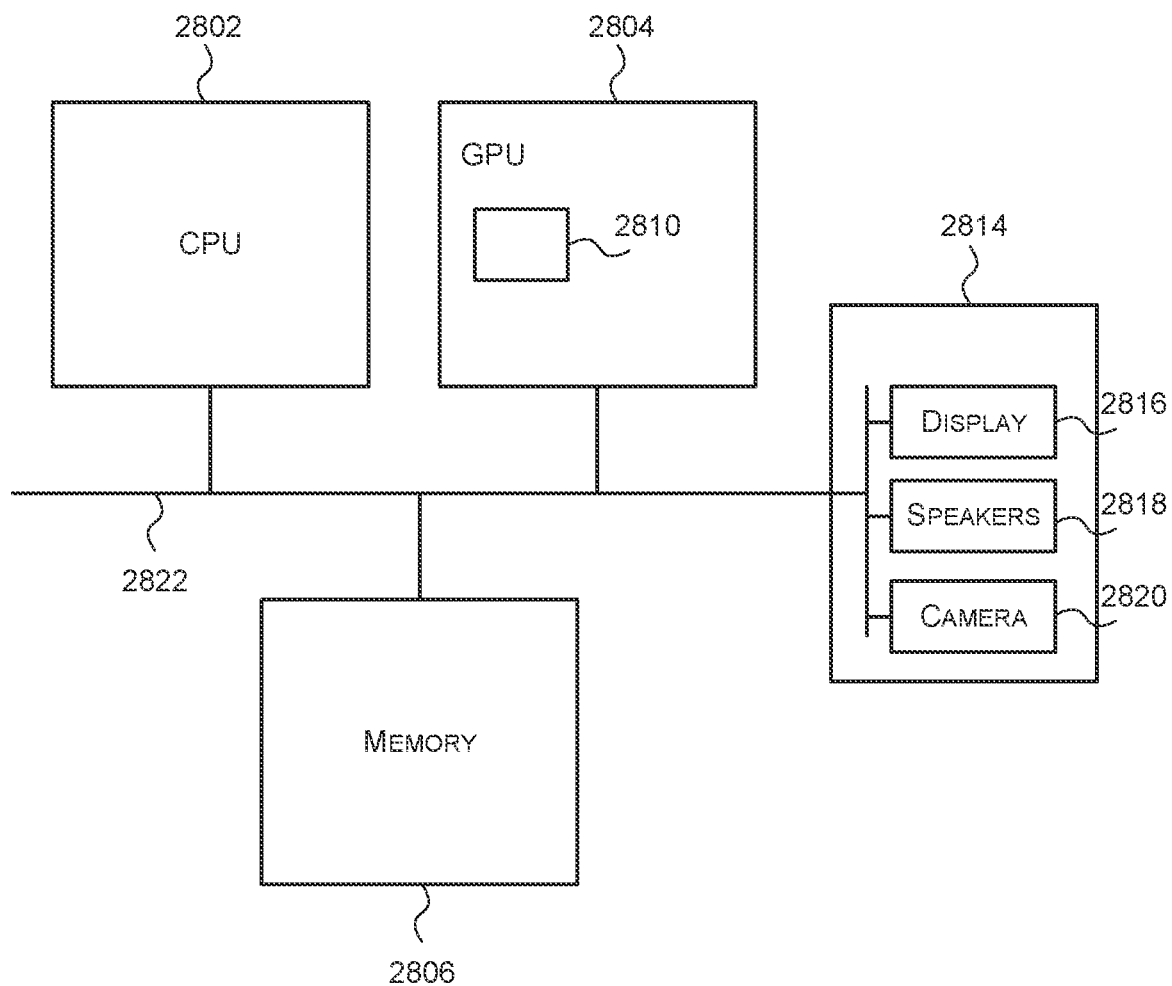
FIG. 28 is a block diagram of an example computer system in which the tiling engines, control stream decoders and/or the graphics processing systems described herein may be implemented.

FIG. 28 shows a computer system in which the tiling engines, control stream decoders and/or graphics processing systems described herein may be implemented. The computer system comprises a CPU 2802, a GPU 2804, a memory 2806 and other devices 2814, such as a display 2816, speakers 2818 and a camera 2820. A processing block 2810 (which may correspond to a tiling engine, a control stream decoder and/or graphics processing system described herein) is implemented on the GPU 2804. In other examples, the processing block 2810 may be implemented on the CPU 2802. The components of the computer system can communicate with each other via a communications bus 2822.

The tiling engines, control stream decoders, and graphics processing systems of FIGS. 2, 23, 25 and 27 are shown as comprising a number of functional blocks. This is schematic only and is not intended to define a strict division between different logic elements of such entities. Each functional block may be provided in any suitable manner. It is to be understood that intermediate values described herein as being formed by the tiling engine, the control stream decoder or the graphics processing system, need not be physically generated by the tiling engine, the control stream decoder or the graphics processing system at any point and may merely represent logical values which conveniently describe the processing performed by the tiling engine, the control stream decoder or graphics processing system between its input and output.

The tiling engines, control stream decoders and graphics processing systems described herein may be embodied in hardware on an integrated circuit. The tiling engines, control stream decoders and graphics processing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a tiling engine, a control stream decoder or graphics processing system configured to perform any of the methods described herein, or to manufacture a tiling engine, a control stream decoder or graphics processing systems comprising any apparatus described herein. An integrated circuit definition dataset may be, for example, an integrated circuit description.

Therefore, there may be provided a method of manufacturing, at an integrated circuit manufacturing system, a tiling engine, a control stream decoder, or a graphics processing system as described herein. Furthermore, there may be provided an integrated circuit definition dataset that, when processed in an integrated circuit manufacturing system, causes the method of manufacturing a tiling engine, a control stream decoder, or a graphics processing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a tiling engine, a control stream decoder or a graphics processing system will now be described with respect to FIG. 29.

Figure 29:
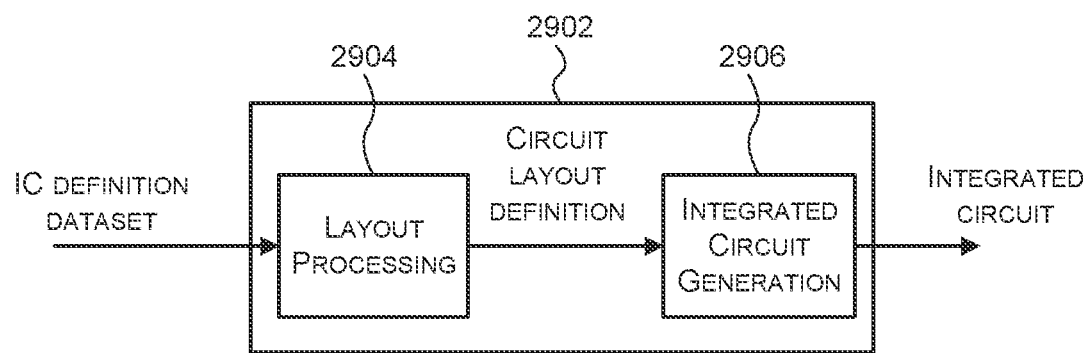
FIG. 29 is a block diagram of an example integrated circuit manufacturing system for generating an integrated circuit embodying the tiling engines, the control stream decoders and/or the graphics processing systems described herein.

FIG. 29 shows an example of an integrated circuit (IC) manufacturing system 2902 which is configured to manufacture a tiling engine, a control stream decoder or a graphics processing system as described in any of the examples herein. In particular, the IC manufacturing system 2902 comprises a layout processing system 2904 and an integrated circuit generation system 2906. The IC manufacturing system 2902 is configured to receive an IC definition dataset (e.g. defining a tiling engine, a control stream decoder or a graphics processing system as described in any of the examples herein), process the IC definition dataset, and generate an IC according to the IC definition dataset (e.g. which embodies a tiling engine, a control stream decoder or a graphics processing system as described in any of the examples herein). The processing of the IC definition dataset configures the IC manufacturing system 2902 to manufacture an integrated circuit embodying a tiling engine, a control stream decoder or a graphics processing system as described in any of the examples herein.

The layout processing system 2904 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 2904 has determined the circuit layout it may output a circuit layout definition to the IC generation system 2906. A circuit layout definition may be, for example, a circuit layout description.

The IC generation system 2906 generates an IC according to the circuit layout definition, as is known in the art. For example, the IC generation system 2906 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 2906 may be in the form of computer-readable code which the IC generation system 2906 can use to form a suitable mask for use in generating an IC.

The different processes performed by the IC manufacturing system 2902 may be implemented all in one location, e.g. by one party. Alternatively, the IC manufacturing system 2902 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a tiling engine, a control stream decoder or a graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 29 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 29, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of identifying, in a graphics processing system in which a rendering space has been sub-divided into a plurality of tiles, primitives relevant to rendering a current tile of the plurality of tiles, each tile of the plurality of tiles forming part of at least two different tile groups of different sizes, the method comprising:
   fetching a control stream for each tile group that the current tile forms part of, each control stream comprising none, one or more than one primitive block entry, each primitive block entry comprising (i) information identifying a corresponding primitive block comprising geometry data for one or more primitives, and (ii) bounding box information identifying a bounding box that encompasses the one or more primitives of the corresponding primitive block; and
   analysing each primitive block entry of the fetched control streams to determine whether the corresponding primitive block is relevant to rendering the current tile by:
     determining from the bounding box information whether the current tile falls within the bounding box, and
     in response to determining that the current tile does not fall within the bounding box, determining that the corresponding primitive block is not relevant to rendering the current tile.

2. The method of claim 1, wherein each primitive block entry further comprises full coverage information that indicates whether the corresponding primitive block is relevant to rendering each tile in the tile group, and analysing a primitive block entry to determine whether the corresponding primitive block is relevant to rendering the current tile comprises, determining from the full coverage information whether the corresponding primitive block is relevant to rendering each tile in the tile group, and only performing the determining from the bounding box information if it is determined from the full coverage information that the corresponding primitive block is not relevant to rendering each tile in the tile group.

3. The method of claim 2, further comprising, in response to determining from the full coverage information of a primitive block entry that the corresponding primitive block is relevant to rendering each tile in the tile group, determining that the corresponding primitive block is relevant to rendering the current tile.

4. The method of claim 1, wherein the primitive blocks are stored in memory in an order in which they are to be processed, and the method further comprises ordering the primitive blocks determined to be relevant to rendering the current tile based on their locations in memory.

5. The method of claim 1, further comprising:
   analysing, for each fetched control stream with at least one primitive block entry, the primitive block entries in that control stream one at a time to determine whether the corresponding primitive block is relevant to rendering the current tile until (i) a primitive block relevant to rendering the current tile is identified or (ii) it is determined that none of the primitive block entries of that control stream are relevant to rendering the current tile;
   for each primitive block determined to be relevant to rendering the current tile, adding information identifying that primitive block to a list of relevant primitive blocks; and
   selecting a primitive block from the list of relevant primitive blocks associated with the earliest primitives in a draw order to be processed next and removing the selected primitive block from the list of relevant primitive blocks.

6. The method of claim 5, further comprising:
   (a) analysing the primitive block entries in the control stream associated with the selected primitive block, following the selected primitive block, one at a time until (i) a primitive block relevant to rendering the current tile is identified or (ii) it is determined that none of the primitive block entries of that control stream are relevant to rendering the current tile;
   (b) if a primitive block relevant to rendering the current tile is identified, adding information identifying that primitive block to the list of relevant primitive blocks; and
   (c) selecting a primitive block from the list of relevant primitive blocks associated with the earliest primitives in a draw order to be processed next and removing the selected primitive block from the list of relevant primitive blocks.

7. The method of claim 6, further comprising repeating (a), (b) and (c) until the list of relevant primitive blocks is empty.

8. The method of claim 5, wherein the primitive blocks are stored in memory in an order in which they are to be processed and the primitive block in the list of relevant primitive blocks associated with the earliest primitives in the draw order is the primitive block in the list of relevant primitive blocks with a lowest address in the memory.

9. The method of claim 1, wherein analysing a primitive block entry to determine whether the corresponding primitive block is relevant to rendering the current tile further comprises:
   in response to determining that the current tile does fall within the bounding box, determining whether the primitive block entry comprises a coverage mask indicating which tiles in the tile group that intersect with the bounding box the corresponding primitive block is relevant to, and in response to determining that the control stream comprises a coverage mask, determining from the coverage mask whether the corresponding primitive block is relevant to rendering the current tile.

10. The method of claim 9, wherein the coverage mask of a primitive block entry is a hierarchical coverage mask that comprises information for successively smaller areas of a block of tiles, the block of tiles comprising a block of relevant tiles, the block of relevant tiles comprising tiles in the tile group that intersect the bounding box that encompasses the one or more primitives of the corresponding primitive block.

11. The method of claim 10, wherein the block of tiles comprises a smallest s×s block of tiles that encompasses the block of relevant tiles, wherein s is a power of 2.

12. The method of claim 10, wherein the block of tiles is divided into quadrants of tiles and the coverage mask of a primitive block entry comprises information for each quadrant of tiles that indicates whether or not the corresponding primitive block is relevant to rendering at least one tile in the quadrant of tiles, and if the corresponding primitive block is relevant to rendering at least one tile in a quadrant of tiles then the coverage mask comprises information for each sub-quadrant of tiles of that quadrant of tiles that indicates whether or not the corresponding primitive block is relevant to rendering at least one tile in the sub-quadrant of tiles.

13. The method of claim 9, wherein the coverage mask of a primitive block entry comprises information for each tile in a block of relevant tiles that indicates whether the corresponding primitive block is relevant to rendering that tile, the block of relevant tiles comprising tiles in the tile group that intersect the bounding box that encompasses the one or more primitives of the corresponding primitive block.

14. The method of claim 1, wherein the bounding box that encompasses the one or more primitives of the corresponding primitive block is defined by a plurality of co-ordinates in the rendering space, and the bounding box information comprises information indicating which of the plurality of co-ordinates falls within an area of the rendering space covered by the tiles of the tile group.

15. The method of claim 14, wherein the bounding box information further comprises information, for each co-ordinate that falls within the area of the rendering space covered by the tiles of the tile group, information identifying that co-ordinate.

16. The method of claim 14, wherein the plurality of co-ordinates comprises a minimum X co-ordinate, a maximum X co-ordinate, a minimum Y co-ordinate, and a maximum Y co-ordinate.

17. The method of claim 1, wherein each primitive block entry comprises information identifying a location in memory of the corresponding primitive block and the method further comprises, in response to determining from a primitive block entry that a corresponding primitive block is relevant to rendering the current tile, analysing the information identifying the location in memory of the corresponding primitive block in memory to identify the location in memory of the corresponding primitive block.

18. The method of claim 1, further comprising, in response to determining from a primitive block entry that a corresponding primitive block is relevant to rendering the current tile, analysing a primitive mask section of the primitive block entry to identify primitives of the corresponding primitive block that are relevant to rendering the current tile.

19. The method of claim 18, wherein the primitive mask section comprises a primitive mask for one or more sets of tiles, each set of tiles comprising one or more tiles, each primitive mask comprising information indicating which primitives of the corresponding primitive block are relevant to rendering at least one tile in the corresponding set of tiles.

20. A non-transitory computer readable storage medium having stored thereon computer readable instructions that, when executed at a computer system, cause the computer system to perform the method as set forth in claim 1.

* * * * *